US012556856B2

(12) United States Patent
Zhang et al.

(10) Patent No.: US 12,556,856 B2
(45) **Date of Patent: *Feb. 17, 2026**

(54) LOUDSPEAKER DEVICE

(71) Applicant: SHENZHEN SHOKZ CO., LTD., Guangdong (CN)

(72) Inventors: Lei Zhang, Shenzhen (CN); Yongjian Li, Shenzhen (CN); Wenbing Zhou, Shenzhen (CN); Jinbo Zheng, Shenzhen (CN); Zhuyang Jiang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 128 days.

This patent is subject to a terminal disclaimer.

(21) Appl. No.: 18/635,064

(22) Filed: Apr. 15, 2024

(65) Prior Publication Data

US 2024/0267669 A1 Aug. 8, 2024

Related U.S. Application Data

(63) Continuation of application No. 18/319,468, filed on May 17, 2023, now Pat. No. 12,185,054, which is a
(Continued)

(30) Foreign Application Priority Data

Jan. 5, 2019 (CN) ........................ 201910009909.6

(51) Int. Cl.
*H04R 1/10* (2006.01)
*H04R 1/06* (2006.01)
(Continued)

(52) U.S. Cl.
CPC ............ *H04R 1/1075* (2013.01); *H04R 1/06* (2013.01); *H04R 1/1016* (2013.01); *H04R 1/105* (2013.01);
(Continued)

(58) Field of Classification Search
CPC ...... H04R 1/1075; H04R 1/06; H04R 1/1016; H04R 1/105; H04R 1/1066; H04R 1/1091;
(Continued)

(56) References Cited

U.S. PATENT DOCUMENTS

2009/0185699 A1 7/2009 Kim
2011/0317845 A1 12/2011 Yuan et al.
(Continued)

FOREIGN PATENT DOCUMENTS

CN 104581484 A 4/2015
CN 205726269 U 11/2016
(Continued)

OTHER PUBLICATIONS

International Search Report in PCT/CN2019/102388 mailed on Nov. 25, 2019, 6 pages.
(Continued)

*Primary Examiner* — Tuan D Nguyen
(74) *Attorney, Agent, or Firm* — METIS IP LLC

(57) ABSTRACT

A loudspeaker device may include a speaker component, a circuit housing configured to accommodate a control circuit, and a key module disposed on the core housing. The speaker component may include an earphone core and a core housing for accommodating the earphone core. The control circuit may drive the earphone core to vibrate to generate a sound. The key module may include a key and an elastic bearing for supporting the key. The elastic bearing may include an integrally formed bearing body and a support column.

20 Claims, 20 Drawing Sheets

Related U.S. Application Data continuation of application No. 17/445,602, filed on Aug. 22, 2021, now Pat. No. 11,659,318, which is a continuation of application No. 17/172,096, filed on Feb. 10, 2021, now Pat. No. 11,109,142, which is a continuation of application No. PCT/CN2019/102388, filed on Aug. 24, 2019.

(51) Int. Cl.
*H04R 5/033* (2006.01)
*H04R 9/02* (2006.01)
*H04R 9/06* (2006.01)

(52) U.S. Cl.
CPC ......... *H04R 1/1066* (2013.01); *H04R 1/1091* (2013.01); *H04R 5/0335* (2013.01); *H04R 9/02* (2013.01); *H04R 9/06* (2013.01); *H04R 1/1041* (2013.01); *H04R 2201/109* (2013.01); *H04R 2420/07* (2013.01); *H04R 2460/13* (2013.01)

(58) Field of Classification Search
CPC .......... H04R 5/0335; H04R 9/02; H04R 9/06; H04R 1/1041; H04R 2201/109; H04R 2420/07; H04R 2460/13; H04R 1/1008
See application file for complete search history.

(56) References Cited

U.S. PATENT DOCUMENTS

| | | | |
|---|---|---|---|
| 2016/0246076 | A1 | 8/2016 | Wei |
| 2017/0006400 | A1 | 1/2017 | Robertson et al. |
| 2017/0087364 | A1 | 3/2017 | Cartledge et al. |
| 2018/0063626 | A1 | 3/2018 | Pong et al. |
| 2021/0168489 | A1 | 6/2021 | Zhang et al. |

FOREIGN PATENT DOCUMENTS

| | | | |
|---|---|---|---|
| CN | 107454492 | A | 12/2017 |
| CN | 107493532 | A | 12/2017 |
| CN | 207070263 | U | 3/2018 |
| CN | 108391213 | A | 8/2018 |
| CN | 108429975 | A | 8/2018 |
| CN | 109495809 | A | 3/2019 |
| JP | 2004229147 | A | 8/2004 |
| KR | 101782435 | B1 | 9/2017 |
| WO | 0137524 | A1 | 5/2001 |

OTHER PUBLICATIONS

Written Opinion in PCT/CN2019/102388 mailed on Nov. 25, 2019, 7 pages.

LOUDSPEAKER DEVICE

CROSS-REFERENCE TO RELATED APPLICATIONS

This application a continuation of U.S. application Ser. No. 18/319,468, filed on May 17, 2023, which is a continuation of U.S. application Ser. No. 17/445,602, filed on Aug. 22, 2021, now U.S. Pat. No. 11,659,318, issued on May 23, 2023, which is a continuation of U.S. application Ser. No. 17/172,096, filed on Feb. 10, 2021, now U.S. Pat. No. 11,109,142, issued on Aug. 31, 2021, which is a continuation of International Application No. PCT/CN2019/102388, filed on Aug. 24, 2019, which claims priority of Chinese Patent Application No. 201910009909.6, filed on Jan. 5, 2019, the entire contents of each of which are hereby incorporated by reference.

TECHNICAL FIELD

The disclosure generally relates to the field of loudspeaker devices, and more particularly relates to a key module of a loudspeaker device.

BACKGROUND

At present, a speaker component of a loudspeaker device is provided with a key module and an auxiliary key module to facilitate users to perform corresponding functions. Users can realize corresponding functions through the key module and the auxiliary key module, such as pausing/playing music and answering calls. However, the settings of the key module and the auxiliary key module do not consider their impact on the working state of the speaker component. For example, the key module may reduce the volume generated by the speaker component to a certain extent.

SUMMARY

The present disclosure provides a loudspeaker device. The loudspeaker device includes a support connector configured to be in contact with a head and at least one speaker component. The at least one speaker component may include an earphone core and a core housing for accommodating the earphone core. The core housing may be fixedly connected to the support connector. The core housing may be provided with at least one key module. The support connector may accommodate a control circuit or a battery which drive the earphone core to vibrate to produce sound.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
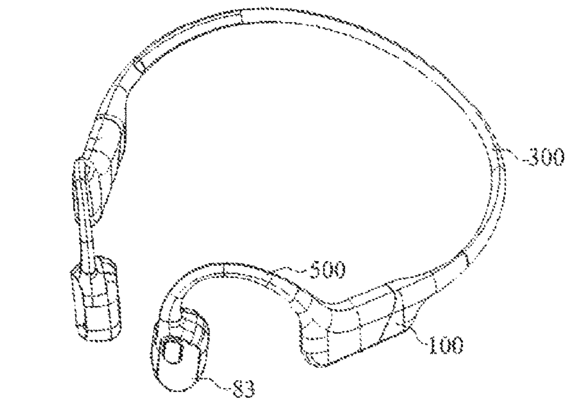
FIG. 1 is a schematic diagram illustrating an exemplary loudspeaker device according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

As used in the disclosure and the appended claims, the singular forms "a." "an," and "the" may include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment;" the term "another embodiment" means "at least one other embodiment." Related definitions of other terms will be given in the description below. In the following, without loss of generality, the "loudspeaker device" or "speaker" may be used when illustrating related technologies of conduction in the present disclosure. The illustration is only a form of conductive application. For those skilled in the art, "loudspeaker device" or "speaker" may also be replaced with other similar words, such as "sound producing device," "hearing aid," "sound raising device," or the like. In fact, various implementations in the present disclosure may be easily applied to other hearing devices belonging to non-speaker component. For example, for those skilled in the art, after understanding the basic principles of loudspeaker device, it may be possible to make various modifications and changes in the form and details of the specific methods and operations of implementing loudspeaker device without departing from the principles. In particular, an environmental sound collection and processing function may be added to the loudspeaker device to enable the loudspeaker device to implement the function of a hearing aid. For example, a microphone may collect environmental sounds of a user/wearer, process the sounds using a certain algorithm and transmit the processed sound (or generated electrical signal) to a speaker. That is, the loudspeaker device may be modified to include the function of collecting the environmental sounds, and after a certain signal processing, the sound may be transmitted to the user/wearer via the speaker module. As an example, the algorithm mentioned herein may include noise cancellation, automatic gain control, acoustic feedback suppression, wide dynamic range compression, active environment recognition, active noise reduction, directional processing, tinnitus processing, multi-channel wide dynamic range compression, active howling suppression, volume control, or the like, or any combination thereof.

Figure 2:
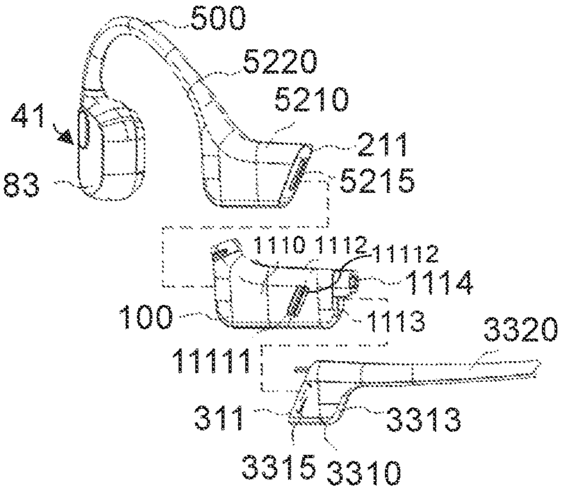
FIG. 2 is an exploded view of a partial structure of an exemplary loudspeaker device according to some embodiments of the present disclosure.
Figure 3:
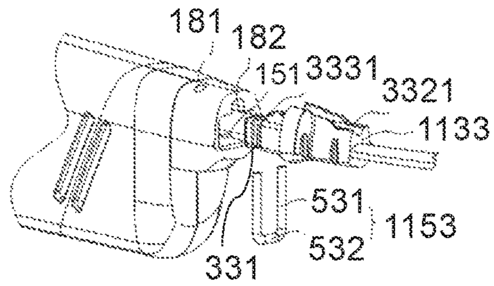
FIG. 3 is an exploded view of a partial structure of an exemplary loudspeaker device according to some embodiments of the present disclosure.
Figure 4:
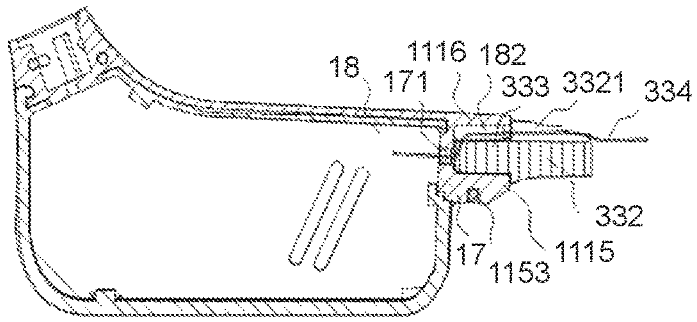
FIG. 4 is a cross-sectional view of a partial structure of an exemplary loudspeaker device according to some embodiments of the present disclosure.

FIG. 1 is a schematic diagram of an exemplary loudspeaker device according to some embodiments of the present disclosure. FIG. 2 is an exploded view of a partial structure of an exemplary loudspeaker device according to some embodiments of the present disclosure. FIG. 3 is an exploded view of a partial structure of an exemplary loudspeaker device according to some embodiments of the present disclosure. FIG. 4 is a cross-sectional view of a partial structure of an exemplary loudspeaker device according to some embodiments of the present disclosure. Referring to FIG. 1 to FIG. 4, in some embodiments, a loudspeaker device may include a device based on a headphone, an MP3, or other devices with speaker function. In some embodiments, the loudspeaker device may include a circuit housing 100, an ear hook 500, a rear hook 300, a speaker component 83, a control circuit, a battery, and the like. The circuit housing 100 may be used for accommodating the control circuit or the battery. The speaker component 83 may include a core housing 41. The core housing 41 may be operably connected to the ear hook 500 and used for accommodating an earphone core 42. The number (or count) of the circuit housing 100 and/or the number (or the count) of the ear hook 500 may be two, respectively corresponding to the left and right sides of a user. The core housing 41 and the circuit housing 100 may be respectively disposed at two ends of the ear hook 500. The rear hook 300 may be disposed at an end of the circuit housing 100 away from the ear hook 500.

As shown in FIG. 2, the ear hook 500 may be injection molded with a first housing sheath 5210. In some embodiments, the ear hook 500 may include a first elastic metal wire for supporting the shape of the ear hook 500. An ear hook sheath 5220 may be injection-molded on the periphery of the first elastic metal wire. The ear hook sheath 5220 may form, at the connection between the ear hook 500 and the circuit housing 100, the first housing sheath 5210 that is integrally formed with the ear hook sheath 5220. In some embodiments, the first housing sheath 5210 may be located on the side of the ear hook sheath 5220 facing the circuit housing 100.

In some embodiments, a second housing sheath 3310 may be injection molded on the rear hook 300. In some embodiments, the rear hook 300 may include a second elastic metal wire for supporting the shape of the rear hook 300, and a rear hook sheath 3320 injection molded around the second clastic metal wire. The rear hook sheath 3320 may form, at the connection of the rear hook 300 and the circuit housing 100, the second housing sheath 3310 that is integrally formed with the rear hook sheath 3320. In some embodiments, the second housing sheath 3310 may be located on the side of the rear hook sheath 3320 facing the circuit housing 100.

It should be pointed out that the first housing sheath 5210 and the ear hook sheath 5220, and the second housing sheath 3310 and the rear hook sheath 3320 may all be made of soft materials with certain elasticity, such as soft silicone, rubber, etc., to provide a better touch for users to wear.

In some embodiments, the circuit housing 100, the first housing sheath 5210, and the second housing sheath 3310 may be formed separately, so that the shape of the inner side wall of the first housing sheath 5210 matches the shape of at least a portion of the outer side wall of the circuit housing 100 near the ear hook 500, and the shape of the inner side wall of the second housing sheath 3310 matches the shape of at least a portion of the outer side wall of the circuit housing 100 near the rear hook 300. After the circuit housing 100, the first housing sheath 5210, and the second housing sheath 3310 are respectively formed, the first housing sheath 5210 may be disposed, in a sheathing manner, on the periphery of the circuit housing 100 from the side of the circuit housing 100 facing the ear hook 500, and the second housing sheath 3310 may be disposed, in a sheathing manner, on the periphery of the circuit housing 100 from the side of the circuit housing 100 facing the rear hook 300. Thus, the circuit housing 100 may be covered by the first housing sheath 5210 and the second housing sheath 3310 together.

It should be noted that since the first housing sheath 5210 and the second housing sheath 3310 may be formed at a high temperature, and the high temperature environment may cause a certain damage to the control circuit or the battery contained in the circuit housing 100. Therefore, in the molding stage, the circuit housing 100, the first housing sheath 5210, and the second housing sheath 3310 may be separately molded and then assembled together, instead of molding the first housing sheath 5210 and the second housing sheath 3310 directly on the periphery of the circuit housing 100, so as to avoid damage to the control circuit or the battery caused by high temperature during integral injection molding, thereby reducing the adverse impact on the control circuit or the battery during the molding stage.

In some embodiments, the circuit housing 100 may include a main side wall 1110, an auxiliary side wall 1112, and an end wall 1113 operably connected to each other. The circuit housing 100 may be a flat housing. The flat circuit housing 100 may include the main side wall 1110 with a large area. When a user wears the loudspeaker device, the main side walls 1110 may include two side walls one of which is in contact with the head and the other one of which is opposite to the side wall and located away from the head. Both the auxiliary side wall 1112 and the end wall 1113 may be used to connect the two side walls of the main side walls 1110. The auxiliary side walls 1112 may include two side walls facing the upper and lower sides of the user's head when the user wears the loudspeaker device. The end wall 1113 may include two opposite side walls. One of the two opposite side walls of the end wall 1113 may be close to an end of the ear hook 500 and the other one of the two opposite side walls of the end wall 1113 may be close to an end of the rear hook 300. The two opposite side walls of the end wall 1113 may respectively face the front side and the back side of the user's head when the user wears the loudspeaker device. The main side wall 1110, the auxiliary side wall 1112, and the end wall 1113 may be operably connected to each other to form the circuit housing 100.

In some embodiments, the first housing sheath 5210 may include an open end 211 that extends from the circuit housing 100 toward the ear hook 500. The open end 211 may be sleeved on the circuit housing 100. The open end 211 may cover a portion of the end wall 1113 of the circuit housing 100 facing the ear hook 500, and a portion of the main side wall 1110 and the auxiliary side wall 1112 close to the ear hook 500. The second housing sheath 3310 may include an open end 311 that extends from the circuit housing 100 toward the rear hook 300. The open end 311 may be sleeved on the circuit housing 100. The open end 311 may cover a portion of the end wall 1113 of the circuit housing 100 facing the rear hook 300, and a portion of the main side wall 1110 and the auxiliary side wall 1112 close to the rear hook 300. In some embodiments, the open end 211 and the open end 311 may be operably connected to each other on the main side wall 1110 and the auxiliary side wall 1112 of the circuit housing 100 to cover the circuit housing 100.

In some embodiments, the first housing sheath 5210 and the second housing sheath 3310 may not completely cover the entire circuit housing 100. For example, at least one exposed hole may be provided at a position corresponding to a button or a position corresponding to a power interface to expose the corresponding structure and facilitate user operation.

After the first housing sheath 5210 and the second housing sheath 3310 are placed on the periphery of the circuit housing 100, the first housing sheath 5210 and the second housing sheath 3310 may be further fixed on the circuit housing 100 by a certain means, so that the circuit housing 100 is fixed with the corresponding housing sheath.

In some embodiments, the inner surfaces of the first housing sheath 5210 and the second housing sheath 3310 corresponding to the main side wall 1110 may be integrally formed with a positioning protrusion 5215 and a positioning protrusion 3315, respectively. The outer surface of the main side wall 1110 may be provided with a positioning groove 11111 and a positioning groove 11112.

The positioning protrusion 5215 may be disposed on the inner side wall close to the open end 211. The positioning protrusion 5215 may include an annular protrusion surrounding the inner side wall of the first housing sheath 5210, or may include a plurality of protrusions disposed on the inner side wall of the first housing sheath 5210 at intervals, etc., which may be set according to actual needs. In this embodiment, the number (or count) of the positioning protrusions 5215 is two. The two positioning protrusions 5215 may be respectively disposed on the inner side walls of the first housing sheath 5210 corresponding to the two side walls of the main side wall 1110 of the circuit housing 100. Similarly, the number (or count) of the positioning protrusion 3315 is two. The two positioning protrusions 3315 may be respectively disposed on the inner side walls of the second housing sheath 3310 corresponding to the two side walls of the main side wall 1110 of the circuit housing 100.

In some embodiments, after the first housing sheath 5210 and the second housing sheath 3310 are respectively sleeved on both sides of the circuit housing 100, the positioning protrusions 5215 may be further inserted into the positioning groove 11111, and the positioning protrusions 3315 may be inserted into the positioning groove 11112, so that the open end 211 of the first housing sheath 5210 and the open end 311 of the second housing sheath 3310 elastically abut together, thereby covering the circuit housing 100.

In some embodiments, the outer side wall 3313 of a region of the second housing sheath 3310 may be inclined with respect to the auxiliary side wall 1112. The region of the second housing sheath 3310 may cover the end wall 1113 of the circuit housing 100. In some embodiments, when the user wears the loudspeaker device, the outer side wall 3313 of the second housing sheath 3310 may be inclined from a side of the outer side wall 3313 close to the upper side of the user's head to a side the outer side wall 3313 close to the lower side of the user's head in a direction gradually away from the rear hook 300.

The positioning protrusion 5215 and the positioning protrusion 3315 may be arranged in strips along the open end 211 and the open end 311, respectively, and may be inclined with respect to the auxiliary side wall 1112. Further, the joint seam between the first housing sheath 5210 and the second housing sheath 3310 on the main side wall 1110 of the circuit housing 100 may be inclined with respect to the auxiliary side wall 1112. The inclination direction of the positioning protrusions 5215 and the positioning protrusions 3315, as well as the inclination direction of the joint seam of the first housing sheath 5210 and the second housing sheath 3310 on the main side wall 1110 of the circuit housing 100 may be the same as the inclination direction of the outer side wall 3313 of the region of the second housing sheath 3310 covering the end wall 1113 of the circuit housing 100, so that the appearance of the loudspeaker device is more consistent.

In some embodiments, the covering area of any one of the first housing sheath 5210 and the second housing sheath 3310 to the circuit housing 100 may be not less than one-half of the covering area of the other one to the circuit housing 100. For example, the covering area of the first housing sheath 5210 to the circuit housing 100 may be not less than one-half of the covering area of the second housing sheath 3310 to the circuit housing 100, or the covering area of the second housing sheath 3310 to the circuit housing 100 may be not less than one-half of the covering area of the first housing sheath 5210 to the circuit housing 100. The covering area of the first housing sheath 5210 to the circuit housing 100, the covering area of the second housing sheath 3310 to the circuit housing 100, and the ratio between the two covering areas may be set to other values according to requirements, for example, the two covering areas may be 50%, respectively, which is not specifically limited herein.

The circuit housing 100 and the rear hook 300 may be connected together by plugging, snapping, or the like.

In some embodiments, the rear hook 300 may include a plug end 1133 facing the circuit housing 100, and the second housing sheath 3310 may be sleeved on at least a portion of the plug end 1133. In some embodiments, the plug end 1133 may be injection molded on an end of the second elastic metal wire, and the rear hook sheath 3320 may be injection molded on the second elastic metal wire and the outer part of the plug end 1133. The second housing sheath 3310 may be integrally formed at the plug end 1133, so that the second housing sheath 3310 may be sheathed on the periphery of a region of the plug end 1133 that is not covered by the rear hook sheath 3320.

In some embodiments, the circuit housing 100 may be provided with a socket 1114 facing the rear hook 300, wherein the socket 1114 may be disposed on the end wall 1113 of the circuit housing 100 close to the rear hook 300, and formed by extending from a side of the end wall 1113 close to the auxiliary side wall 1112 to the rear hook 300.

At least a portion of the plug end 1133 may be inserted into the socket 1114. Two slots 331 may be respectively disposed on opposite sides of the plug end 1133. The two slots 331 may be perpendicular to the insertion direction of the plug end 1133 with respect to the socket 1114. The two slots 331 may be spaced and symmetrically disposed on the two sides of the plug end 1133. In some embodiments, the two slots 331 may be respectively in communication with the corresponding side wall of the plug end 1133 in a direction perpendicular to the insertion direction.

In some embodiments, the first side wall 1115 defining the socket 1114 may be provided with first through holes 151 corresponding to the positions of the two slots 331. The first side wall 1115 of the socket 1114 may be disposed on the periphery of the socket 1114 and face the lower side of the user's head when the user wears the loudspeaker device.

The loudspeaker device may include a fixing member 1153. The fixing member 1153 may include two pins 531 disposed in parallel and a connecting member 532 for connecting the pins 531. In the embodiment shown in FIG. 3, the two pins 531 may be disposed in parallel. The connecting member 532 may be vertically connected with the two pins 531 and disposed on the same side of the two pins 531 to form a U-shaped fixing member 1153.

In some embodiments, the pin 531 may be inserted from the outer side wall of the first side wall 1115 of the socket 1114 through a through hole to the slot 331, so as to block the connecting member 532 from the outside of the socket 1114, thereby realizing the connection and fixation between the circuit housing 100 and the rear hook 300.

In some embodiments, the second side wall 1116 that defines the socket 1114 and is opposite to the first side wall 1115 may be provided with a second through hole 181 opposite to the first through hole 151. The pin 531 may be inserted into the second through hole 181 through the slot 331. The second side wall 1116 may be an auxiliary side wall 1112 of the circuit housing 100 close to one side of the socket 1114. When the user wears the loudspeaker device, the auxiliary side wall 1112 may face the upper side of the user's head.

In some embodiments, the pin 531 may be inserted into the slot 331 through the first through hole 151, and may be further inserted into the second through hole 181 through the slot 331. The pin 531 may completely penetrate and connect the two opposite side walls of the plug end 1133 of the rear hook 300 and the plug end 1133, so that the connection between the circuit housing 100 and the rear hook 300 may be more stable.

In some embodiments, the plug end 1133 may be divided into a first plug section 332 and a second plug section 333 along the insertion direction of the plug end 1133 with respect to the socket 1114. In the cross-sectional direction perpendicular to the insertion direction of the plug end 1133 with respect to the socket 1114, the cross section of the first plug section 332 may be larger than the cross section of the second plug section 333.

The rear hook sheath 3320 may be injection molded on the first plug section 332 of the plug end 1133, and the second housing sheath 3310 may be integrally molded at the junction of the first plug section 332 and the second plug section 333. In some embodiments, the slot 331 may be disposed on the second plug section 333. The second plug section 333 may be inserted into the socket 1114. The plug end 1133 may be exposed to the outside of the socket 1114.

In some embodiments, the first plug section 332 may be provided with a first wiring groove 3321 disposed along the insertion direction of the plug end 1133 with respect to the socket 1114, and the outer end surface of the second plug section 333 away from the first plug section 332 may be provided with a second wiring groove 3331 extending perpendicular to the insertion direction and penetrating at least one outer side surface. In some embodiments, the first wiring groove 3321 may be disposed on the side of the first plug section 332 close to the auxiliary side wall 1112 defining the socket 1114, and penetrate through the two ends of the first plug section 332 along the insertion direction of the plug end 1133 with respect to the socket 1114. The second wiring groove 3331 may penetrate through the two outer sides of the second plug section 333 perpendicular to the extending direction of the second wiring groove 3331.

In some embodiments, the inner side wall of the socket 1114 may be provided with a third wiring groove 182 with one end communicating with the first wiring groove 3321 and the other end communicating with the second wiring groove 3331. The third wiring groove 182 may be formed by the depression of the inner surface of the second side wall 1116.

In some embodiments, the circuit housing 100 may include an inner partition wall 17 disposed inside the housing to form an accommodating cavity 18 spaced apart from the socket 1114. In some embodiments, the main side wall 1110, the auxiliary side wall 1112, and the end wall 1113 of the circuit housing 100 may jointly constitute an accommodation space, and the arrangement of the inner partition wall 17 may separate the accommodation space into an accommodating cavity 18 and a socket 1114. A wiring hole 171 may be disposed on the inner partition wall 17 so as to communicate the socket 1114 and the accommodating cavity 18 through the wiring hole 171.

The loudspeaker device may be provided with a rear hook wire 334. The rear hook wire 334 may pass through the rear hook 300, and both ends of the rear hook wire 334 may be respectively connected to the control circuit and the battery. In some embodiments, the rear hook wire 334 may sequentially pass, from the rear hook 300, through the first wiring groove 3321, the third wiring groove 182, and the second wiring groove 3331, and pass through the wiring hole 171 to enter the accommodating cavity 18 to connect with the control circuit or the battery.

In some embodiments, the ear hook 500 in the present disclosure may include ear hooks of various loudspeaker devices such as earphones, near-sighted glasses, far-sighted glasses, sunglasses, three-dimensional (3D) loudspeaker devices, etc., and is not specifically limited. In some embodiments, a functional member 80 (e.g., the speaker component 83) may be connected to the ear hook 500 through a hinge assembly 122, so that the loudspeaker device may include some other functional components or assemblies.

Further, as described in the foregoing embodiment, the speaker component 83 may include an earphone core. The earphone core and the ear hook 500 may be connected by a hinge, and the hinge may be disposed on the ear hook 500 close to one end of the earphone core.

Figure 5:
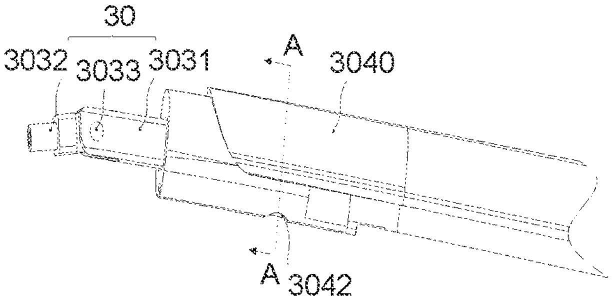
FIG. 5 is a schematic structural diagram illustrating an exemplary hinge component according to some embodiments of the present disclosure.
Figure 6:
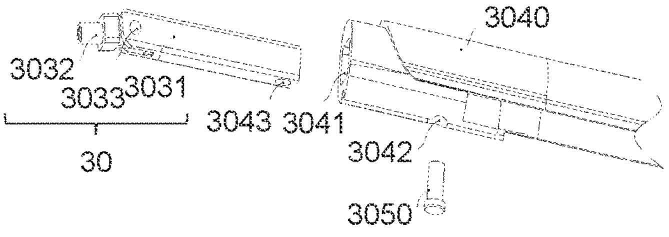
FIG. 6 is a schematic diagram illustrating an exploded view of an exemplary hinge component according to some embodiments of the present disclosure.

FIG. 5 is a schematic diagram illustrating an exemplary hinge component according to some embodiments of the present disclosure. FIG. 6 is a schematic diagram illustrating an exploded view of an exemplary hinge component according to some embodiments of the present disclosure. In some embodiments, the hinge assembly 122 of the present disclosure may be used in a loudspeaker device in some embodiment of the present disclosure.

In the present disclosure, the hinge assembly 122 may include a hinge 30. The hinge 30 may be a structure used to connect two solids and allow a relative rotation between the two solids.

In some embodiments, when the hinge assembly 122 in the embodiment is used in the embodiment of the loudspeaker device described above, the hinge assembly 122 may be disposed at an end of the ear hook 500 away from the circuit housing 100. The function member 80 may further be connected to the end of the ear hook 500 away from the circuit housing 100 via the hinge 30.

In some embodiments, the hinge assembly 122 may also include a rod-shaped member 3040 and a fixing member 3050. In some embodiments, the hinge 30 may include a hinge mount 3031 and a hinge arm 3032. In some embodiments, the hinge arm 3032 may be rotatably connected to the hinge mount 3031 via a rotating shaft 3033. It is easily understood that the hinge mount 3031 and the hinge arm 3032 may be respectively connected to two members that need to be rotatably connected. Therefore, the two members may be rotatably connected together via the rotating shaft 3033 of the hinge 30.

In some embodiments, the hinge mount 3031 of the hinge 30 may be connected to the rod-shaped member 3040. In some embodiments, the rod-shaped member 3040 may be a partial structure or an integral structure of one of the two members that are rotatably connected via the hinge 30. Alternatively, the rod-shaped member 3040 may be a connection structure that connects one of the two members that need to be rotatably connected to the hinge 30. When the hinge assembly 122 in the embodiment is used for the loudspeaker device, the rod-shaped member 3040 may be at least a portion of the ear hook 500 of the loudspeaker device. For example, the rod-shaped member 3040 may be the entirety of the ear hook 500. Alternatively, the rod-shaped member 3040 may be a portion of an end of the ear hook 500 away from the circuit housing 100. The hinge 30 may be disposed at the end of the ear hook 500 away from the circuit housing 100 via the portion of the ear hook 500.

Specifically, the rod-shaped member 3040 may be provided with a hinge chamber 3041 connected to an end surface of the rod-shaped member 3040 along the length direction. A side wall of the rod-shaped member 3040 may be provided with a first insertion hole 3042 communicating with the hinge chamber 3041. The end of the hinge mount 3031 away from the hinge arm 3032 may be inserted into the hinge chamber 3041 from the end surface of the rod-shaped member 3040, and fixed in the hinge chamber 3041 via a fixing member 3050 inserted in the first insertion hole 3042.

In the embodiment, the hinge chamber 3041 may communicate with the end surface of the ear hook 500 away from the end of the circuit housing 100. Therefore, the hinge mount 3031 is inserted into the hinge chamber 3041 and the hinge 30 is connected to the ear hook 500.

In some embodiments, the hinge chamber 3041 may be formed during a molding process of the rod-shaped member 3040. For example, the material of the rod-shaped member 3040 may be rubber or plastic. At this time, the hinge chamber 3041 may be formed by injection molding. The shape of the hinge chamber 3041 may match the hinge mount 3031 so that the hinge mount 3031 may be accommodated inside the hinge chamber 3041. In the embodiment, the ear hook 500 may have the shape of a long straight rod along the length direction. Correspondingly, the rod-shaped member 3040 may be a straight rod along the length direction, and the hinge chamber 3041 may be disposed inside the straight rod. Further, the hinge mount 3031 may match the hinge chamber 3041 to be accommodated inside the hinge chamber 3041 to implement the installation of the hinge 30. Of course, in other embodiments, the rod-shaped member 3040 may also have other shapes such as an arc-shaped rod.

In addition, the first insertion hole 3042 may be formed during the molding process of the rod-shaped member 3040, or may be further formed on a side wall of the rod-shaped member by a manner such as drilling after the molding process. Specifically, in the embodiment, the shape of the first insertion hole 3042 may be a circle, and may be other shapes such as a square or a triangle in other embodiments. The shape of the fixing member 3050 may match the first insertion hole 3042 so that the fixing member 3050 may be inserted into the first insertion hole 3042 from the outside of the rod-shaped member 3040. Further, the hinge mount 3031 may be fixed inside the hinge chamber 3041 by abutting the side wall of the hinge mount 3031 or further penetrating the outer wall of the hinge mount 3031 in a plugging manner. Specifically, a matching thread may be provided on the inner wall of the first insertion hole 3042 and the outer wall of the fixing member 3050. Therefore, the fixing member 3050 may be connected to the first insertion hole 3042 in a screwing manner to further fix the hinge mount 3031 inside the hinge chamber 3041. Of course, other manners may also be used, such as connecting the first insertion hole 3042 and the fixing member 3050 in an interference fit manner.

Further, the hinge arm 3032 may also be connected to other components. Therefore, after the other components are connected to the hinge arm 3032, the other components and the rod-shaped member 3040 or other components connected to the rod-shaped member 3040 may further rotate around the rotating shaft 3033 by mounting the hinge mount 3031 inside the hinge chamber 3041. For example, when the hinge assembly 122 is used in the loudspeaker device, the function member 80 (e.g., the speaker component 83) may be connected to the end of the hinge arm 3032 away from the hinge mount 3031. Therefore, the function member 80 may be connected to the end of the ear hook 500 away from the circuit housing 100 via the hinge 30.

In the above manner, the rod-shaped member 3040 may be provided with the hinge chamber 3041 communicating with the end surface of the rod-shaped member 3040. The hinge 30 may be accommodated inside the hinge chamber 3041 via the hinge mount 3031. The fixing member 3050 may further penetrate the side wall of the rod-shaped member 3040 via the first insertion hole 3042. Therefore, the hinge mount 3031 accommodated inside the hinge chamber 3041 may be fixed inside the hinge chamber 3041. Therefore, the hinge 30 may be detached relative to the rod-shaped member 3040 to facilitate the replacement of the hinge 30 or the rod-shaped member 3040. When applied to the loudspeaker device in the embodiment of the present disclosure described above, the hinge 30 and the function member 80 may be detachable relative to the ear hook 500. Therefore, it may be easy to replace when the function member 80, the circuit housing 100, or the ear hook 500 is damaged.

Further, referring to FIG. 6, in some embodiments, the hinge mount 3031 may be provided with a second insertion hole 3043 corresponding to the first insertion hole 3042. The fixing member 3050 may be further inserted into the second insertion hole 3043.

Specifically, the shape of the second insertion hole 3043 may match the fixing member 3050, so that the fixing member 3050 may be further inserted into the second insertion hole 3043 to fix the hinge mount 3031 after passing through the first insertion hole 3042. Therefore, the shaking of the hinge mount 3031 inside the hinge chamber 3041 may be reduced and the hinge 30 may be fixed more firmly. Specifically, similar to the connection manner of the first insertion hole 3042 and the fixing member 3050, the inner wall of the second insertion hole 3043 may be provided with a matching thread corresponding to the outer wall of the fixing member 3050. Therefore, the fixing member 3050 and the hinge mount 3031 may be screwed together. Alternatively, the inner wall of the second insertion hole 3043 and the outer wall of a corresponding contact position of the fixing member 3050 may be smooth surfaces. Therefore, the fixing member 3050 and the second insertion hole 3043 may be in an interference fit, and be not specifically limited herein.

Further, the second insertion hole 3043 may penetrate both sides of the hinge mount 3031, so that the fixing member 3050 may further penetrate the entire hinge mount 3031. The hinge mount 3031 may be more firmly fixed inside the hinge chamber 3041.

Figure 7:
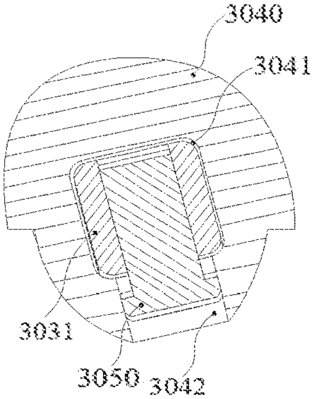
FIG. 7 illustrates a sectional view of the hinge component in FIG. 5 along an A-A axis according to some embodiments of the present disclosure.

Further, referring to FIG. 7. FIG. 7 illustrates a sectional view of the hinge component in FIG. 5 along an A-A axis according to some embodiments of the present disclosure. In the embodiment, a cross-sectional shape of the hinge mount 3031 may match a cross-sectional shape of the hinge chamber 3041 in a section perpendicular to the longitudinal direction of the rod-shaped member 3040. Therefore, the hinge mount 3031 and the rod-shaped member 3040 may form a tight fit after the insertion.

In some embodiments, the cross-sectional shape of the hinge mount 3031 and the cross-sectional shape of the hinge chamber 3041 may include any shape in the section shown in FIG. 7, as long as the hinge mount 3031 is inserted into the hinge chamber 3041 from an end surface of the rod-shaped member 3040 away from the hinge arm 3032. Further, the first insertion hole 3042 may be disposed on a side wall of the hinge chamber 3041, and pass through the side wall of the hinge chamber 3041 and communicate with the hinge chamber 3041.

In an application scenario, the cross-sectional shape of the hinge mount 3031 and the cross-sectional shape of the hinge chamber 3041 may have a rectangular shape. The first insertion hole 3042 may be perpendicular to one side of the rectangle.

Specifically, in the application scenario, a corner angle of the outer wall of the hinge mount 3031 or an angle of the inner wall of the hinge chamber 3041 may be further in a fillet set to make contact between the hinge mount 3031 and the hinge chamber 3041 smoother. Therefore, the hinge mount 3031 may be smoothly inserted into the hinge chamber 3041.

It should be further pointed out that an amount of gas may be stored in the hinge chamber 3041 before the hinge 30 is assembled. Therefore, if the hinge chamber 3041 is a chamber with an open at only one end, the assembly of the hinge mount 3031 may not be facilitated due to the difficulty in exhausting the gas inside the hinge chamber 3041 during the assembly process. In the embodiment, the first insertion hole 3042 may penetrate the side wall of the hinge chamber 3041 and communicate with the hinge chamber 3041 which may assist in exhausting the inner gas from the first insertion hole 3042 through the hinge chamber 3041 during the assembly, thereby facilitating the normal assembly of the hinge 30.

Figure 8:
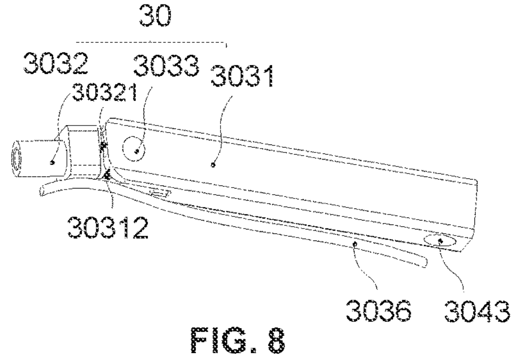
FIG. 8 is a schematic structural diagram illustrating a hinge component according to some embodiments of the present disclosure.
Figure 9:
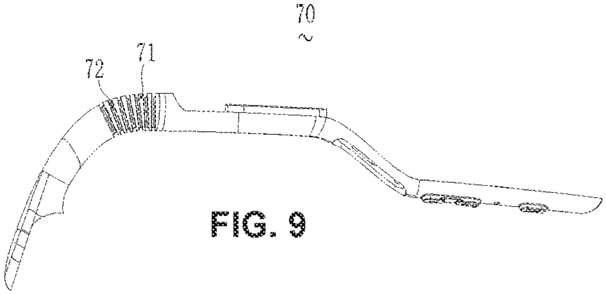
FIG. 9 is a diagram illustrating an original state of a protective sleeve of a hinge component according to some embodiments of the present disclosure.

Further referring to FIG. 8, FIG. 8 is a schematic structural diagram illustrating a hinge component according to some embodiments of the present disclosure. In the embodiment of the present disclosure, the hinge assembly 122 may further include a connection wire 3036 disposed outside the hinge 30.

In some embodiments, the connection wire 3036 may be a connection wire 3036 having an electrical connection function and/or a mechanical connection function. When applied to the loudspeaker device in the embodiment of the present disclosure described above, the hinge assembly 122 may be used to connect the function member 80 to the end of the ear hook 500 away from the circuit housing 100. A control circuit and the like related to the function member 80 may be disposed on the ear hook 500. At this time, the connection wire 3036 may be required to electrically connect the function member 80 to the control circuit and the like of the ear hook 500. Specifically, the connection wire 3036 may be located at one side of the hinge mount 3031 and the hinge arm 3032, and disposed in the same accommodation space with the hinge 30.

Further, the hinge mount 3031 may include a first end surface 30312. The hinge arm 3032 may have a second end surface 30321 disposed opposite the first end surface 30312. It is easily understood that there is a gap between the first end surface 30312 and the second end surface 30321. Therefore, the hinge mount 3031 and the hinge arm 3032 may be relatively rotated around the rotating shaft 3033. In the embodiment, during the relative rotation of the hinge arm 3032 and the hinge mount 3031, relative positions between the first end surface 30312 and the second end surface 30321 may also change. Therefore, the gap between thereof may become larger or smaller.

In the embodiment, the gap between the first end surface 30312 and the second end surface 30321 may always be kept larger than or less than the diameter of the connection wire 3036. Therefore, the connection wire 3036 located outside the hinge 30 may not be inserted into the gap between the first end surface 30312 and the second end surface 30321 during the relative rotation of the hinge mount 3031 and the hinge arm 3032, thereby reducing the damage to the connection wire 3036 by the hinge. Specifically, during the relative rotation of the hinge arm 3032 and the hinge mount 3031, the ratio of the gap between the first end surface 30312 and the second end surface 30321 to the diameter of the connection wire 3036 may always be kept greater than 1.5 or less than 0.8, for example, greater than 1.5, 1.7, 1.9, 2.0, etc., or less than 0.8, 0.6, 0.4, 0.2, etc., and be not specifically limited herein.

Figure 11:
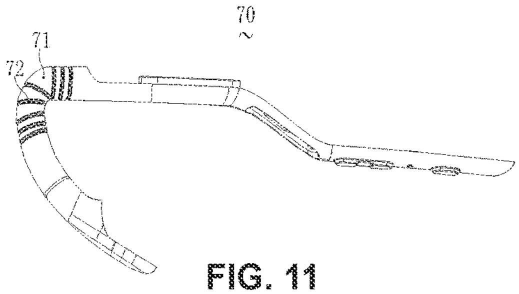
FIG. 11 is a diagram illustrating a bent state of a protective sleeve of a hinge component according to some embodiments of the present disclosure.
Figure 10:
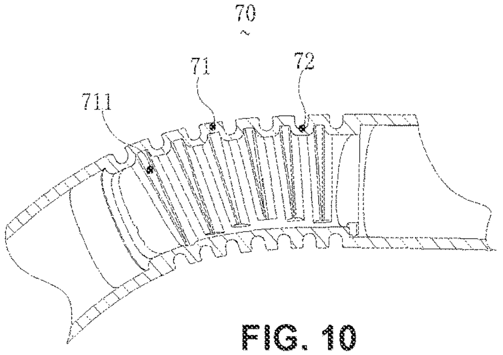
FIG. 10 illustrates a partial sectional view of an original state of a protective sleeve of a hinge component according to some embodiments of the present disclosure.
Figure 12:
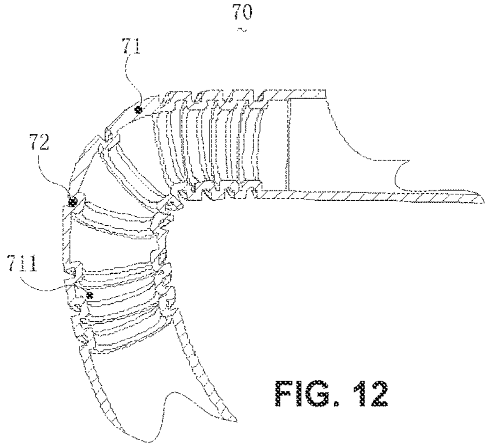
FIG. 12 illustrates a partial sectional view of a bent state of a protective sleeve of a hinge component according to some embodiments of the present disclosure.

Further referring to FIG. 5, and FIG. 9 to FIG. 12, FIG. 9 is a diagram illustrating an original state of a protective sleeve of a hinge component according to some embodiments of the present disclosure. FIG. 10 illustrates a partial sectional view of an original state of a protective sleeve of a hinge component according to some embodiments of the present disclosure. FIG. 11 is a diagram illustrating a bent state of a protective sleeve of a hinge component according to some embodiments of the present disclosure. FIG. 12 illustrates a partial sectional view of a bent state of a protective sleeve of a hinge component according to some embodiments of the present disclosure. In the embodiment, the hinge assembly 122 may also include a protective sleeve 70.

Specifically, the protective sleeve 70 may be disposed on the periphery of the hinge 30 and bent along with the hinge 30. In some embodiments, the protective sleeve 70 may include a plurality of annular ridge portions 71 spaced apart along the length direction of the protective sleeve 70 and annular connection portions 72 disposed between the annular ridge portions 71 and used to connect each two adjacent annular ridge portions. In some embodiments, the tube wall thickness of the annular ridge portion 71 may be greater than the tube wall thickness of the annular connection portion 72.

In some embodiments, the length direction of the protection sleeve 70 may be consistent with the length direction of the hinge 30. The protection sleeve 70 may be disposed along the length direction of the hinge mount 3031 and the hinge arm 3032. The protective sleeve 70 may be made of a soft material, such as soft silicone, rubber, etc.

Further, the outer sidewall of the protective sleeve 70 may protrude outwardly to form the annular ridge portion 71. The shape of the inner sidewall of the protective sleeve 70 corresponding to the annular ridge portion 71 may not be specifically limited herein. For example, the inner wall may be smooth, or a recession may be disposed on the position of the inner wall corresponding to the annular ridge portion 71.

Further, the annular connection portion 72 may be used to connect the adjacent annular ridge portions 71, specifically connected to an edge region of the annular ridge portion 71 near the inside of the protective sleeve 70. Therefore, the annular connection portion 72 may recess relative to the annular ridge portion 71 at a side of the outer wall of the protective sleeve 70.

Specifically, the count of the annular ridge portions 71 and the count of the annular connection portions 72 may be determined according to actual use conditions, for example, according to the length of the protective sleeve 70, the width of the annular ridge 71 and the width of the annular connection portion 72 in the longitudinal direction of the protective sleeve 70, or the like.

Further, the tube wall thickness of the annular ridge portion 71 and the tube wall thickness of the annular connection portion 72 refer to the thickness between the inner wall and the outer wall of the protective sleeve 70 corresponding to the annular ridge portion 71 and the annular connection portion 72, respectively. In the embodiment, the tube wall thickness of the annular ridge portion 71 may be greater than the tube wall thickness of the annular connection portion 72.

It should be easily understood when the hinge mount 3031 and the hinge arm 3032 of the hinge 30 are relatively rotated around the rotating shaft 3033, the angle between the hinge mount 3031 and the hinge arm 3032 may change so that the protective sleeve 70 is bent as shown in FIGS. 11 and 12. Specifically, when the protective sleeve 70 is bent with the hinge 30, the annular ridge portion 71 and the annular connection portion 72 located in an outer region of the bent shape formed by the protective sleeve 70 may be in a stretched state, while the annular ridge portion 71 and the annular connection portion 72 located in an inner region of the bent shape may be in a compressed state.

In the embodiment, the tube wall thickness of the annular ridge portion 71 may be greater than the tube wall thickness of the annular connection portion 72. Therefore, the annular ridge portion 71 may be more rigid than the annular connection portion 72. Therefore, when the protective sleeve 70 is in the bent state, the protective sleeve 70 at the outer side of the bent shape may be in the stretched state. The annular ridge portion 71 may provide a strength support for the protective sleeve 70. At the same time, a region of the protective sleeve 70 at the inner side in the bent state may be compressed. The annular ridge portion 71 may also withstand a compression force, thereby protecting the protective sleeve 70, improving the stability of the protective sleeve 70, and extending the life of the protective sleeve 70.

Further, it should be noted that the shape of the protective sleeve 70 may be consistent with the state of the hinge 30. In one application scenario, both sides of the protective sleeve 70 along the length direction and rotating around the rotating shaft may be stretched or compressed. In another application scenario, the hinge mount 3031 and the hinge arm 3032 of the hinge 30 may rotate around the rotating shaft 3033 only within a range less than or equal to 180 degree. That is, the protective sleeve 70 may only be bent toward one side. One side of the two sides of the protective sleeve 70 in the length direction may be compressed, and the other side may be stretched. At this time, according to different forces on the two sides of the protective sleeve 70, the two sides of the protective sleeve 70 under the different forces may have different structures.

In some embodiments, when the protective sleeve 70 is in the bent state, the width of the annular ridge portion 71 along the longitudinal direction of the protective sleeve 70 toward the outer side of the bent shape formed by the protective sleeve 70 may be greater than the width along the length of the protective sleeve 70 towards the inside of the bent shape.

In some embodiments, an increment of the width of the annular ridge portion 71 along the length direction of the protective sleeve 70 may further increase the strength of the protective sleeve. Meanwhile, in the embodiment, an original included angle between the hinge mount 3031 and the hinge arm 3032 may be less than 180 degree. At this time, if the annular ridge portions 71 of the protective sleeve 70 are uniformly disposed, the protective sleeve 70 may be compressed in the original state. In the embodiment, the width of the annular ridge portion 71 corresponding to one side of the outer region of the bent shape in the bent state may be relatively large, so that the length of the side of the protective sleeve 70 may increase. Therefore, during the increment of the strength of the protective sleeve 70, a stretching degree of the stretching side may be reduced when the protective sleeve 70 is bent. At the same time, the width of the annular ridge portion 71 along the longitudinal direction of the protective sleeve 70 toward the side of the inner region of the bent shape may be relatively small when the protective sleeve 70 is in the bent state, which may increase a space of the compressed annular connection portion 72 in the length direction of the protective sleeve 70, and alleviate the compression of the compressed side.

Further, in an application scenario, the width of the annular ridge portion 71 may gradually decrease from the side of the outer region towards the bent shape to the side of the inner region towards the bent shape. Therefore, the width toward the side of the outer region of the bent shape formed by the protective sleeve 70 may be greater than the width toward the side of the inner region of the bent shape when the protective sleeve 70 is in the bent state.

It should be easily understood that the annular ridge portions 71 are disposed around the periphery of the protective sleeve 70. In the length direction of the protective sleeve 70, one side may correspond to the stretched side, and the other side may correspond to the compressed side. In the embodiment, the width of the annular ridge portion 71 may gradually decrease from the side of the outer region towards the bent shape to the side of the inner region towards the bent shape, so that the width may be more uniform, which may improve the stability of the protective sleeve 70.

In some embodiments, the annular ridge portion 71 may be disposed with a groove 711 on an inner ring surface inside the protective sleeve 70 at the side of the outer region of the bent shape formed by the protective sleeve 70 when the protective sleeve 70 is in the bent state.

Specifically, the groove 711 in the embodiment may be disposed along a direction perpendicular to the length direction of the protective sleeve 70. Therefore, the corresponding annular ridge portion 71 may be appropriately extended in the length direction when the protective sleeve 70 is stretched.

As described above, when the protective sleeve 70 is in the bent state, the protective sleeve 70 towards the outer side of the bent shape formed by the protective sleeve 70 may be in the stretched state. In the embodiment, the groove 711 may be further disposed on the inner ring surface inside the protective sleeve 70 corresponding to the corresponding annular ridge portion 71. Therefore, the annular ridge portion 71 corresponding to the groove 711 may be appropriately extended to bear a portion of the stretch when the protective sleeve is stretched at the side, thereby reducing a tensile force experienced by the protective sleeve at the side, and protecting the protective sleeve 70.

It should be noted that the inner wall of the protective sleeve 70 corresponding to the annular ridge portion 71 at the side towards the inner region of the bent shape may not be disposed with the groove 711 when the protective sleeve 70 is in the bent state. In some embodiments, the width of the groove 71 along the length of the protective sleeve 70 may gradually decrease from the side of the outer region towards the bent shape to the side of the inner region towards the bent shape. Therefore, no groove 711 may be disposed on the inner side wall of the protective sleeve 70 corresponding to the annular ridge portion 71 towards the inner region side of the bent shape.

Specifically, when the hinge assembly 122 in the embodiment is applied to the loudspeaker device in the embodiment of the present disclosure described above, the protective sleeve 70 may be connected to the ear hook s 500 disposed at both sides in the length direction of the protective sleeve 70, respectively, and connected to the function member 80. In an application scenario, the protective sleeve 70 may also be integrally formed as other structures of the loudspeaker device, such as protective covers of some components, so that the loudspeaker device may be more sealed and integrated.

It should be noted that the hinge assembly 122 in the embodiment of the present disclosure may not only be used in the loudspeaker device in the embodiment of the present disclosure, but also be used in other devices. Moreover, the hinge assembly 122 may also include other components related to the hinge 30 other than the rod-shaped member 3040, the fixing member 3050, the connection wire 3036, the protective sleeve 70, etc. to achieve corresponding functions.

Figure 13:
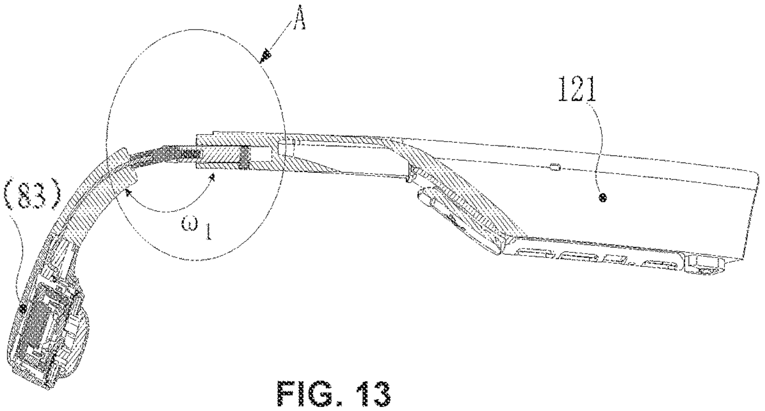
FIG. 13 illustrates a partial sectional view of a loudspeaker device according to some embodiments of the present disclosure.
Figure 14:
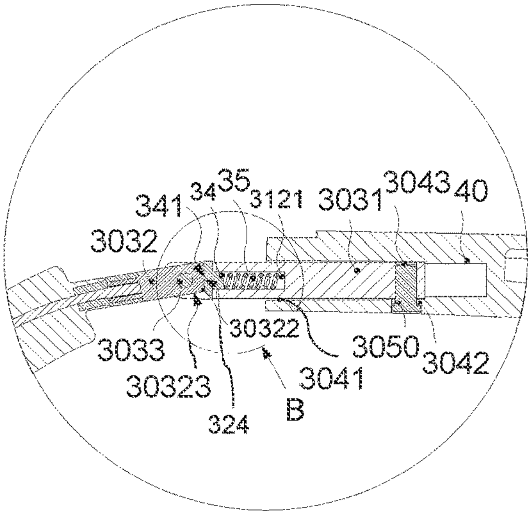
FIG. 14 illustrates an enlarged view of part A in FIG. 13.
Figure 15:
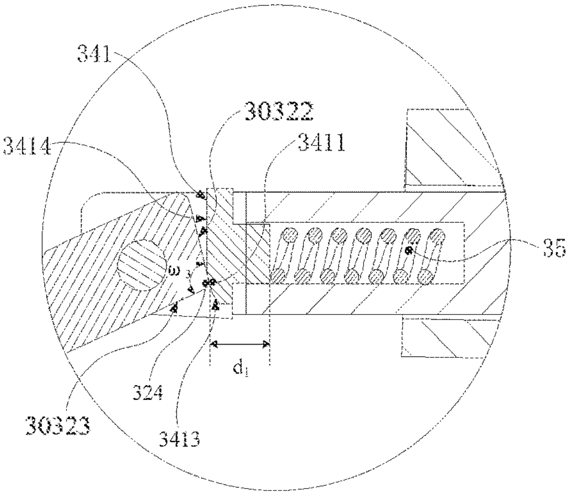
FIG. 15 illustrates an enlarged view of part B in FIG. 14.
Figure 16:
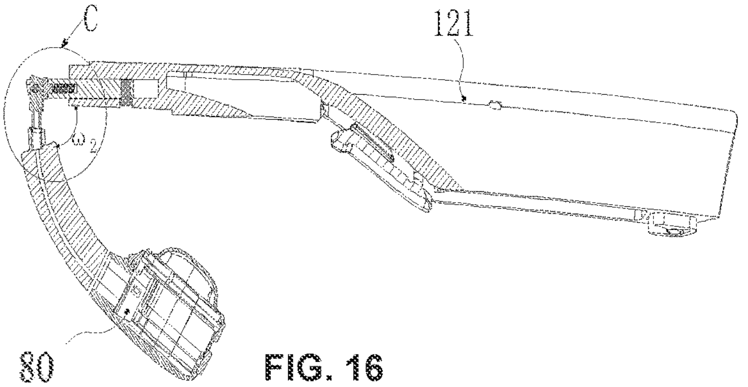
FIG. 16 illustrates a partial sectional view of a hinge according to some embodiments of the present disclosure.
Figure 17:
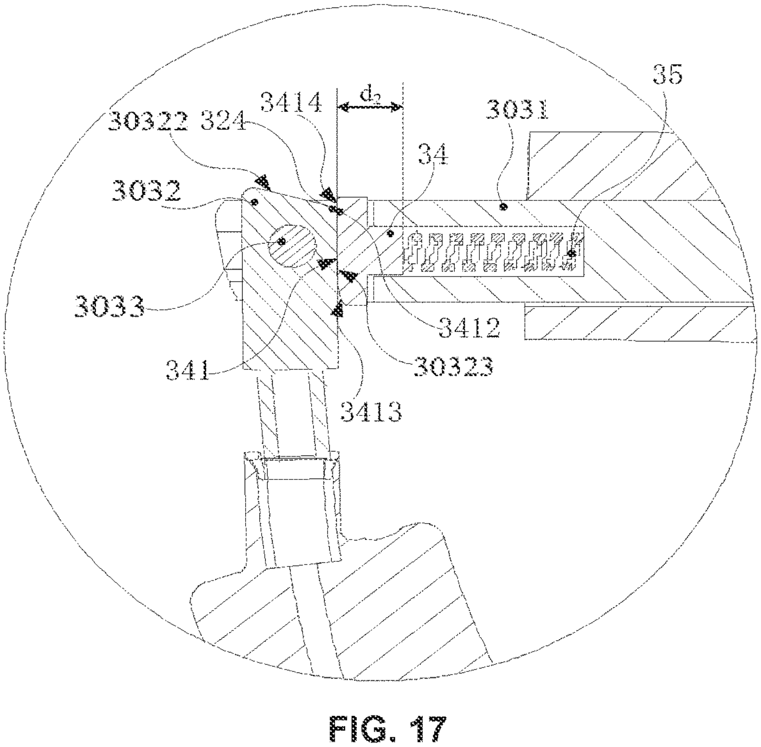
FIG. 17 illustrates an enlarged view of part C in FIG. 16.

Specifically, further referring to FIG. 13 to FIG. 17 together, FIG. 13 illustrates a partial sectional view of a loudspeaker device according to some embodiments of the present disclosure. FIG. 14 illustrates an enlarged view of part A in FIG. 13. FIG. 15 illustrates an enlarged view of part B in FIG. 14. Specifically, FIG. 15 shows an enlarged view of part B in FIG. 14 when the abutting between a first support surface and a third support surface is changed to the abutting between a second support surface and the third support surface so that a connection between the first support surface and the second support surface initially touches the third support surface. FIG. 16 illustrates a partial sectional view of a hinge according to some embodiments of the present disclosure. FIG. 17 illustrates an enlarged view of part C in FIG. 16. It should be noted that the hinge 30 in the embodiment of the present disclosure may be used in the loudspeaker device in the embodiment of the present disclosure. The hinge 30 may be used in the hinge assembly 122 in the embodiments of the present disclosure, or used in other devices, and be not specifically limited herein.

In the embodiment, the hinge arm 3032 of the hinge 30 may have a first support surface 30322 and a second support surface 30323 connected to each other.

The hinge 30 may also include a support member 34 and an elastic member 35. The support member 34 may be flexibly disposed on the hinge mount 3031 and have a third support surface 30341. The clastic member 35 may be used to elastically offset the support member 34 toward the hinge arm 3032, so that the third support surface 30341 may elastically abut on the first support surface 30322 and the second support surface 30323, respectively.

In some embodiments, when the hinge arm 3032 is rotated relative to the hinge mount 3031 under an external force, a connection 324 of the first support surface 30322 and the second support surface 30323 may drive the support member 34 against the clastic offset of the elastic member 35 to move in the opposite direction. Therefore, the third support surface 30341 may be switched from elastically abutting on one of the first support surface 30322 and the second support surface 30323 to elastically abutting on the other of the first support surface 30322 and the second support surface 30323.

In an application scenario, the support member 34 may be connected to an end of the clastic member 35 towards the hinge arm 3032. The third support surface 30341 may face the side toward the hinge arm 3032. In the process that the hinge arm 3032 is rotated relative to the hinge mount 3031 around the rotating shaft 3033 under the external force, the third support surface 30341 may be pushed so that the support member 34 may compress the elastic member 35. Further, the elastic offset may occur under the action of the clastic member 35. Of course, the clastic member 35 may be disconnected to the support member 34, and only abut on one side of the support member 34 as long as the support member 34 implements the clastic offset.

In some embodiments, the first support surface 30322 and the second support surface 30323 may be two side surfaces adjacent to the hinge arm 3032 and at least partially parallel to the central axis of the rotating shaft 3033, or a portion of the two side surfaces. When the hinge arm 3032 rotates relative to the hinge mount 3031, the first support surface 30322 and the second support surface 30323 may rotate with the hinge arm 3032 around the rotating shaft 3033. Therefore, different side surfaces of the hinge arm 3032 may face the hinge mount 3031. Thus, the hinge arm 3032 may have different positions relative to the hinge mount 3031.

In addition, the clastic member 35 may be a member that may provide an elastic force and be compressed in an elastic direction to provide a compression space. For example, the elastic member 35 may include a spring. One end of the spring may abut on the support member 34. When the third support surface 30341 of support member 34 is pushed toward the clastic member 35, the elastic member 35 may be against the support member 34 and be compressed to provide a space in a direction that the third support surface 30341 of the support member 34 faces. Therefore, when a relative position of the rotating shaft 3033 is unchanged, there may be still enough space for different sides of the hinge arm 3032 to rotate between the rotating shaft 3033 and the third support surface 30341.

Specifically, when the hinge arm 3032 rotates relative to the hinge mount 3031, the relative position of the rotating shaft 3033 may be unchanged. A contact position of the hinge arm 3032 and the third support surface 30341 of the hinge mount 3031 may change. Since distances between different positions of the hinge arm 3032 and the rotating shaft 3033 are different, the required space between the rotating shaft 3033 and the contact position of the hinge arm 3032 and the third support surface 30341 may be different when different positions of the hinge arm 3032 (e.g., different positions of the first support surface 30322 and the second support surface 30323) contact the third support surface 30341. Due to the limitation of the elastic force and the space, the space provided by the compression of the clastic member 35 may be limited. Therefore, during the rotation of the hinge arm 3032 relative to the hinge mount 3031, if a distance between a position of the hinge arm 3032 and the rotating shaft 3033 is too large in a section perpendicular to the central axis of the rotating shaft 3033, the position may be locked at another position of the third support surface during the rotation process, so that the hinge arm 3032 may not continue to rotate. Therefore, the hinge arm 3032 and the hinge mount 3031 only rotates relatively within a range. In an application scenario, during the relative rotation between the hinge arm 3032 and the hinge mount 3031 around the rotating shaft 3033, only the first support surface 30322, the second support surface 30323, and a region corresponding to the connection 324 between the first support surface 30322 and the second support surface 30323 may abut on the third support surface 30341.

Further, in the embodiment, the first support surface 30322 and the second support surface 30323 may both be planes. A distance from the rotating shaft 3033 to the connection 324 of the two support surfaces may be greater than a distance from the rotating shaft 3033 to the first support surface 30322 and a distance to the second support surface 30323. The hinge 30 may have two relatively stable states that the third support surface 30341 abuts on the first support surface 30322 and the third support surface 30341 abuts on the second support surface 30323.

Of course, in the embodiment, the first support surface 30322 and the second support surface 30323 may also be curved surfaces with a radian or even include different sub-support surfaces, as long as a positional relationship between the hinge arm 3032 and the hinge mount 3031 may have at least two corresponding relatively stable states, and be not specifically limited herein. In addition, the hinge arm 3032 may be disposed with more support surfaces. The hinge arm 3032 and the hinge mount 3031 may have various relative positional relationships by the different support surfaces elastically abutting on the third support surface 30341 when the hinge arm 3032 rotates relative to the hinge mount 3031 around the rotating shaft 3033 under an external force, and be not specifically limited herein.

Specifically, as shown in FIG. 14 and FIG. 15, an original state that the first support surface 30322 abuts on the third support surface 30341 of the support member 34 may be taken as an example. At this time, the elastic member 35 may have an elastic compression deformation, or be in an original natural state, and be not limited herein. When the hinge 30 is subject to an external force, the hinge arm 3032 may rotate relative to the hinge mount 3031 around the rotating shaft 3033, so that the second support surface 30323 gradually approaches the third support surface 30341. In this case, the connection 324 between the first support surface 30322 and the second support surface 30323 may touch the third support surface 30341. Since the distance from the connection 324 to the rotating shaft 3033 may be greater than the distance from the first support surface 30322 to the rotating shaft 3033, the connection 324 may abut on the support member 34 and push the support member 34 move toward the clastic member 35, thereby allowing the clastic member 35 against the pull to compress. When the hinge arm 3032 is further stressed, the connection 324 may gradually approach a region between the rotating shaft 3033 and the third support surface 30341. In the process, the distance between the rotating shaft 3033 and the third support surface 30341 may gradually increase. It should be easily understood when a connection line between the connection 324 and the rotating shaft 3033 is perpendicular to the third support surface 30341, the distance from the rotating shaft 3033 to the third support surface 30341 may be equal to the distance from the rotating shaft 3033 to the connection 324 in a section perpendicular to the central axis of the rotating shaft 3033. At this time, the rotating shaft 3033 may be farthest from the third support surface 30341. At this time, if the force is continuously applied to the hinge 30, the distance from the rotating shaft 3033 to the third support surface 30341 may gradually become smaller, so that the required compression space of the clastic member 35 may be reduced. Then the clastic member 35 may gradually release the clastic force and recover until the connection 324 leaves the third support surface 30341 and the second support surface 30323 abuts on the third support surface 30341, thereby switching from abutting the first support surface 30322 on the third support surface 30341 to abutting the second support surface 30323 on the third support surface 30341.

Similarly, the process (as shown in FIG. 16 and FIG. 17) for switching from an original state that the second support surface 30323 abuts on the third support surface 30341 of the support member 34 to a state that the first support surface 30322 abuts on the third support surface 30341 of the support member 34 may be similar to the above process.

It should be noted that the hinge 30 in the embodiment may be applied to the hinge assembly 122 in the embodiment of the present disclosure. In one embodiment, the function member 80 may be the speaker component 83. In some embodiments, when the third support surface 30341 is switched from elastically abutting on one of the first support surface 30322 and the second support surface 30323 to elastically abutting on the other of the first support surface 30322 and the second support surface 30323, the hinge assembly 122 may drive the speaker component 83 to switch between a first relatively fixing position and a second relatively fixing position relative to the ear hook 500. The hinge assembly 122 may fit on the back of an auricle of the user when the speaker component 83 is in the first relatively fixing position. As used herein, the auricle may be a portion of an external ear and mainly composed of cartilage. In some embodiments, the speaker component 83 may include a bone conduction speaker component 83. By fitting the speaker component 83 to the back of the auricle, the cartilage of the auricle may be used to transmit bone conduction sound/vibration. The speaker component 83 may be fitted to the back of the auricle, thereby improving the sound quality and reducing the impact on an ear canal during the sound transmission.

It should be noted that the distance from the rotating shaft 3033 to the connection 324 may be greater than a vertical distance from the first support surface 30322 and the second support surface 30323. Therefore, in the process that the third support surface 30341 is switched from elastically abutting on one of the first support surface 30322 and the second support surface 30323 to elastically abutting on the other of the first support surface 30322 and the second support surface 30323, the state of the hinge 30 may change abruptly.

The switch from elastically abutting between the first support surface 30322 and the third support surface 30341 to elastically abutting between the second support surface 30323 and the third support surface 30341 may be taken as an example. When a ratio between the maximum distance $h_1$ from the rotating shaft 3033 to the connection 324 and the shortest distance $h_2$ from the rotating shaft 3033 to the first support surface 30322 is different, the change during the switching process may be different.

In some embodiments, the ratio between the maximum distance h1 from the rotating shaft 3033 to the connection 324 and the shortest distance h2 from the rotating shaft 3033 to the first support surface 30322 may be between 1.1 and 1.5 in the section perpendicular to the central axis of the rotating shaft 3033.

Specifically, the maximum distance $h_1$ from the rotating shaft 3033 to the connection 324 may be larger than the shortest distance $h_2$ of the rotating shaft 3033 to the first support surface 30322 by disposing the rotating shaft 3033 away from the second support surface 30323 and close to the side of the hinge arm 3032 opposite to the second support surface 30323, thereby satisfying the ratio described above.

It should be noted that the change may become obvious when the ratio between $h_1$ and $h_2$ is too large. However, a large force may be needed to switch from elastically abutting between the first support surface 30322 and the third support surface 30341 to elastically abutting between the second support surface 30323 and the third support surface 30341, thereby causing inconvenience. If the ratio between $h_1$ and $h_2$ is too small, although it is easier to switch the state, the change may be small. For example, when the user pulls the hinge 30, there may be no obvious handle sense, causing inconvenience. In the embodiment, the ratio of $h_1$ to $h_2$ may be set between 1.1 and 1.5, and the hinge 30 may have a more obvious change when the third support surface 30341 is switched from elastically abutting on the first support surface 30322 to elastically abutting on the second support surface 30323. Thus, during use, the user may have a relatively obvious handle sense of pulling the hinge 30. At the same time, the change may not be too abrupt to making it difficult for the user to switch the state of the hinge 30.

In an application scenario, the ratio of $h_1$ to he may also be between 1.2 and 1.4. Specifically, the ratio of $h_1$ to $h_2$ may also be 1.1, 1.2, 1.3, 1.4, 1.5, etc., and be not specifically limited herein.

In addition, the positions of the first support surface 30322 and the second support surface 30323 set on the hinge arm 3032 may affect the included angle between the hinge arm 3032 and the hinge mount 3031 when the third support surface 30341 abuts on one of the first support surface 30322 and the second support surface 30323. Therefore, the positions of the first support surface 30322 and the second support surface 30323 on the hinge arm 3032 may be set differently according to specific user requirements. In some embodiments, the included angle between the hinge arm 3032 and the hinge mount 3031 may be specifically shown in FIG. 12 and FIG. 15. Angle ω1 may be the included angle between the hinge arm 3032 and the hinge mount 3031 when the third support surface 30341 abuts on the first support surface 30322. Angle ω2 may be the included angle between the hinge arm 3032 and the hinge mount 3031 when the third support surface 30341 abuts on the second support surface 30323. In some embodiments, each of the hinge arm 3032 and the hinge mount 3031 may have a length. The hinge arm 3032 may be disposed on one end side of the hinge mount 3031 in the length direction. The first support surface 30322 may be disposed at the end of the hinge arm 3032 near the hinge mount 3031 in the length direction. The second support surface 30323 may be disposed at one end in the width direction of the hinge arm 3032 and parallel to the central axis of the rotating shaft 3033. At this time, when the third support surface 30341 elastically abuts on the first support surface 30322, the included angle between the hinge arm 3032 and the hinge mount 3031 may be the largest. When the third support surface 30341 elastically abuts on the second support surface 30323, the included angle between the hinge arm 3032 and the hinge mount 3031 may be the smallest. Therefore, the included angle between the hinge mount 3031 and the hinge arm 3032 may be changed from ω1 to ω2 and become smaller when the third support surface 30341 is switched from elastically abutting on the first support surface 30322 to elastically abutting on the second support surface 30323.

It should to be further noted if the direction of the force applied to the hinge arm 3032 is the same as the direction of the gravity of the hinge arm 3032 when the third support surface 30341 is switched from elastically abutting on the first support surface 30322 to elastically abutting on the second support surface 30323, the switching in this state may make the included angle between the hinge mount 3031 and the hinge arm 3032 smaller. The setting of the ratio between the $h_1$ and $h_2$ in the embodiment may also make the hinge arm 3032 not or hardly reduce the angle between the hinge arm 3032 and the hinge mount 3031 spontaneously due to the own gravity when the third support surface 30341 elastically abut on the first support surface 30322.

In some embodiments, referring to FIG. 15, the included angle $\omega_3$ between the first support surface 30322 and the second support surface 30323 may be an obtuse angle in a section perpendicular to the central axis of the rotating shaft 3033.

In some embodiments, when the hinge 30 switches from the state of elastically abutting between the first support surface 30322 and the third support surface 30341 to the state of elastically abutting between the second support surface 30323 and the third support surface 30341, the smaller the included angle $\omega_3$ between the first support surface 30322 and the second support surface 30323, the larger the relative rotation angle between the hinge mount 3031 and the hinge arm 3032 may be when the state is switched. That is, when the hinge mount 3031 is fixed, the user may need to move the hinge arm 3032 to a larger angle to switch the state of the hinge 30, so that the user may be laborious and it may bring inconvenience to the user.

Since the hinge arm 3032 has a length, and the first support surface 30322 is disposed at one end in the length direction of the hinge arm 3032, the second support surface 30323 may be disposed adjacent to the first support surface 30322 in the width direction of the hinge arm 3032. Normally, the first support surface 30322 and the second support surface 30323 may be arranged vertically. At this time, when the hinge 30 is switched between the two states, the hinge arm 3032 and the hinge mount 3031 may need to be moved relative to each other by 90 degree.

In the embodiment, in the section perpendicular to the central axis of the rotating shaft 3033, the included angle $\omega_3$ between the first support surface 30322 and the second support surface 30323 may be an obtuse angle. Thus, the angle required for the relative movement of the hinge arm 3032 and the hinge mount 3031 may be less than 90 degree when the hinge 30 switches between the two states, which may facilitate the user.

Specifically, when the hinge 30 in the embodiment is used in the embodiment of the loudspeaker device in the present disclosure, the hinge 30 may be used to connect the ear hook 500 and the speaker component 83. In some embodiments, the speaker component 83 may be a bone conduction speaker component 83. For example, when the hinge 30 is in a second state of elastically abutting between the second support surface 30323 and the third support surface 30341, the speaker component 83 may be in the first relatively fixing position to fit the back of the auricle of the user. Therefore, when the user needs to use the function of the speaker component 83 of the loudspeaker device, the user may only need to rotate the speaker component 83 by an angle less than 90 degree to fit it to the back of the auricle of the user. In addition, when the hinge 30 is in a first state of elastically abutting between the first support surface 30322 and the third support surface 30341, the hinge arm 3032 and the connected speaker component 83 may form an angle. Therefore, the hinge arm 3032 and the connected speaker component 83 may be located behind an ear of the user and face the direction of the ear of the user when the user wears the loudspeaker device. Therefore, the loudspeaker device may be blocked and fixed, and prevented from falling off the head of the user.

It should be noted that the included angle $\omega_3$ between the first support surface 30322 and the second support surface 30323 may be set according to actual requirements. If the included angle is too large, the included angle between the hinge arm 3032 and the hinge mount 3031 and the angle between the function member 80 connected to the end of the hinge arm 3032 away from the hinge mount 3031 and the hinge mount 3031 may be smaller. Therefore, the hinge arm 3032 and the function member 80 may be too close to the ears of the user to compress the ears when the user wears it, reducing the comfort of the user. If the included angle is too small, on the one hand, the required angle may be too large, which is inconvenient for the user when the user moves the speaker component 83 to switch between the first relative position and the second relative position. On the other hand, the included angle between the ear hook 500 and the hinge 30 and the included angle between the ear hook 500 and the speaker component 83 may be too small to play a role in blocking and fixing the loudspeaker device. Therefore, the loudspeaker device may be easily dropped from the front side of the head of the user when the user wears the loudspeaker device. Specifically, the included angle between the first support surface 30322 and the second support surface 30323 may be set according to the shape of the head of the user.

Specifically, in an application scenario, in the section perpendicular to the central axis of the rotating shaft 3033, the included angle $\omega_3$ between the first support surface 30322 and the second support surface 30323 may be between 100 degree and 120 degree, and specifically be 100 degree, 110 degree, 120 degree, or the like. The setting of the angle may enable the user to wear the loudspeaker device, and the speaker component 83 may not be too close to the ears of the user to cause discomfort to the ears of the user when the speaker component 83 is in the first relatively fixing position. It may be unnecessary to rotate the hinge by an excessive angle upon switching between the two relative positions of the speaker component 83, which is convenient for users.

In some embodiments, in the process that the third support surface 30341 is switched from elastically abutting on one of the first support surface 30322 and the second support surface 30323 to elastically abutting on the other of the first support surface 30322 and the second support surface 30323, the connection 324 between the first support surface 30322 and the second support surface 30323 may abut on the third support surface 30341, and drive the support member 34 against the elastic offset of the clastic member 35 to move in the opposite direction. Elastically abutting between the third support surface 30341 and the first support surface 30322 before the switching may be taken as an example. At the start of the switching, while the first support surface 30322 gradually moves away from the third support surface 30341, the connection 324 may gradually abut on the third support surface 30341 and slide from one side of the third support surface 30341 to another side of the third support surface 30341 during the switching process. Finally, the second support surface 30323 and the third support surface 30341 may further turn to elastically abut. During the state switching process, the connection 324 may always abut on and interact with the third support surface 30341. The shape of the connection 324 may have an effect on the state switching process. For example, if the first support surface 30322 and the second support surface 30323 are line-connected, the connection 324 may have a relatively sharp angle. Therefore, during the user pulls the hinge mount 3031 and/or the hinge arm 3032 to switch the state of the hinge 30, on the one hand, the buffer may be small and the switching may be abrupt upon switching from abutting between the connection 324 and the third support surface 30341 to abutting between the connection 324 and the first support surface 30322 and the second support surface 30323. The user may feel poor when pulling the hinge 30. On the other hand, the connection 324 may be relatively sharp, which may cause wear to the third support surface 30341 during repeated switching processes.

In some embodiments of the present disclosure, in a section perpendicular to the central axis of the rotating shaft 3033, the connection 324 may have a shape of an arc. As a result, the connection between the first support surface 30322 and the second support surface 30323 may be a connection with an arc surface. During the state switching process of the hinge 30, the connection 324 abutting on the third support surface 30341 may be relatively smooth, so that the user may have a better fell when pulling the hinge 30. The damage to the third support surface 30341 may be reduced during repeated switching processes.

Specifically, in some embodiments, the connection 324 may have a shape of a circular arc. If a curvature of the arc is different, effects brought by the curvatures may be different. The curvature may be set in combination with actual use situations. The curvature of the arc in the embodiment may be between 5 and 30, and specifically 5, 10, 15, 20, 25, 30, etc., and be not limited herein.

It should be noted when the hinge 30 in the embodiment is applied to the loudspeaker device in the embodiment described above, the circular arc shape of the curvature of the connection 324 may enable the user to have a better feel when the hinge 30 is pulled to drive the speaker to switch between the first relatively fixing position and the second relatively fixing position.

In some embodiments, the third support surface 30341 may be set so that the external force required when the third support surface 30341 is switched from elastically abutting on the first support surface 30322 to elastically abutting on the second support surface 30323 may be different from the external force required when the third support surface 30341 is switched from elastically abutting on the second support surface 30323 to elastically abutting on the first support surface 30322.

It should be noted that, in a specific application scenario, different states of the hinge 30 may correspond to different functions of the hinge 30 or structures connected to the hinge 30. Alternatively, due to a setting problem of the position of the hinge 30, it may not be convenient for the user to exert a force to switch from one state to another. When the user switches the state of the hinge 30, it may be necessary to distinguish the strength of pulling the hinge 30 to facilitate the user to exert the force, or to provide the user with an intuitive experience to distinguish the two hinge states.

Specifically, when the hinge 30 in the embodiment is applied to the loudspeaker device, the state switching of the hinge 30 may drive the speaker component 83 to switch between the first relatively fixing position and the second relatively fixing position relative to the ear hook 500. Correspondingly, the two relatively fixing positions may correspond to two situations where the user uses the speaker component 83 and where the user does not use the speaker component 83. When the user wears the loudspeaker device, difficulty of applying forces to the back of the head to switch between the two states may be different. Therefore, the design of applying different external forces to correspondingly switching between different states may facilitate the usage of the user.

Specifically, in some embodiments, when the third support surface 30341 is switched from elastically abutting on the first support surface 30322 to elastically abutting on the second support surface 30323, the speaker component 83 may move from the second relatively fixing position to the first relatively fixing position so as to fit the back of the auricle of the user.

Further, in the embodiment, the third support surface 30341 may be set such that the external force required when the third support surface 30341 is switched from elastically abutting on the first support surface 30322 to elastically abutting on the second support surface 30323 may be less than the external force required when the third support surface 30341 is switched from elastically abutting on the second support surface 30323 to elastically abutting on the first support surface 30322.

It should be noted when the speaker component 83 is used, the third support surface 30341 may need to be switched from elastically abutting on the first support surface 30322 to elastically abutting on the second support surface 30323 upon being applied to the loudspeaker device. When the speaker component 83 is not used, the third support surface 30341 may need to be switched from elastically abutting on the second support surface 30323 to elastically abutting on the third support surface 30341. According to the embodiment, the force required when the user uses the speaker component 83 may be less than the force required when the speaker component 83 is not used. Therefore, it may be convenient for the user to use the function of the speaker component 83 of the loudspeaker device.

Specifically, referring to FIG. 15 and FIG. 17 together, in an application scenario, when the third support surface 30341 is switched from elastically abutting on the first support surface 30322 to elastically abutting on the second support surface 30323, the connection 324 may initially contact a first position 3411 of the third support surface 30341. When the third support surface 30341 is switched from elastically abutting on the second support surface 30323 to elastically abutting on the first support surface 30322, the connection 324 may initially contact a second position 3412 of the third support surface 30341. In some embodiments, in a section perpendicular to the central axis of the rotating shaft 3033, a distance d1 between the first position 3411 and a contact point of the elastic member 35 and the support member 34 along the direction of the clastic offset of the clastic member 35 may be less than a distance d2 between the second position 3412 and the contact point in the direction of the elastic offset.

It should be noted when the third support surface 30341 elastically abuts on the first support surface 30322, the connection 324 may be located near a position of one end of the third support surface 30341. When the third support surface 30341 elastically abuts on the second support surface 30323, the connection 324 may be located near a position of another end of the third support surface 30341. Therefore, the first position 3411 and the second position 3412 may be located near the two ends of the third support surface 30341, respectively. That is, in the embodiment, a distance between the positions of the third support surface 30341 of the support member 34 near the two ends may be different from a distance between the clastic member 35 and the contact point of the support member 34 in the direction of the clastic offset of the clastic member 35. The distance corresponding to the second position 3412 may be less than the distance corresponding to the first position 3411. At this time, when the third support surface 30341 is switched from elastically abutting on the first support surface 30322 to elastically abutting on the second support surface 30323, the connection 324 may not immediately abut on the third support surface 30341 and receive a reaction force of the clastic member 35, but gradually abut on the third support surface 30341 and receive the reaction force of the elastic member 35 during the switching process. When the third support surface 30341 is switched from elastically abutting on the first support surface 30322 to elastically abutting on the second support surface 30323, the connection 324 may initially abut on the third support surface 30341 and receive the reaction force of elastic member 35, or at least receive the reaction force of clastic member 35 earlier than that the third support surface 30341 is switched from elastically abutting on the second support surface 30323 to elastically abutting on the first support surface 30322. Therefore, in this case, the hinge 30 may need a smaller force to switch from elastically abutting on the first support surface 30322 to elastically abutting on the second support surface 30323. Therefore, the force required to move the speaker component 83 may be small when the user uses the speaker component 83, which is convenient for the user.

Further, the third support surface 30341 may include a first sub-support surface 3413 and a second sub-support surface 3414. In some embodiments, the first position 3411 may be disposed on the first sub-support surface 3413. The second position 3412 may be disposed on the second sub-support surface 3414. That is, the first sub-support surface 3413 and the second sub-support surface 3414 may be disposed near the two ends of the third support surface 30341, respectively.

In some embodiments, the second sub-support surface 3414 may be a plane. Specifically, when the first support surface 30322 or the second support surface 30323 elastically abuts on the third support surface 30341, the second sub-support surface 3414 may be parallel to the first support surface 30322 or the second support surface 30323. The first sub-support surface 3413 may be a flat surface or a curved surface, and be not limited herein.

Further, the first sub-support surface 3413 and the second sub-support surface 3414 may not be located in the same plane. The first sub-support surface 3413 may be inclined relative to the second sub-support surface 3414. An included angle between the two sub-support surfaces may be no greater than 10 degree, for example, no greater than 2 degree, 4 degree, 6 degree, 8 degree, 10 degree, etc. Specifically, the first sub-support surface 3413 may be disposed in a direction away from the hinge arm 3032. Therefore, in the section perpendicular to the central axis of the rotating shaft 3033, the distance between the first position 3411 and the clastic member 35 and the distance between the first position 3411 and the contact point of the clastic member 35 in the direction of the elastic offset of the clastic member 35 may be less than the distance between the second position 3412 and the contact point in the direction of the clastic offset. In some embodiments, when the first sub-support surface 3413 is a curved surface and the second sub-support surface 3414 is a flat surface, the included angle between the first sub support surface 3413 and the second sub-support surface 3414 may be an included angle between a plane tangent to the first sub support surface 3413 and the second sub support surface 3414 at the intersection of the two sub-support surfaces.

Figure 18:
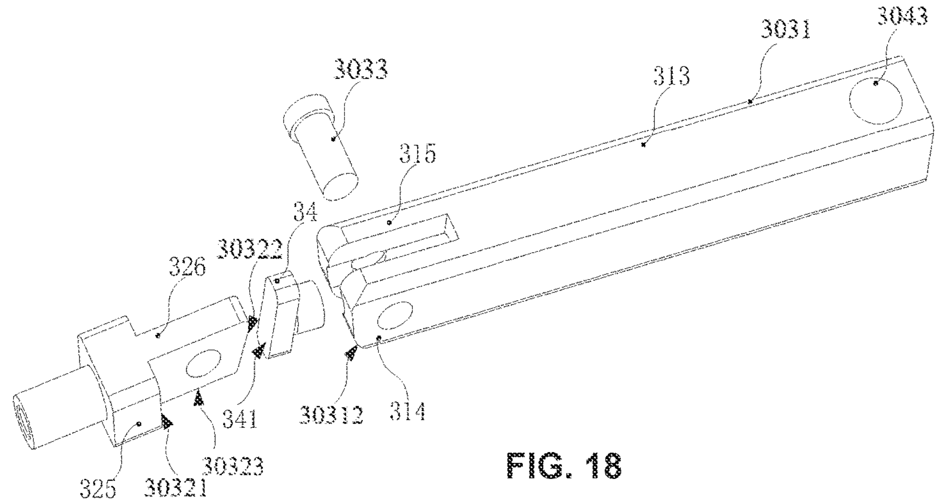
FIG. 18 is an exploded structural diagram illustrating a hinge according to some embodiments of the present disclosure.

Referring to FIG. 18, FIG. 18 is an exploded structural diagram illustrating a hinge according to some embodiments of the present disclosure. In the embodiment, the hinge mount 3031 may include a mount body 313, and a first lug 314 and a second lug 315 protruding from the mount body 313 and spaced from each other. The hinge arm 3032 may include an arm body 325 and a third lug 326 protruding from the arm body 325. The third lug 326 may be inserted into an interval region between the first lug 314 and the second lug 315, and rotatably connected to the first lug 314 and the second lug 315 via the rotating shaft 3033. The first support surface 30322 and the second support surface 30323 may be disposed on the third lug 326. The support member 34 may be at least partially disposed in the interval region and located at the side of the third lug 326 towards the mount body 313. The mount body 313 may be disposed with an accommodation chamber 3121 communicating with the interval region. The clastic member 35 may be disposed inside the accommodation chamber 3121, and allow the support member 34 elastically offset towards the third lug 326.

Specifically, corresponding positions of the first lug 314, the second lug 315, and the third lug 326 may be respectively disposed with a first through-hole, a second through-hole, and a third through-hole located in a same axial direction. Inner diameters of the three through-holes may be no less than the outer diameter of the rotating shaft 3033. Thus, when the rotating shaft 3033 passes through a corresponding through-hole, the hinge mount 3031 where the first lug 314 and the second lug 315 are located may be rotatably connected to the hinge arm 3032 where the third lug 326 is located.

In some embodiments, the first support surface 30322 and the second support surface 30323 may be both disposed on the third lug 326 and parallel to the central axis of the rotating shaft 3033. Therefore, the first support surface 30322 and the second support surface 30323 may enter the interval region between the first lug 314 and the second lug 315 when the hinge arm 3032 rotates around the rotating shaft 3033 relative to the hinge mount 3031.

Further, the support member 34 may be located between the first lug 314 and the second lug 315 of the mount body 313. The third support surface 30341 of the support member 34 may be disposed toward the third lug 326. In one application scenario, the clastic member 35 may be completely set inside the accommodation chamber 3121, and touch the support member 34 at the side towards the interval region between the first lug 314 and the second lug 315. When the clastic member 35 is in a natural state, a region of the support member 34 near the elastic member 35 may be at least partially located inside the accommodation chamber 3121. It should be noted that the shape of the portion of the support member 34 inside the accommodation chamber 3121 may match the shape of the accommodation chamber 3121. Therefore, the portion of the support member 34 located inside the accommodation chamber 3121 may stably slide inside the accommodation chamber 3121 when the support member 34 is elastically offset via the elastic member 35.

In an application scenario, a sectional area of the accommodation chamber 3121 may be less than a sectional area of the interval region between the first lug 314 and the second lug 315 in a section perpendicular to the length direction of the hinge mount 3031. The shape of the support member 34 region outside the accommodation chamber 3121 may match the interval region. Therefore, the support member 34 may not all enter the accommodation chamber 3121 upon moving toward a side of the elastic member 35.

Of course, in other embodiments, the sectional shape of the accommodation chamber 3121 may be the same as the interval region between the first lug 314 and the second lug 315 in the section perpendicular to the length direction of the hinge mount 3031. At this time, the support member 34 may completely enter the accommodation chamber 3121. Therefore, the support member 34 may slide inside the entire accommodation chamber 3121 upon receiving a pushing force.

Further, when the hinge 30 in the embodiment is applied to the hinge assembly 122 in the embodiment of the hinge component in present disclosure, the first end surface 30312 of the hinge mount 3031 may be an end surface of the first lug 314 and the second lug 315 toward the hinge arm 3032. The third lug 326 facing a protrusion toward the arm body 325 may be located inside the interval region between the first lug 314 and the second lug 315. Therefore, the first end surface 30312 of the first lug 314 and the second lug 315 may be disposed toward the arm body 325. In a section of the central axis direction of the rotating shaft 3033, the arm body 325 may be further protruded from the third lug 326 to form a second end surface 30321 of the first lug 314 and the second lug 315 toward the hinge mount 3031.

In the embodiment, during the relative rotation of the hinge arm 3032 and the hinge mount 3031, a gap between the first end surface 30312 of the first lug 314 and the second lug 315 and the second end surface 30321 of the arm body 325 may always be larger or smaller than the diameter of the connection wire 3036. Therefore, the connection wire 3036 may not be sandwiched between the first lug 314 and the second lug 315 and the arm body 325 during the relative rotation of the hinge mount 3031 and the hinge arm 3032, thereby reducing the damage of the connection wire 3036 by the hinge 30.

In an application scenario, the gap between the second end surface 30321 of the first lug 314 and the second lug 315 and the first end surface 30312 of the arm body 325 may always be kept much larger or smaller than the diameter of the connection wire 3036 during the relative rotation of the hinge arm 3032 and the hinge mount 3031, thereby further reducing the damage of the connection wire 3036 by the hinge 30.

It should be noted that, in the embodiment, the gap between the first end surface 30312 and the second end surface 30321 may be a gap with even size, thereby satisfying the above condition of being greater than or less than the diameter of the connection wire 3036. Alternatively, in another embodiment, only gaps of positions at both end surfaces close to the connection wire 3036 may be greater than or less than the diameter of the connection wire 3036. Gaps of other positions at both end surfaces may not need to satisfy the condition.

Specifically, in an application scenario, in a section perpendicular to the central axis of the rotating shaft 3033, at least one of an end surface of the first lug 314 and the second lug 315 towards the hinge arm 3032 and an end surface of the arm body 325 towards the hinge mount 3031 may be in a chamfer setting. Therefore, during the relative rotation of the hinge arm 3032 and the hinge mount 3031, the positions close to the connection wire 3036 may always be kept larger than the diameter of the connection wire 3036.

In some embodiments, the chamfer setting may be filleted, or directly chamfered.

In the application scenario, it may be only necessary to chamfer at least one of the end surface of the first lug 314 and the second lug 315 near the connection wire 3036 towards the hinge arm 3032 and the end surface of the arm body 325 towards the hinge mount 3031. Therefore, during the relative rotation of the hinge arm 3032 and the hinge mount 3031, the connection wire 3036 may not be clamped into the gap between the two end surfaces.

The hinge in the embodiment of the present disclosure may be applied to the embodiment of the hinge component in the present disclosure, and not be limited herein. In other embodiments, it may also be applied to other hinge components, or a direct connection of two components that need to be rotatably connected.

In some embodiments, as shown in FIG. 1, the speaker component 83 may be operably connected to the ear hook 500. In some embodiments, the speaker component 83 may include, but is not limited to, earphones, MP3 players, hearing aids, and the like.

In an application scenario, the bone conduction speaker component in this embodiment is an example of the speaker component 83 for illustrative purposes only. The following may further describe the fitting position of the speaker component 83 on the human body based on the bone conduction speaker component. It should be noted that without violating the principle, the following descriptions may also be applied to the air conduction speaker component.

In some embodiments, the position of the speaker component 83 in the MP3 player may not be fixed, and the speaker component 83 may fit different parts of the user's check (for example, in front of the ear, behind the ear, etc.), so that the user may feel different sound quality. Users can adjust the sound quality according to their own preferences, and it is also convenient for users with different head sizes. The loudspeaker device may be fixed on the human ear through the ear hook 500, and the speaker component 83 may be located in front of the ear. In some embodiments, the ear hook 500 may be elastically deformable, and the ear hook 500 may be bent to change the fitting position of the speaker component 83 on the human body. In some embodiments, the connection end of the ear hook 500 with the speaker component 83 may be set according to the position that the user is accustomed to. For example, if the user is accustomed to wearing the speaker component 83 behind the ear, the connection end of the ear hook 500 may be set behind the ear under the premise that the fixing function of the ear hook 500 is maintained. More descriptions about the snap connection between the ear hook 500 and the speaker component 83 may be found elsewhere in this application. It should be noted that the connection between the ear hook 500 and the speaker component 83 is not limited to the above-mentioned snap connection. For example, the ear hook 500 and the speaker component 83 may also be connected by a hinge. More descriptions about the hinge may be found elsewhere in this application.

In some embodiments, the speaker component 83 may fit on any position of the user's head, for example, the top of the head, forehead, checks, hips, auricles, back of auricles, or the like. In some embodiments, the way of fitting the speaker component 83 to the head may include surface fitting or point fitting. The fitting surface may be provided with a gradient structure which refers to the area where the height of the contact surface changes. The gradient structure may include a convex/concave or stepped structure on the outside of the contact surface (the side that is attached to the user), or a convex/concave or stepped structure on the inside of the contact surface (the side facing away from the user).

Figure 19:
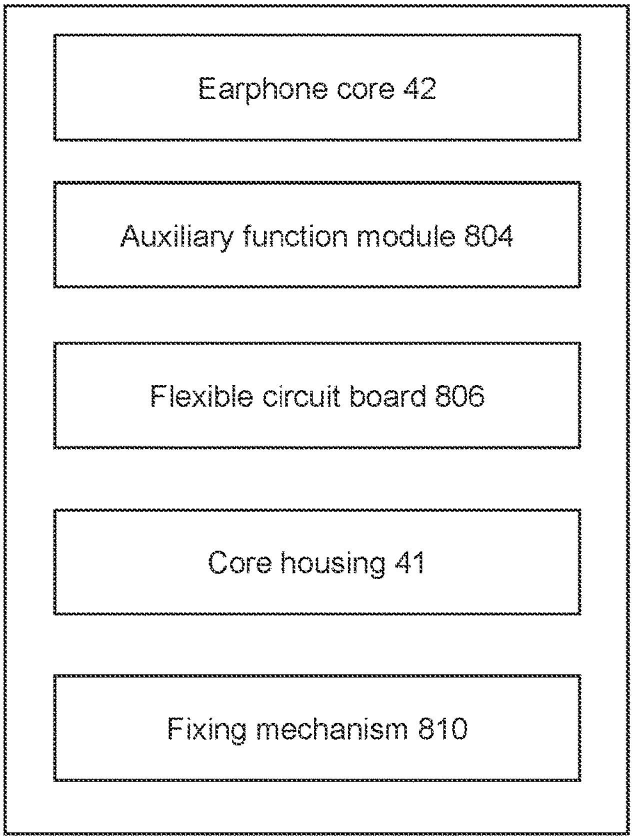
FIG. 19 is a block diagram illustrating a structure of a speaker according to some embodiments of the present disclosure.

FIG. 19 is a block diagram illustrating a structure of a speaker according to some embodiments of the present disclosure. Referring to FIG. 19, in some embodiments, a speaker may include at least an earphone core 42, an auxiliary function module 804, a flexible circuit board 806, a core housing 41, and a fixing mechanism 810.

In some embodiments, the earphone core 42 may receive electrical audio signal(s) and convert the audio signal(s) into the sound signal(s). The flexible circuit board 806 may include a first flexible circuit board 44 and a second flexible circuit board 54. The flexible circuit board 806 may facilitate electrical connection(s) between different modules/components. For example, the first flexible circuit board 44 may facilitate an electrical connection between the earphone core 42 and an external control circuit and an electrical connection between the earphone core 42 and the auxiliary function module 804. For instance, the first flexible circuit board 44 may be used to connect with the earphone core and the auxiliary function module, and the second flexible circuit board 54 may be used to connect a battery to other components. In some embodiments, the core housing 41 may be configured to accommodate the earphone core 42, the auxiliary function module 804, and the flexible circuit board 806. Further, the fixing mechanism 810 may be connected to the core housing 41, and be configured to support and maintain the position of the core housing 41. In some embodiments, the speaker may transmit sound(s) through a bone conduction mode or an air conduction mode.

Specifically, when the speaker transmits a sound through the bone conduction mode, an outer surface of the core housing 41 may have a fitting surface. The fitting surface may be an outer surface of the speaker in contact with the human body when the user wears the speaker. The speaker may compress the fitting surface against a preset area (e.g., a front end of a tragus, a position of a skull, or a back surface of an auricle), thereby effectively transmitting the vibration signal(s) to the auditory nerve of the user through the bone and improving the sound quality of the speaker. In some embodiments, the fitting surface may be abutted on the back surface of the auricle. The mechanical vibration signal(s) may be transmitted from the earphone core 42 to the core housing 41 and transmitted to the back of the auricle through the fitting surface of the core housing 41. The vibration signal(s) may then be transmitted to the auditory nerve by the bone near the back of the auricle. In this case, the bone near the back of the auricle may be closer to the auditory nerve, which may have a better conduction effect and improve the efficiency of transmitting the sound to the auditory nerve by the speaker.

Figure 20:
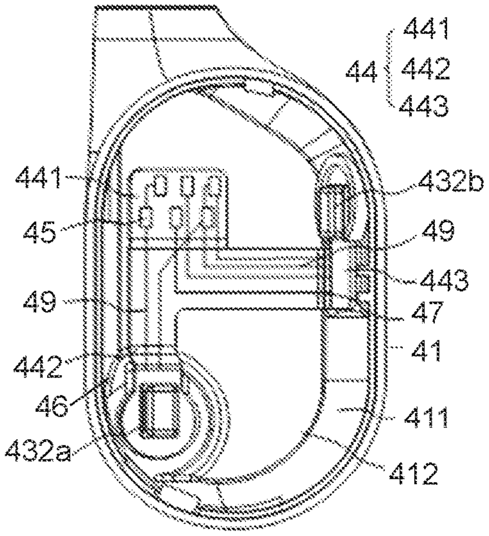
FIG. 20 is a schematic diagram illustrating a structure of a flexible circuit board located inside a core housing according to some embodiments of the present disclosure.
Figure 21:
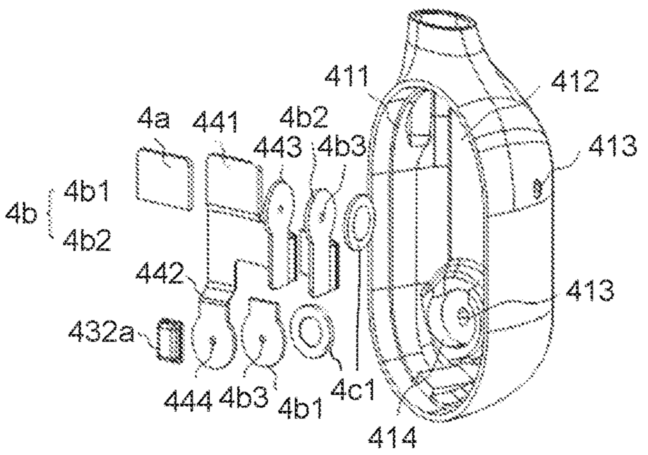
FIG. 21 is an exploded diagram illustrating a partial structure of a speaker according to some embodiments of the present disclosure.

Further, FIG. 20 is a schematic diagram illustrating a structure of a flexible circuit board located inside a core housing according to some embodiments of the present disclosure. FIG. 21 is an exploded diagram illustrating a partial structure of a speaker according to some embodiments of the present disclosure. Referring to FIGS. 20 and 21, in some embodiments, the first flexible circuit board 44 may be disposed with a plurality of pads. Different signal wires (e.g., audio signal wires, auxiliary signal wires) may be electrically connected to different pads through different flexible leads to avoid numerous and complicated internal wires issues, which may occur when both audio signal wires and auxiliary signal wires need to be connected to the earphone core 42 or the auxiliary function module.

As shown in FIGS. 20 and 21, in some embodiments, the first flexible circuit board 44 may at least include a plurality of first pads 45 and a plurality of second pads 46. At least one of the first pads 45 may be electrically connected to auxiliary function module(s). The at least one of the first pads 45 may be electrically connected to at least one of the second pads 46 through a first flexible lead 47 on the first flexible circuit board 44. The at least one of the second pads 46 may be electrically connected to the earphone core 42 through external wire(s) 4. At least another one of the first pads 45 may be electrically connected to auxiliary signal wire(s). The at least another one of first pads 45 and the auxiliary function module(s) may be electrically connected through a second flexible lead 49 on the first flexible circuit board 44.

In the embodiment, the at least one of the first pads 45 may be electrically connected to the auxiliary function module(s) 804. The at least one of the second pads 46 may be electrically connected to the earphone core 42 through the external wire(s). The one of the at least one of the first pads 45 may be electrically connected to one of the at least one of the second pads 46 through the first flexible lead 47, so that the external audio signal wire(s) and the auxiliary signal wire(s) may be electrically connected to the earphone core 42 and the auxiliary function modules 804 at the same time through the first flexible circuit board 44, which may simplify a layout of the wiring.

In some embodiments, the audio signal wire(s) may be wire(s) electrically connected to the earphone core 42 and transmitting audio signal(s) to the earphone core 42. The auxiliary signal wire(s) may be wire(s) electrically connected to the auxiliary function modules 804 and performing signal transmission with the auxiliary function modules 804.

In some embodiments, referring to FIG. 20, specifically, the first flexible circuit board 44 may be disposed with the plurality of first pads 45 and two second pads 46. The two second pads 46 and at least one of the plurality of first pads 45 may be located on the same side of the first flexible circuit board 44 and spaced apart. The two second pads 46 may be connected to two corresponding first pads 45 of the plurality of first pads 45 through the first flexible lead(s) 47 on the first flexible circuit board 44. Further, a core housing 41 may also accommodate two external wires. One end of each of the external wires may be welded to a corresponding second pad 46, and the other end may be connected to the earphone core 42, so that the earphone core 42 may be connected to the second pads 46 through the external wires. The auxiliary function module may be mounted on the first flexible circuit board 44 and connected to other pads of the plurality of first pads 45 through the second flexible lead(s) 49 on the first flexible circuit board 44.

In some embodiments, wires may be disposed in the fixing mechanism 810 of the speaker. The wires may at least include the audio signal wire(s) and the auxiliary signal wire(s). In some embodiments, there may be multiple wires in the fixing mechanism 810. Such wires may include at least two audio signal wires and at least two auxiliary signal wires. For example, the fixing mechanism 810 may include an ear hook. The ear hook may be connected to the core housing 41, and the wires may be ear hook wires disposed in the ear hook. One end of each of the ear hook wires is welded to the first flexible circuit board 44 arranged in the core housing 41, or to a control circuit board, and the other end enters the core housing 41 and is welded to the first pads 45 of the first flexible circuit board 44.

Further, the fixing mechanism 810 may further include a circuit housing 100, an ear hook 500, a rear hook 300, or the like.

As used herein, one end of each of the two audio signal wires in the ear hook wires, which is located in the core housing 41, may be welded to the two first pads 45 by two first flexible leads 47, and the other end may be directly or indirectly connected to the control circuit board. The two first pads 45 may be further connected to the earphone core 42 through the welding of the second flexible lead(s) 49 and the two second pad 46 and the welding of the two external wires and the second pads 46, thereby transmitting the audio signal(s) to the earphone core 42.

One end of each of at least two auxiliary signal wires in the core housing 41 may be welded to the first pad 45 by the second flexible lead(s) 49, and the other end may be directly or indirectly connected to the control circuit board so as to pass the auxiliary signal(s) received and transformed by the auxiliary function module(s) to the control circuit 5051.

In the approach described above, the first flexible circuit board 44 may be disposed in the core housing 41, and the corresponding pads may be further disposed on the first flexible circuit board 44. Therefore, the wires 23 may enter the core housing 41 and be welded to the corresponding pads, and further connected to the corresponding auxiliary function module(s) 804 through the first flexible leads 47 and the second flexible leads 49 on the pads, thereby avoiding a plurality of wires directly connected to the auxiliary function module(s) 804 to make the wiring in the core housing 41 complicated. Therefore, the arrangement of the wirings may be optimized, and the space occupied by the core housing 41 may be saved. In addition, when the multiple ear hook wires are directly connected to the auxiliary function module(s) 804, a middle portion of each of the ear hook wires may be suspended in the core housing 41 to easily cause vibration, thereby resulting in abnormal sounds to affect the sound quality of the earphone core 42.

According to the approach, the ear hook wires may be welded to the first flexible circuit board 44 and further connected to the corresponding auxiliary function module (s), which may reduce a situation that the wires are suspended from effecting the quality of the earphone core 42, thereby improving the sound quality of the earphone core 42 to a certain extent.

In some embodiments, the first flexible circuit board 44 may be further divided. The first flexible circuit board 44 may be divided into at least two regions. One auxiliary function module 804 may be disposed on one of the at least two regions, so that at least two auxiliary function modules 804 may be disposed on the first flexible circuit board 44. Wiring between the audio signal wire(s) and the auxiliary signal wire(s) and the at least two auxiliary function modules may be implemented through the first flexible circuit board 44.

In some embodiments, the first flexible circuit board 44 may include at least a main circuit board 441 and a first branch circuit board 442. The first branch circuit board 442 may be connected to the main circuit board 441 and extend away from the main circuit board 441 along one end of the main circuit board 441. The auxiliary function module 804 may include a first auxiliary function module and a second auxiliary function module. The first auxiliary function module may be disposed on the main circuit board 441, and the second auxiliary function module may be disposed on the first branch circuit board 442.

Further, the plurality of first pads 45 may be disposed on the main circuit board 441, and the second pads 46 may be disposed on the first branch circuit board 442. In some embodiments, the first auxiliary function module may be a key switch 431. The key switch 431 may be disposed on the main circuit board 441, and the first pads 45 may be disposed corresponding to the key switch 431. The second auxiliary function module may be a microphone. The microphone may be disposed on the first branch circuit board 442, and the second pads 46 corresponding to the microphone may be disposed on the first branch circuit board 442. The first pads 45 corresponding to the key switch 431 on the main circuit board 441 may be connected to the second pads 46 corresponding to the microphone on the first branch circuit board 442 through the second flexible lead(s) 49. The key switch 431 may be electrically connected to the microphone 432, so that the key switch 431 may control or operate the microphone 432.

In some embodiments, the first flexible circuit board 44 may further include a second branch circuit board 443. The second branch circuit board 443 may be connected to the main circuit board 441. The second branch circuit board 443 may extend away from the main circuit board 441 along the other end of the main circuit board 441 and be spaced from the first branch circuit board 442.

Further, the plurality of first pads 45 may be disposed on the main circuit board 441. At least one of the second pads 46 may be disposed on the first branch circuit board 442, and the other second pads 46 may be disposed on the second branch circuit.

Further, the auxiliary function module 804 may further include a third auxiliary function module. The third auxiliary function module may be disposed on the second branch circuit board 443.

In some embodiments, the third auxiliary function module may be a second microphone **432*b*. The second branch circuit board may extend perpendicular to the main circuit board 441. The second microphone 432*b* may be mounted on the end of the second branch circuit board 443 away from the main circuit board 441. Multiple pads may be disposed at the end of the main circuit board 441 away from the second branch circuit board 443**.

Specifically, as shown in FIG. 20 and FIG. 21, the second auxiliary function module may be the first microphone **432*a*. The third auxiliary function module may be the second microphone 432*b*. As used herein, the first microphone 432*a* and the second microphone 432*b* may both be MEMS (micro-electromechanical system) microphone 432, which may have a small working current, relatively stable performance, and high voice quality. The two microphones 432 may be disposed at different positions of the first flexible circuit board 44** according to actual needs.

As used herein, the first flexible circuit board 44 may include a main circuit board 441, and a first branch circuit board 442 and a second branch circuit board 443 connected to the main circuit board 441. The first branch circuit board 442 may extend in the same direction as the main circuit board 441. The first microphone **432*a* may be mounted on one end of the first branch circuit board 442 away from the main circuit board 441. The second branch circuit board 443 may extend perpendicular to the main circuit board 441. The second microphone 432*b* may be mounted on one end of the second branch circuit board 443 away from the main circuit board 441. A plurality of first pads 45 may be disposed on the end of the main circuit board 441 away from the first branch circuit board 442 and the second branch circuit board 443**.

In one embodiment, the core housing 41 may include a peripheral side wall 411 and a bottom end wall 412 connected to one end surface of the peripheral side wall 411, so as to form an accommodation space with an open end. As used herein, an earphone core 42 may be disposed in the accommodation space through the open end. The first microphone **432*a* may be fixed on the bottom end wall 412. The second microphone 432*b* may be fixed on the peripheral side wall 411**.

In the embodiment, the first branch circuit board 442 and/or the second branch circuit board 443 may be appropriately bent to suit a position of a sound inlet corresponding to the microphone 432 on the core housing 41. Specifically, the first flexible circuit board 44 may be disposed in the core housing 41 in a manner that the main circuit board 441 is parallel to the bottom end wall 412. Therefore, the first microphone **432*a* may correspond to the bottom end wall 412 without bending the main circuit board 441. Since the second microphone 432*b* may be fixed on the peripheral side wall 411 of the core housing 41, it may be necessary to bend the second main circuit board 441. Specifically, the second branch circuit board 443 may be bent at one end away from the main circuit board 441 so that a board surface of the second branch circuit board 443 may be perpendicular to a board surface of the main circuit board 441 and the first branch circuit board 442. Further, the second microphone 432*b* may be fixed at the peripheral side wall 411 of the core housing 41 in a direction facing away from the main circuit board 441 and the first branch circuit board 442**.

In one embodiment, the first pads 45, the second pads 46, the first microphone **432*a*, and the second microphone 432*b* may be disposed on the same side of the first flexible circuit board 44. The second pads 46 may be disposed adjacent to the second microphone 432*b***.

As used herein, the second pads 46 may be specifically disposed at one end of the branch circuit board 443 away from the main circuit board 441 and have the same direction as the second microphone **432*b* and disposed at intervals. Therefore, the second pads may be perpendicular to the direction of the first pads 45 as the branch circuit board 443 is bent. It should be noted that the second branch circuit board 443 may not be perpendicular to the board surface of the main circuit board 441 after being bent, which may be determined according to the arrangement between the side wall 411 and the bottom end wall 412**.

Further, another side of the first flexible circuit board 44 may be disposed with a rigid support plate 4*a* and a microphone rigid support plate 4*b* for supporting the first pads 45. The microphone rigid support plate 4*b* may include a rigid support plate 4*b*1 for supporting the first microphone 432*a* and a rigid support plate 4*b*2 for supporting the second pads and the second microphone 432*b* together.

As used herein, the rigid support plate 4*a*, the rigid support plate 4*b*1, and the rigid support plate 4*b*2 may be mainly used to support the corresponding pads and the microphone 432, and thus may need to have certain strengths. The materials of the three may be the same or different. The specific material may be polyimide (PI), or other materials that may provide the strengths, such as polycarbonate, polyvinyl chloride, etc. In addition, the thicknesses of the three rigid support plates may be set according to the strengths of the rigid support plates, and actual strengths required by the first pads 45, the second pads 46, the first microphone 432*a*, and the second microphone 432*b*, and be not specifically limited herein.

As used herein, the rigid support plate 4*a*, the rigid support plate 4*b*1, and the rigid support plate 4*b*2 may be three different regions of an entire rigid support plate, or three independent bodies spaced apart from each other, and be not specifically limited herein.

In one embodiment, the first microphone 432*a* and the second microphone 432*b* may correspond to two microphone components 4*c*, respectively. In one embodiment, the structures of the two microphone components 4*c* may be the same. A sound inlet 413 may be disposed on the core housing 41. Further, the speaker may be further disposed with an annular blocking wall 414 integrally formed on the inner surface of the core housing 41 at the core housing 41, and disposed at the periphery of the sound inlet 413, thereby defining an accommodation space 415 connected to the sound inlet 413.

In one embodiment, the first flexible circuit board 44 may be disposed between a rigid support plate and the microphone 432. A sound input 444 may be disposed at a position corresponding to a sound input 4*b*3 of the microphone rigid support plate 4*b*.

Further, the first flexible circuit board 44 may further extend away from the microphone 432, so as to be connected to other functional components or wires to implement corresponding functions. Correspondingly, the microphone rigid support plate 4*b* may also extend out a distance with the first flexible circuit board 44 in a direction away from the microphone 432.

Correspondingly, the annular blocking wall 414 may be disposed with a gap matching the shape of the first flexible circuit board 44 to allow the first flexible circuit board 44 to extend out of the accommodation space 415. In addition, the gap may be further filled with a sealant to further improve the scaling.

Figure 22:
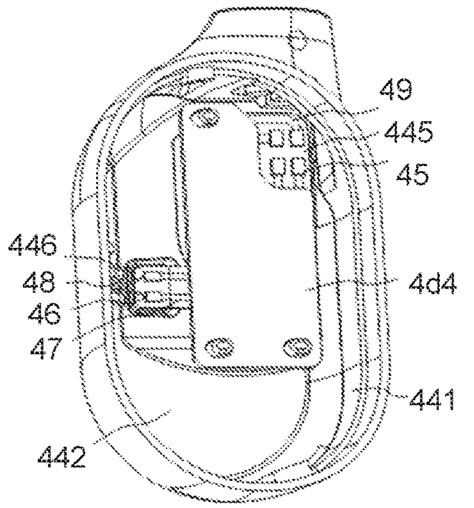
FIG. 22 is a partial sectional view illustrating a structure of a speaker according to some embodiments of the present disclosure.

FIG. 22 is a partial sectional view illustrating a structure of a speaker according to some embodiments of the present disclosure. In some embodiments, as shown in FIG. 22, the first flexible circuit board 44 may include a main circuit board 445 and a branch circuit board 446. The branch circuit board 446 may extend along an extending direction perpendicular to the main circuit board 445. As used herein, a plurality of first pads 45 may be disposed at the end of the main circuit board 445 away from the branch circuit board 446. A key switch may be mounted on the main circuit board 445. The second pads 46 may be disposed at the end of the branch circuit boards 446 away from the main circuit board 445.

In the embodiment, a board surface of the first flexible circuit board 44 and the bottom end wall 412 may be disposed in parallel and at intervals, so that the key switch 431 may be disposed towards the bottom end wall 412 of the core housing 41.

As described above, the earphone core 42 may include a magnetic circuit component configured to provide a magnetic field, a vibration component, an external wire 48, and a bracket 4210. As used herein, the vibration component may include a coil located in the magnetic field and an inner lead 4230 electrically connected to the coil. The external wire 48 may transmit an audio current to the coil in the vibration component. One end of the external wire 48 may be connected to the inner lead 4230 of the earphone core 42, and the other end may be connected to the flexible circuit board 44 of a speaker. The bracket 4210 may be configured to support and protect the earphone core 42. The bracket 4210 may include a wiring groove 4211. At least a portion of the external wire 48 and/or the inner lead may be disposed in the wiring groove 4211. The wiring groove 4211 may be configured to accommodate leads of the earphone core 42. In some embodiments, the inner lead 4230 and the external wire may be welded to each other. A welding position may be located in the wiring groove 4211.

Figure 23:
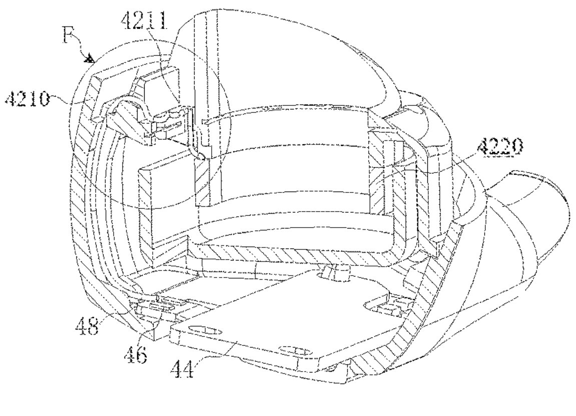
FIG. 23 is a partial sectional diagram illustrating a speaker according to some embodiments of the present disclosure.
Figure 24:
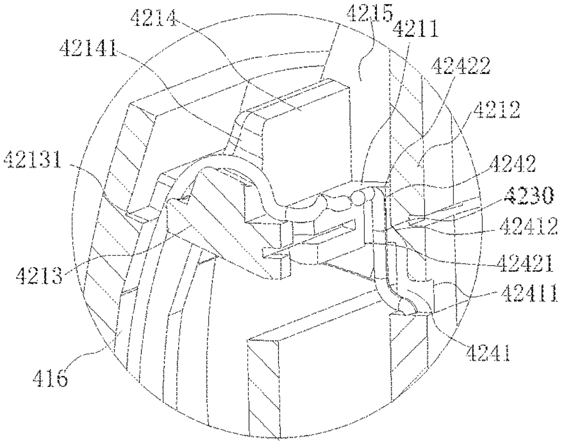
FIG. 24 is a partial enlarged diagram illustrating part F of a speaker in FIG. 23 according to some embodiments of the present disclosure.

Further, referring to FIG. 23 and FIG. 24, FIG. 23 is a partial sectional diagram illustrating a speaker according to some embodiments of the present disclosure.

FIG. 24 is a partial enlarged diagram illustrating part F of a speaker in FIG. 23 according to some embodiments of the present disclosure. In some embodiments, the coil 4220 may be disposed on the bracket 4210 and have at least one inner lead 4230. One end of the inner lead(s) 4230 may be connected to a main circuit in the coil 4220 to lead out the main circuit and transmit an audio current to the coil 4220 through the inner lead 4230.

One end of the external wire 48 may be connected to the inner lead(s) 4230. Further, the other end of the external wire 48 may be connected to a control circuit 5051 to transmit the audio current through the control circuit to the coil 4220 through the inner lead 4230.

Specifically, during an assembly stage, the external wire 48 and the inner lead(s) 4230 may need to be connected together by means of welding, or the like. Due to structural and other factors, after the welding is completed, a length of the wire may not be exactly the same as a length of a channel, and there may be an excess length part of the wire. And if the excess length part of the wire is not disposed reasonably, it may vibrate with the vibration of the coil 4220, thereby making an abnormal sound and affecting the sound quality of the earphone core 42.

Further, at least one of the external wire 48 and the inner lead 4230 may be wound and disposed in the wiring groove 4211. In an application scenario, the welding position between the inner lead 4230 and the external wire 48 may be disposed in the wiring groove 4211, so that a portion of the external wire 48 and the inner lead 4230 located near the welding position may be wound in the wiring groove 4211. In addition, in order to maintain stability, the wiring groove 4211 may be further filled with a sealant to further fix the wiring in the wiring groove 4211.

In the manner described above, the wiring groove 4211 may be disposed on the bracket 4210, so that at least one of the external wire 48 and the inner lead 4230 may be wound into the wiring groove 4211 to accommodate the excess length part of the wire, thereby reducing the vibration generated inside the channel, and reducing the influence of the abnormal sound caused by the vibration on the sound quality of the earphone core 42.

In one embodiment, the bracket 4210 may include an 4212, a support flange 4213, and an outer blocking wall 4214. As used herein, the annular main body 4212, the support flange 4213, and the outer blocking wall 4214 may be integrally formed.

As used herein, the annular main body 4212 may be disposed inside the entire bracket 4210 and used to support the coil 4220. Specifically, a cross-section of the annular main body 4212 in a direction perpendicular to the radial direction of a ring of the annular main body 4212 may be consistent with the coil 4220. The coil 4220 may be disposed at an end of the annular main body 4212 facing the core housing 41. The inner side wall and the outer side wall of the annular main body 4212 may be flush with the inner side wall and the outer side wall of the coil 4220, respectively, so that the inner side wall of the coil 4220 and the inner side wall of the annular main body 4212 may be coplanar, and the outer side wall of the coil 4220 and the outer side wall of the annular main body 4212 may be coplanar.

Further, the support flange 4213 may protrude on the outer side wall of the annular main body 4212 and extend along the outside of the annular main body 4212. Specifically, the support flange 4213 may extend outward in a direction perpendicular to the outer side wall of the annular main body 4212. As used herein, the support flange 4213 may be disposed at a position between two ends of the annular main body 4212. In the embodiment, the support flange 4213 may protrude around the outer side wall of the annular main body 4212 to form an annular support flange 4213. In other embodiments, the support flange 4213 may also be formed by protruding at a portion of the outer side wall of the annular main body 4212 according to needs.

The outer blocking wall 4214 may be connected to the support flange 4213 and spaced apart from the annular main body 4212 along the side of the annular main body 4212. As used herein, the outer blocking wall 4214 may be sleeved on the periphery of the annular main body 4212 and/or the coil 4220 at intervals. Specifically, the outer blocking wall 4214 may be partially sleeved around the periphery of the annular main body 4212 and the coil 4220 according to actual needs, or partially sleeved around the periphery of the annular main body 4212. It should be noted that, in the embodiment, a portion of the outer blocking wall 4214 close to the wiring groove 4211 may be sleeved on a portion of the periphery of the annular main body 4212. Specifically, the outer blocking wall 4214 may be disposed on a side of the support flange 4213 away from the core housing 41. As used herein, the outer side wall of the annular main body 4212, the side wall of the support flange 4213 away from the core housing 41, and the inner side wall of the outer blocking wall 4214 may together define the wiring groove 4211.

In one embodiment, a wiring channel 424 may be disposed on the annular main body 4212 and the support flange 4213. The inner lead(s) 4230 may extend inside the wiring groove 4211 via the wiring channel 424.

As used herein, the wiring channel 424 may include a sub-wiring channel 4241 on the annular main body 4212 and a sub-wiring channel 4242 on the support flange 4213. The sub-wiring channel 4241 may be disposed through the inner side wall and the outer side wall of the annular main body 4212. A wiring port 42411 communicating with one end of the sub-wiring channel 4241 may be disposed on a side of the annular main body 4212 near the coil 4220. A wiring port 42412 communicating with the other end of the sub-wiring channel 4241 may be disposed on a side of the core housing near the support flange 4213 facing the core housing 41. The sub-wiring channel 4242 may penetrate the support flange 4213 in a direction towards the outside of the core housing 41. The wiring port 42421 communicating with the end of the sub-wiring channel 4242 may be disposed on a side of the support flange 4213 facing the core housing 41. The wiring port 42422 communicating with the other end of the sub-wiring channel 4242 may be disposed on a side away from the core housing 41. As used herein, the wiring port 42412 and the wiring port 42421 may communicate through a space between the support flange 4213 and the annular main body 4212.

Further, the inner lead(s) 4230 may enter the wiring port 42411, extend along the sub-wiring channel 4241, exit from the wiring port 42412 to enter a region between the annular main body 4212 and the support flange 4213, further enter the sub-wiring channel 4242 from the wiring port 42421, and extend into the wiring groove 4211 after passing through the wiring port 42422.

In one embodiment, the top of the outer blocking wall 4214 may be disposed with a slot 42141. The external wire 48 may extend inside the wiring groove 42111 through the slot 42141.

As used herein, one end of the external wire 48 may be disposed on the flexible circuit board 44. The flexible circuit board 44 may be specifically disposed on an inner side of the earphone core 42 facing the core housing 41.

In the embodiment, the support flange 4213 may be further extended to a side of the outer blocking wall 4214 away from the annular main body 4212 to form an outer edge. Further, the outer edge may surround and abut on the inner side wall of the core housing 41. Specifically, the outer edge of the support flange 4213 may be disposed with a slot 42131, so that the external wire 48 on the inner side of the earphone core 42 facing the core housing 41 may be extended to the outer side of the support flange 4213 facing the core housing 41 through the slot 42131, and then to the slot 42141, and enter the wiring groove 4211 through the slot 42141.

Further, the inner side wall of the core housing 41 may be disposed with a guide groove 416. One end of the guide groove 416 may be located on one side of the flexible circuit board 44 and the other end may communicate with the slot 42131 and extend in a direction towards the outside of the core housing 41, so that the external wire 48 extends from the flexible circuit board to a second wiring groove 3331 by passing through the guide slot 416.

In one embodiment, the bracket 4210 may further include two side blocking walls 4215 spaced along the circumferential direction of the annular main body 4212 and connected to the annular main body 4212, the supporting flange 4213, and the outer blocking wall 4214, thereby defining the wiring groove 4211 between the two side blocking walls 4215.

Specifically, the two side blocking walls 4215 may be oppositely disposed on the support flange 4213 and protrude towards the outer side of the core housing 41 along the support flange 4213. As used herein, a side of the two side blocking walls 4215 facing the annular main body 4212 may be connected to the outer side wall of the annular main body 4212. A side away from the annular main body 4212 may terminate at the outer side wall of the outer blocking wall 4214. The wiring port 42422 and the slot 42141 may be defined between the two side blocking walls 4215. Therefore, the inner lead(s) 4230 exiting from the wiring port 42422 and the external wire 48 entering through the slot 42141 may extend into the wiring groove 4211 defined by the two side blocking walls 4215.

Figure 25:
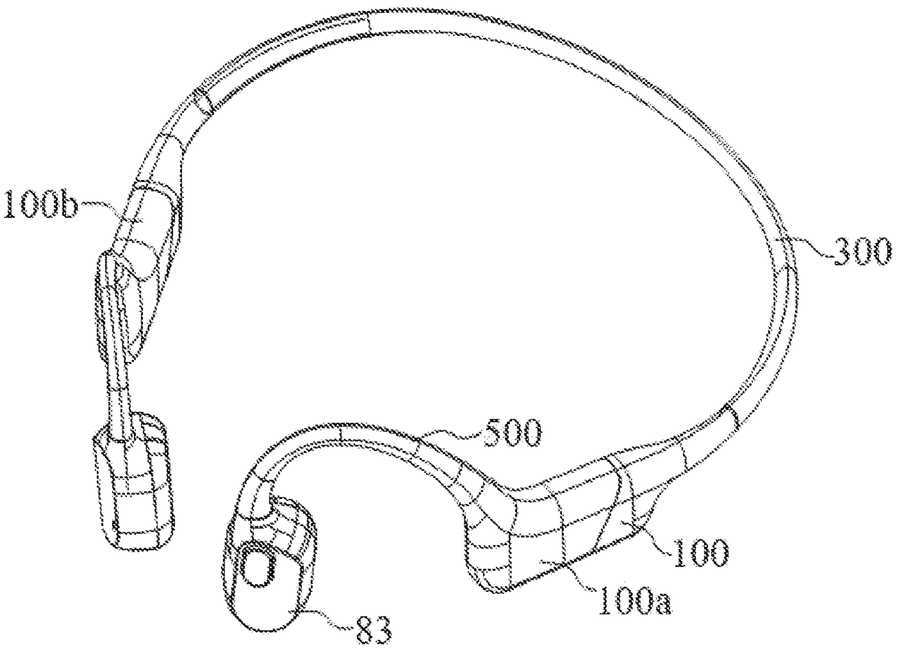
FIG. 25 is a schematic structural diagram of a speaker according to some embodiments of the present disclosure.
Figure 26:
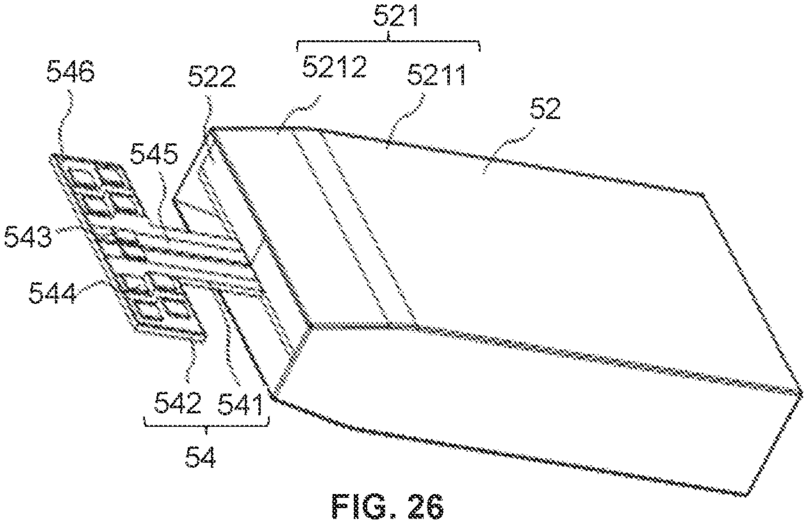
FIG. 26 is a schematic structural diagram of a battery assembly of a speaker according to some embodiments of the present disclosure.
Figure 27:
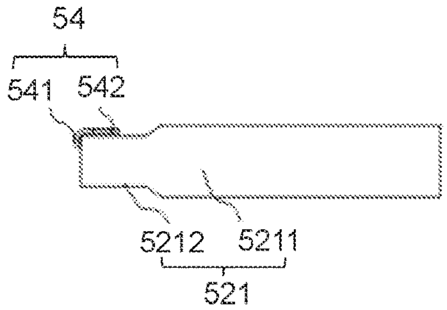
FIG. 27 is a schematic structural diagram of a battery assembly of a speaker according to some embodiments of the present disclosure.
Figure 28:
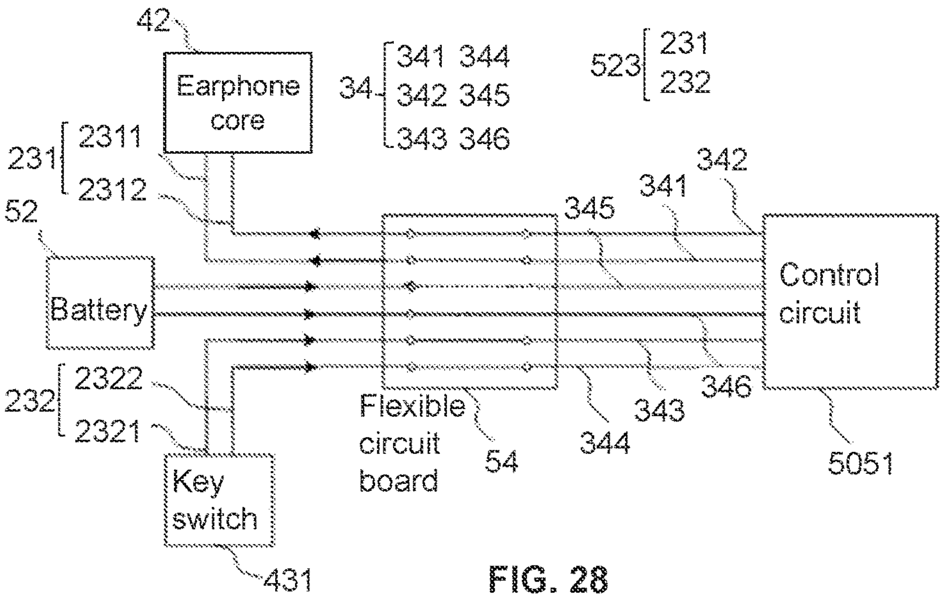
FIG. 28 is a schematic diagram of a flexible circuit board wiring at a battery according to some embodiments of the present disclosure.

FIG. 25 is a schematic structural diagram of a speaker according to some embodiments of the present disclosure. FIG. 26 is a schematic structural diagram of a battery assembly of a speaker according to some embodiments of the present disclosure. FIG. 27 is a schematic structural diagram of a battery assembly of a speaker according to some embodiments of the present disclosure. FIG. 28 is a schematic diagram of a flexible circuit board wiring at a battery according to some embodiments of the present disclosure. Referring to FIG. 25 to FIG. 28, in some embodiments, as described in the previous embodiments, the fixing mechanism 810 may include a circuit housing 100, an ear hook 500, a rear hook 300, etc., for fixing the speaker to the human body. Further, a battery assembly and a control circuit may be disposed in the fixing mechanism 810. The battery assembly may include a battery 52 including a positive terminal and a negative terminal. Furthermore, the circuit housing 100 may include a first circuit housing 100*a* and a second circuit housing 100*b*. Furthermore, the loudspeaker device may include a second flexible circuit board 54 that can be accommodated together with the battery 52 in an accommodation cavity (not shown in the figure) of the first circuit housing 100*a*. The second flexible circuit board 54 may be a flexible printed circuit (FPC).

The second flexible circuit board 54 may include a first board 541 and a second board 542. One end of the first board 541 may be fixed to the battery 52 and the other end may be connected to the second board 542. The second flexible circuit board 54 may be a whole body, and the first board 541 and the second board 542 may be two areas of the whole body. The second board 542 may be provided with pads and flexible wires connecting the pads. The first board 541 may only be provided with flexible wires for connecting the corresponding pads on the second board 542 to battery 52. Since only flexible wires are provided on the first board 541, the first board 541 may be bent, as shown in FIG. 27, so that the position of the second flexible circuit board 54 may be adjusted according to requirements.

A plurality of pads may be disposed on the second board 542 at intervals, and the plurality of pads may include two third pads 543 and a plurality of fourth pads 544. Further, two consecutive third flexible wires 545 may be commonly disposed on the first board 541 and the second board 542. The two third pads 543 may be electrically connected to the positive and negative terminals of the battery 52 by the two third flexible wires 545, respectively.

It should be noted that the first, second, third and fourth pads in the foregoing embodiments may be the same object.

In addition, the plurality of fourth pads 544 may be divided into at least two groups, and the number of the fourth pads 544 in each group may be set according to requirements. For example, the number of the fourth pads 544 in each group may be two. In addition, the two fourth pads 544 may be electrically connected to each other by the fourth flexible leads 546 disposed on the second board 542. The two fourth pads 544 in each group may be connected to functional elements through wires respectively. Therefore, the two corresponding functional elements may be connected together through the fourth flexible wire 546.

It should be noted that the first, second, third and fourth flexible leads in the foregoing embodiments may be the same object.

In the embodiment, on the one hand, the pads used for circuit switching may be all disposed on the second board 542 of the second flexible circuit board 54 and connected to the battery 52 via the first board 541 of the second flexible circuit board 54, so that the first board 541 may be bent according to space requirements to place the second board 542, thereby optimizing the space utilization of the accommodating cavity of the first circuit housing 100*a* and improving the space utilization. On the other hand, the two third pads 543 may be directly connected to the positive and negative terminals of the battery 52 through the third flexible wire 545 on the second flexible circuit board 54. There is no need to provide additional pads to lead the positive and negative electrodes of the battery 52, thereby reducing the number of pads and simplifying the structure and process.

In some embodiments, the first board 541 may be further folded and arranged so that the second board 542 may be attached to the side surface of the battery 52, and the first board 541 and the battery 52 may be stacked, thereby greatly reducing the space occupied by the battery 52 and the second flexible circuit board 54.

Specifically, the battery 52 may include a battery cell 521. The battery cell 521 may include a body region 5211 and a sealing region 5212. The body region 5211 and the sealing region 5212 may be laid flat, and the thickness of the body region 5211 may be greater than the thickness of the sealing region 5212, thereby making the side surface of the sealing region 5212 and the side surface of the body region 5211 being arranged in a stepped manner.

Specifically, the side surfaces of the sealing region 5212 and the body region 5211 in the thickness direction of the battery cell 521 may be arranged in a stepped manner, so that the second board 542 may use the space formed by the body region 5211 and the sealing region 5212 of the battery cell 521. There is no need to provide a separate space for placing the second flexible circuit board 54, thereby further improving the space utilization.

In some embodiments, the battery 52 may further include a hard circuit board 522 disposed on the side surface of the sealing region 5212 of the battery cell 521. Specifically, the positive terminal and the negative terminal may be disposed on the hard circuit board 522, and a protection circuit (not shown) may be further disposed on the hard circuit board 522, so as to protect the battery 52 from overload by the protection circuit.

In this embodiment, the end of the first board 541 away from the second board 542 may be attached and fixed to the hard circuit board 522, so that the two flexible wires on the first board 541 may be connected to the positive terminal and the negative terminal of the hard circuit board 522. Specifically, the first board 541 and the hard circuit board 522 may be directly pressed together in the manufacturing stage.

Further, the shape of the first board 541 and the second board 542 may be set according to actual conditions. In this embodiment, the shape of the first board 541 may match the shape of the scaling region 5212 of the battery cell 521, and the shapes of the first board 541 and the scaling region 5212 of the battery cell 521 may be elongated rectangles. The shape of the second board 542 may also be rectangular. The second board 542 may be disposed on one end of the first board 541 in the length direction and may be perpendicular to the first board 541 along the length direction. Further, the first board 541 may be connected to the middle area of the second board 542 in the length direction, so that the first board 541 and the second board 542 may be arranged in a T shape.

Further, on the second board 542, the third pads 543 and the fourth pads 544 may be arranged in multiple ways. For example, all the pads may be arranged at intervals along a straight line or arranged at intervals in other shapes.

In this embodiment, the two third pads 543 may be disposed in the middle area of the second board 542 at intervals along the length direction of the second board 542, and a plurality of fourth pads 544 may be further distributed on two sides of the two third pads 543 along the length direction of the second board 542, and the fourth pads 544 in each group may be adjacently arranged.

In this embodiment, the fourth pads 544 in each group may be arranged at intervals along the width direction of the second board 542, and may be staggered from each other along the length direction of the second board 542, so that the fourth pads 544 in each group may be arranged along stepped intervals. In this way, on the one hand, it is possible to avoid the formation of a flush space between the two adjacent groups of fourth pads 544, thereby making the intensity distribution on the second board 542 uniform, and reducing the occurrence of bending between the two adjacent groups of fourth pads 544, and reducing the probability that the second board 542 is broken due to bending, so as to protect the second board 542. On the other hand, the distance between the pads may be increased to facilitate soldering and reduce short circuits between different pads.

The present disclosure also provides a battery assembly. In an embodiment of the battery assembly, the battery assembly may include the battery 52 and the second flexible circuit board 54 in the foregoing embodiment. The battery assembly in this embodiment may be applied to devices such as earphones, MP3 devices, etc., that require circuit switching at the battery 52. For example, the battery assembly may be used to the loudspeaker device in the present disclosure.

In some embodiments, the rear hook 300 may be connected to one end of the first circuit housing 100*a*, and may be provided with a plurality of rear hook wires 334 (shown in FIG. 28). The ear hook 500 may be connected to the other end of the first circuit housing 100*a*, and may be provided with a plurality of ear hook wires 523.

Each group of fourth pads 544 may include two fourth pads 544, and the ear hook wires 523 and the corresponding rear hook wires 334 may be electrically connected to the two fourth pads 544 in the same group of fourth pads 544. Therefore, the functional element connected to the rear hook wire 334 and the functional element connected to the ear hook wire 523 may be connect together through the two fourth pads 544 connecting the fourth flexible leads 546 in each group.

In some embodiments, the core housing 41 may further include functional modules such as the key switch 431. In addition, the control circuit 5051 may be included in the second circuit housing 100*b*. There may be four groups of the fourth pads 544 on the second board 542.

The ear hook wire 523 may include two audio signal wires 231. i.e., the first ear hook wire 2311 and the second ear hook wire 5312 connected to the earphone core 42. The rear hook wire 334 may include the first rear hook wire 3341 and the second rear hook wire 3342 that are connected to the control circuit 5051 and are used to transmit the audio signal to the earphone core 42. Further, the first ear hook wire 2311 and the first rear hook wire 3341, and the second ear hook wire 5312 and the second rear hook wire 3342 may be respectively connected to different pads in different groups of the two groups of fourth pads 544. Specifically, the first ear hook wire 2311 and the first rear hook wire 3341 may be respectively connected to the two fourth pads 544 in the same group of fourth pads 544, and the second ear hook wire 5312 and the second rear hook wire 3342 may be respectively connected to the two fourth pads 544 of the other group of fourth pads 544, thereby electrically connecting the earphone core 42 and the control circuit 5051 together to realize the transmission of audio signals.

In addition, the ear hook wire 523 may also include at least two auxiliary signal wires 232, for example, a third ear hook wire 2321 and a fourth ear hook wire 2322 connected to the key switch 431. Correspondingly, the rear hook wire 334 may also include a third rear hook wire 3343 and a fourth rear hook wire 3344 that are connected to the control circuit 5051 and are used to transmit key signals to the key switch 431. Further, the third ear hook wire 2321 and the third rear hook wire 3343, and the fourth ear hook wire 2322 and the fourth rear wire 3344 may be respectively connected to different pads in different groups of the two groups of fourth pads 544. The two groups of fourth pads 544 may be different from the two groups of fourth pads 544 that realize the transmission of audio signals to the earphone core 42 described above. Further, the third ear hook wire 2321 and the third rear hook wire 3343 may be respectively connected to two fourth pads 544 in the same group of fourth pads 544, and the fourth ear hook wire 2322 and the fourth rear hook wire 3344 may be respectively connected to two fourth pads 544 in another group of fourth pads 544, thereby electrically connecting the key switch 431 and the control circuit 5051 together to realize the transmission of key signals.

Further, the rear hook wire 334 may also include a fifth rear hook wire 3345 and a sixth rear hook wire 3346 connected to the control circuit 5051 and used to supply power to the control circuit 5051. The fifth rear hook wire 3345 and the sixth rear hook wire 3346 may be connected to two third pads 543 respectively, thereby connecting the battery 52 and the control circuit 5051 together.

Figure 29:
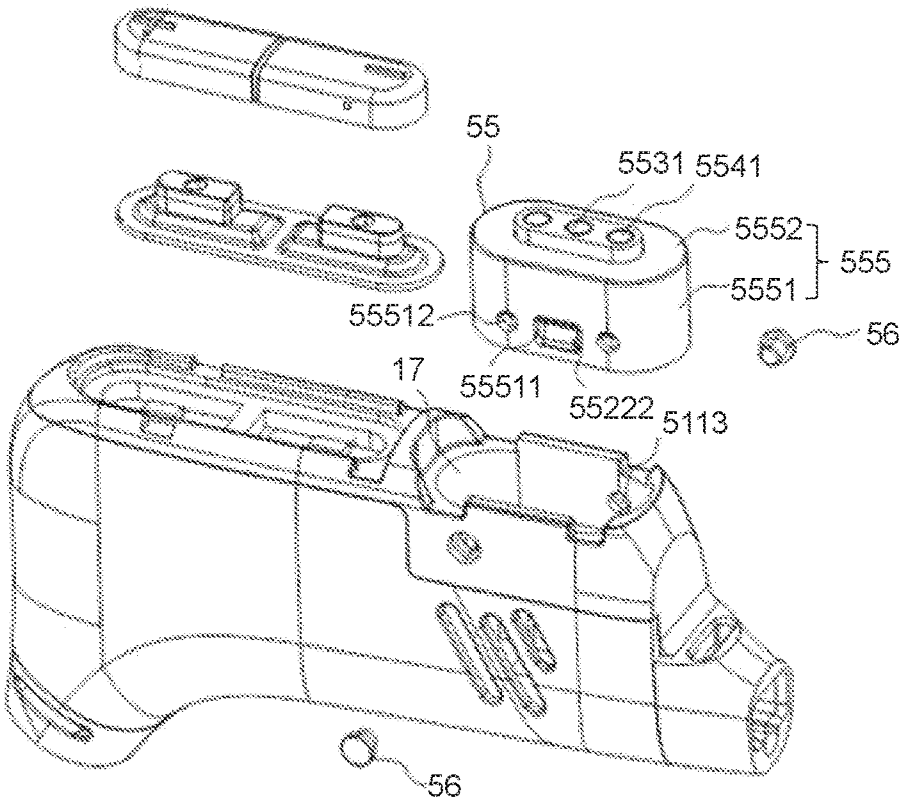
FIG. 29 is an exploded view of a partial structure of a loudspeaker device according to some embodiments of the present disclosure.
Figure 30:
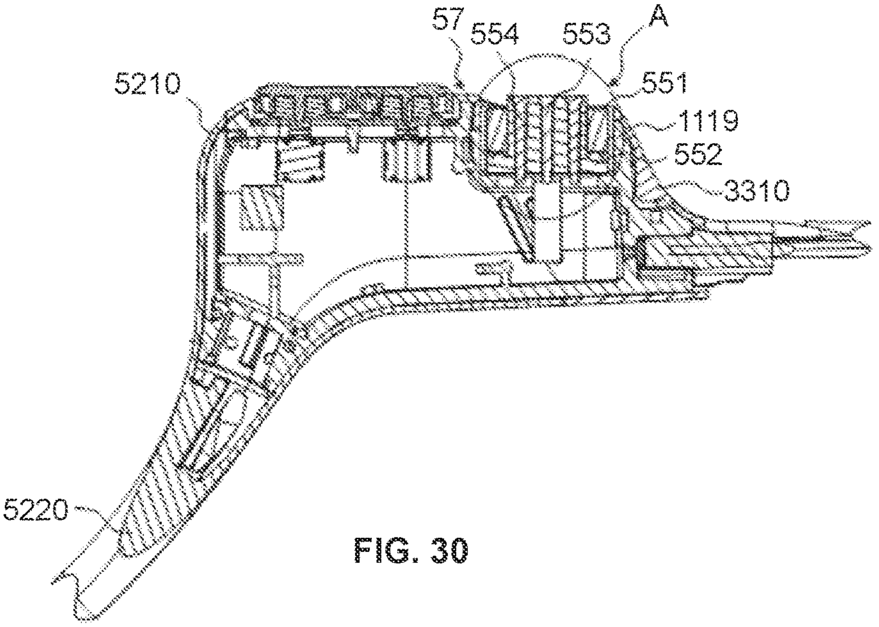
FIG. 30 is a cross-sectional view of a partial structure of a loudspeaker device according to some embodiments of the present disclosure.

FIG. 29 is an exploded view of a partial structure of a loudspeaker device according to some embodiments of the present disclosure. FIG. 30 is a cross-sectional view of a partial structure of a loudspeaker device according to some embodiments of the present disclosure. Referring to FIG. 29 and FIG. 30, in some embodiments, the loudspeaker device may further include a magnetic attraction joint 55. The magnetic attraction joint 55 may be used as a power interface to cooperate with the power interface of a charger to charge the loudspeaker device. Specifically, when the loudspeaker device is charged, the magnetic attraction joint 55 and the corresponding joint of the charger may form a system and match each other so that the magnetic attraction joint 55 and the corresponding joint of the charger may be attracted together, and then establish an electrical connection to charge the loudspeaker device. In this embodiment, the magnetic attraction joint 55 may include a magnetic attraction ring 551, an insulating base 552, a first terminal 553, and a second terminal 554.

The magnetic attraction ring 551 may be a magnet, and the magnetic polarities of the two opposite ends may be different. Correspondingly, the corresponding joint of the charger may include a magnetic attraction structure corresponding to the magnetic attraction ring 551. The magnetic attraction structure may be made of a magnetic material, such as iron. Regardless of the magnetic polarity of the outer end surface of the magnetic attraction ring 551, the magnetic attraction ring 551 and the corresponding joint of the charger may be attracted together. The magnetic attraction structure may also be a magnet. In this case, only when the magnetic polarity of the outer end surface of the magnetic attraction structure and the outer end surface of the magnetic attraction ring 551 are opposite, the magnetic polarity of the outer end surface of the magnetic attraction structure and the outer end surface of the magnetic attraction ring 551 can be attracted together. Furthermore, the magnetic attraction joint 55 and the corresponding joint may be attracted to each other in a preset relative position relationship through magnetic attraction, so as to connect the corresponding terminals of the two together to establish an electrical connection.

Specifically, the shape of the outer end surface of the magnetic attraction ring 551 may be annular, and the magnetic attraction ring 551 may be attracted with the magnetic attraction structure of the corresponding joint through the annular end surface. It should be noted that since the "hollow" design of the ring, the magnetic attraction ring 551 may be attracted and restrained in multiple directions when the magnetic attraction ring 551 is attracted to the ring magnetic attraction structure of the corresponding joint, so that the magnetic attraction ring 551 can be accurately combined with the corresponding magnetic attraction structure.

Figure 31:
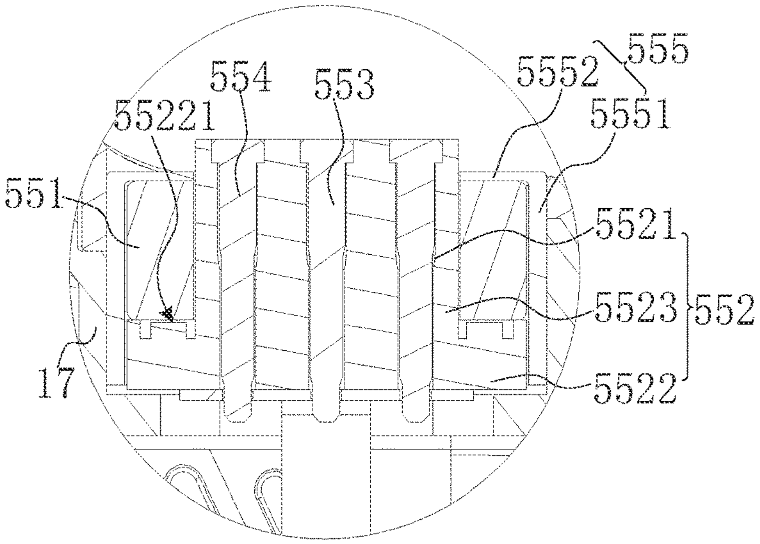
FIG. 31 is a partial enlarged view of part A in FIG. 30.

FIG. 31 is a partial enlarged view of part A in FIG. 30. In some embodiments, at least a portion of the insulating base 552 may be inserted into the magnetic attraction ring 551 to fix the magnetic attraction ring 551. The insulating base 552 may be provided with at least two accommodating holes 5521. The extending direction of the at least two accommodating holes 5521 may be consistent with the height direction of the insulating base 552. The at least two accommodating holes 5521 may at least penetrate the outer end surface of the insulating base 552. The insulating base 552 may be made of insulating materials such as Polycarbonate (PC) and Polyvinyl chloride (PVC).

Further, the first terminal 553 and the second terminal 554 may be arranged in a column shape respectively. The number of the first terminal 553 and the second terminal 554 may be the same as the number of the accommodating holes 5521 on the insulating base 552. Thus, the terminals may be inserted into the respective accommodating hole 5521, and the corresponding end face may be exposed at one end of the top surface of the insulating base 552 through the accommodating hole 5521, so as to be visible from the top surface of the insulating base 552 and flush with the top surface of the insulating base 552 to form a first contact surface 5531 and a second contact surface 5531. The first terminal 553 and the second terminal 554 may correspond to the positive terminal and the negative terminal of the power source respectively, and be used to supply power to the electronic device by connecting the positive terminal and the negative terminal of the power source. Correspondingly, the first contact surface 5531 and the second contact surface 5541 may be electrically connected to the corresponding joints through contact.

In the above embodiment, when used in conjunction with the corresponding joint, the magnetic attraction joint 55 may be adsorbed and restrained from different directions along the direction of the "hollow" annular surface of the magnetic attraction ring 551, thereby reducing the situation that the "solid" surface is easily staggered and deviated from each other and cannot be accurately positioned. The first contact surface 5531 and the second contact surface 5541 may be accurately positioned by aligning the magnetic attraction ring 551 to achieve the matching connection with the corresponding joint, thereby improving the accuracy of the docking with the corresponding joint.

In some embodiments, the insulating base 552 may include a support part 5522 and an insertion part 5523. Specifically, the support part 5522 and the insertion part 5523 may be arranged along the extending direction of the receiving hole 5521. The cross section of the support part 5522 may be larger than the cross section of the insertion part 5523, so that a support table 55221 may be formed at the junction of the support part 5522 and the insertion part 5523.

The shape of the outer side wall near the end of the insertion part 5523 may match the shape of the inner side wall of the magnetic attraction ring 551, so that the insertion part 5523 may be inserted into the magnetic attraction ring 551 and play a role of fixing the magnetic attraction ring 551. The two ends of the accommodating hole 5521 of the insulating base 552 may respectively penetrate through the end surfaces of the insertion part 5523 and the support part 5522 away from each other, so that the first terminal 553 and the second terminal 554 may penetrate the entire insulating base 552, and the first contact surface 5531 and the second contact surface 5541 may be exposed from the outer end surface of the insertion portion 5523 away from the support part 5522. Further, the first terminal 553 and the second terminal 554 may also extend from the outer end surface of the support part 5522 away from the insertion part 5523 to further connect to the internal circuit.

Specifically, the insertion part 5523 may be inserted into the ring of the magnetic attraction ring 551 from the end away from the support part 5522. The magnetic attraction ring 551 and its outer end facing the back end may be supported on the support table 55221. The size of the outer surface of the magnetic attraction ring 551 may be kept consistent with the size of the outer surface of the support part 5522, so that the structure of the magnetic joint may be more unified.

In some embodiments, the magnetic attraction joint 55 may further include a housing 555, which may be sleeved on the outer periphery of the insulating base 552 and the magnetic attraction ring 551, so that the entire magnetic attraction joint 55 may become a whole. Therefore, it is convenient for the magnetic attraction joint 55 to be further assembled on the power interface of the loudspeaker device.

The material of the housing 555 may be a metal material that is not attracted by a magnetic field, such as copper, aluminum, aluminum alloy, etc., or a plastic material, which is not specifically limited here.

In this embodiment, metal may be used as the material of the housing 555 of the magnetic attraction joint 55, so that the housing 555 may be made thin while meeting the strength requirement, so as to reduce the space occupation.

Specifically, the housing 555 may include a cylinder 5551 and a flange 5552 disposed at one end of the cylinder 5551 and protruding into the cylinder 5551, so that one end of the housing 555 where the flange 5552 is provided may be partially open, and the other end may be completely open. The shape of the inner surface of the cylinder 5551 may match the shape of the outer surface of the magnetic attraction ring 551 and the outer surface of the support part 5522 of the insulating base 552. The flange 5552 at the partially open end may cover the magnetic attraction ring 551 to expose the first contact surface 5531 and the second contact surface 5541 of the first terminal 553 and the second terminal 554, so that the housing 555 may be sleeved on the periphery of the insulating base 552, the first terminal 553, the second terminal 554, and the magnetic attraction ring 551 through the fully open end, and the flange 5552 may cover the periphery of the end of the magnetic attraction ring 551 away from the support part 5522, and expose the first contact surface 5531 and the second contact surface 5541 through the partially open end to further electrically connect with the corresponding joint.

In an application scenario, the outer end surface of the insertion part 5523 of the insulating base 552 away from the support part 5522 may be protruded relative to the end of the magnetic attraction ring 551 away from the support part 5522. At this time, the shape of the partially open end formed by the flange 5552 may match the shape of the periphery of the insertion part 5523, so that the end of the insertion part 5523 away from the support part 5522 may pass through the partially open end of the housing 555 and extend to the outside of the housing 555.

In another application scenario, the outer end surface of the insertion part 5523 of the insulating base 552 away from the support part 5522 may be recessed relative to the top surface of the flange 5552.

It should be pointed out that the magnetic attraction joint 55 in this embodiment may be applied to the power interface of the electronic device or the power interface of the charger, so as to cooperate with the power interface of the corresponding charger or the power interface of the electronic device to supply power for the electronic device. In the above manner, by protruding or recessing the top surface of the insulating base 552 relative to the top surface of the flange 5552, the magnetic attraction joint 55 may protrude into the corresponding joint, thereby forming a certain plug-in relationship between the two components to make the connection between the two components more stable.

In some embodiments, the outer peripheral wall of the support part 5522 and the inner peripheral wall of the cylinder 5551 may be respectively provided with a buckle structure that cooperates with each other. Through the buckle structure, the housing 555 may be more securely sleeved on the insulating base 552 and the magnetic attraction ring 551, thereby making the structure of the magnetic attraction joint 55 more stable.

Specifically, in an application scenario, two opposite outer surfaces of the outer peripheral wall of the cylinder 5551 may be each provided with a through groove 55511, and correspondingly, a buckle 55222 may be respectively disposed on the support part 5522 at a corresponding position of the two through grooves 55511. When assembling the magnetic attraction joint 55, the housing 555 may be sleeved on the periphery of the insulating base 552, and the hooks on the support part 5522 may be clamped on the side walls of the corresponding through groove 55511, thereby fixing the housing 555 on the periphery of the outer peripheral wall of the support part 5522.

It should be noted that the specific shape of the magnetic attraction ring 551 in the foregoing embodiments may be set according to different requirements.

In some embodiments, the outer end surface of the magnetic attraction ring 551 may be rotationally symmetric with respect to a preset symmetry point. When the magnetic attraction ring 551 performs symmetrical rotation, the first contact surface 5531 and the second contact surface 5541 may rotate with the magnetic attraction ring 551, and the first contact surface 5531 and the second contact surface 5541 before the rotation may at least partially overlap with the first contact surface 5541 and the second contact surface 5541 after the rotation, respectively. That is to say, the surface formed by the first contact surface 5531 and the second contact surface 5541 may also be or subsequent be rotationally symmetrical with respect to the preset symmetry point. The shape of the outer end surface of the magnetic attraction ring 551 and the angle of rotational symmetry may be determined according to the arrangement of the first contact surface 5531 and the second contact surface 5541.

Specifically, the outer end surface of the magnetic attraction ring 551 may be set as a circular ring, an elliptical ring, a rectangular ring, etc., according to requirements, as long as it may be consistent with the arrangement of the first contact surface 5531 and the second contact surface 5541 so that the first contact surface 5531 and the second contact surface 5541 before the symmetric rotation and the second contact surface 5541 after the symmetric rotation can partially be overlapping.

Through the above method, since the outer end surface of the magnetic attraction ring 551 is rotationally symmetrical with respect to the preset symmetry point, the magnetic attraction ring 551 may be restored to the position before the symmetrical rotation after symmetrical rotation. On the one hand, when assembling the magnetic attraction joint 55, the magnetic attraction ring 551 may include at least two relative assembly positions relative to the first contact surface 5531 and the second contact surface 5541, so as to facilitate assembly. On the other hand, when the magnetic attraction joint 55 is applied to a power interface, the magnetic attraction joint 55 may be docked with the corresponding interface at multiple rotation angles to realize normal power supply to the electronic device, which is convenient to use.

Specifically, such as FIG. 31, in some embodiments, the magnetic attraction ring 551 may be a circular ring centered on the symmetry point, and the first contact surface 5531 and the second contact surface 5541 may be respectively a circle or an annular shaped arranged concentrically with the magnetic attraction ring 551 and nested with each other.

In this way, when the magnetic attraction ring 551 rotates symmetrically at any angle at the center of the circle, the first contact surface 5531 and the second contact surface 5541 before the rotation, and the first contact surface 5531 and the second contact surface 5541 after the rotation may be overlapping. Therefore, during assembly, the magnetic attraction ring 551 only needs to be sleeved concentrically with the first contact surface 5531 and the second contact surface 5541 on the periphery of the insertion part 5523 of the insulating base 552, and there is no need to compare other positions. At the same time, when the magnetic attraction joint 55 is docked with the corresponding joint, it is only necessary to make the magnetic attraction ring 551 correspond to the magnetic attraction structure of the corresponding joint concentrically. That is, the first contact surface 5531 and the second contact surface 5541 may be connected to the positive terminal and the negative terminal of the corresponding interface correspondingly, without further calibration in other ways, which is convenient for users to use.

Figure 32:
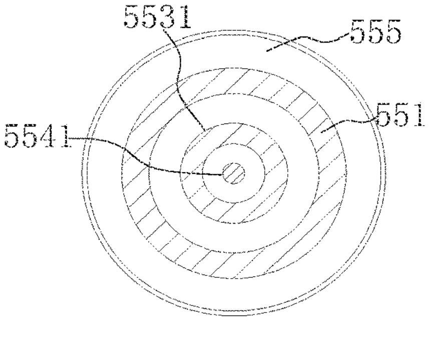
FIG. 32 is a first top view of a magnetic attraction joint of a loudspeaker device according to some embodiments of the present disclosure.

FIG. 32 is a first top view of a magnetic attraction joint of a loudspeaker device according to some embodiments of the present disclosure. In some embodiments, such as FIG. 32, the magnetic attraction ring 551 may be 180 degrees rotationally symmetrical with respect to the symmetry point, that is, when the magnetic attraction ring 551 rotates 180 degrees with respect to the symmetry point, the first contact surface 5531 and the second contact surface 5541 before the rotation, and the first contact surface 5531 and the second contact surface 5541 after the rotation may be at least partially overlapping.

The size of the magnetic attraction ring 551 may be different in the first direction and the second direction that pass through the symmetry point and are perpendicular to each other. For example, the outer end surface of the magnetic adsorption ring 551 may be an elliptical ring, a rectangular ring, etc., which is not specifically limited here.

In an application scenario, the size in the first direction may be larger than the size in the second direction. The number of the first contact surface 5531 may be one and the first contact surface 5531 may be arranged on the symmetry point of the magnetic attraction ring 551. The number of the second contact surface 5541 may be two, so that when the magnetic attraction ring 551 rotates relative to the symmetry point, the two second contact surfaces 5541 may rotate relative to the first contact surface 5531. When the magnetic attraction ring 551 rotates 180 degrees, the two second contact surfaces 5541 may switch positions.

Further, the two second contact surfaces 5541 may be arranged on both sides of the symmetry point along the first direction, and when the magnetic attraction ring 551 rotates 180 degrees, any one of the two second contact surfaces 5541 before the rotation respectively may at least partially overlap with another second contact surface 5541 after the rotation. Since the two contact surfaces are arranged in the first direction, before and after the rotation, the two second contact surfaces 5541 may be located on the same straight line and exchange positions with each other, that is, one of the second contact surfaces 5541 may be located on the other second contact surface 5541 before the rotation after rotation. Therefore, when any one of the two second contact surfaces 5541 before rotation at least partially overlaps the other second contact surface 5541 after rotation, the two second contact surfaces 5541 may both at least partially overlap before and after the rotation.

Specifically, the first contact surface 5531 and the two second contact surfaces 5541 may be rotationally symmetrical 180 degrees with respect to the symmetry point, that is, the first contact surface 5531 and the second contact surface 5541 may be rotationally symmetrical at 180 degrees relative to the center point of the first contact surface 5531, so that the first contact surface 5531 and the second contact surface 5541 before the symmetrical rotation, and the first contact surface 5531 and the second contact surface 5541 after the symmetrical rotation may completely overlap, but cannot be completely overlapped when rotated by other degrees.

The shape of the first contact surface 5531 and the shape of the second contact surface 5541 may be the same or different, but the shapes of the two second contact surfaces 5541 need to be correspondingly the same. For example, both the first contact surface 5531 and the second contact surface 5541 may be circular surfaces, or other surfaces that can completely overlap after being rotated 180 degrees around the center point of the first contact surface 5531.

Through the above method, since before and after the magnetic attraction ring 551 rotates 180° with respect to the symmetry point, the magnetic attraction ring 551 may face two opposite directions, and at the same time, the first contact surface 5531 and the second contact surface 5541 before rotating 180°, and the first contact surface 5531 and the second contact surface 5541 after rotating 180° may at least partially overlap. When assembling the magnetic attraction joint 55, the magnetic attraction ring 551 may be sleeved on the periphery of the insertion part 5523 of the insulating base 552 of the first terminal 553 and the second terminal 554 in two opposite directions, so as to facilitate assembly. In addition, when the magnetic attraction joint 55 is docked with the corresponding joint, the docking can also be achieved in two opposite directions, which is convenient for users to use.

In some embodiments, the magnetic attraction ring 551 may be divided into at least two ring segments 5511 along the circumferential direction, wherein the outer end surfaces of the adjacent ring segments 5511 may have different magnetic polarities.

The division of the ring segments 5511 may be carried out according to certain rules. For example, when the outer end surface of the magnetic attraction ring 551 is annular, the magnetic attraction ring 551 may be divided into equal parts along the radial direction of the annular shape. For example, the magnetic attraction ring 551 may be divided into four equal parts to obtain four symmetrically distributed quarter ring segment 5511 with the same shape, or the magnetic attraction ring 551 may be randomly divided into multiple ring segments 5511 with different shapes, which are not specifically limited here.

Specifically, in actual use, it is necessary to contact the first contact surface 5531 and the second contact surface 5541 with the exposed surface of the corresponding terminal of the corresponding joint to establish an electrical connection between the magnetic attraction joint 55 and the corresponding joint, thereby supplying power to the loudspeaker device. When the first contact surface 5531 and the second contact surface 5541 are incorrectly connected to the exposed surfaces of the terminal in the corresponding joint, the correct electrical connection cannot be established between the magnetic attraction joint 55 and the corresponding joint, and thus cannot supply power to the loudspeaker device. In this embodiment, the magnetic polarity of the outer end surface of each ring segment 5511 may be set according to the connection mode of the first contact surface 5531 and the second contact surface 5541 with the terminal in the corresponding joint, so that when the first contact surface 5531 and the second contact surface 5541, and the corresponding joints are correct, the magnetic polarity of the outer end surface of the magnetic structure of the corresponding joints may be the same as the magnetic polarity of the outer end surface of the corresponding ring segment 5511 of the magnetic attraction joint 55. Thus, the two joints may be butted together due to the attraction of opposite polarity, so as to establish the correct connection relationship between the two joints. When the first contact surface 5531 and the second contact surface 5541, and the corresponding joints are incorrect, the magnetic polarity of the outer end face of the magnetic structure of the corresponding joint may be the same as that of the outer end face of the corresponding ring segment 5511 of the magnetic attraction joint 55, so that the joints cannot be butted together due to the repulsion of the same polarity, thereby avoiding the establishment of an incorrect connection and making the magnetic attraction joint 55 unable to perform normal work, improving the accuracy and efficiency of docking, and bringing convenience to users.

In some embodiments, the magnetic attraction ring 551 may be divided into two ring segments 5511 along the circumferential direction.

Specifically, the shape of the outer end surface of the magnetic attraction ring 551 may be a regular symmetrical ring, such as an elliptical ring, a circular ring, a rectangular ring, etc., as described in the above embodiment, so that the magnetic attraction ring 551 can be divided into two ring segments 5511 along the symmetry axis of the regular ring, or the magnetic attraction ring 551 can also be an irregular ring, and correspondingly divided into two asymmetric ring segments 5511, which may be specifically set according to requirements, and there is no specific limitation here.

Figure 33:
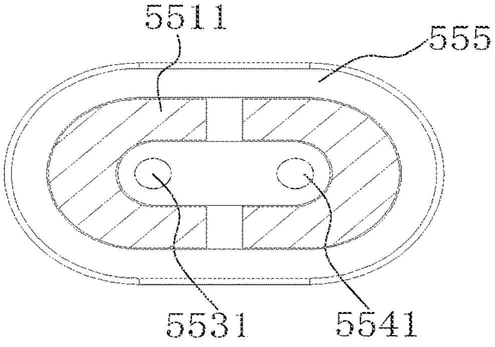
FIG. 33 is a second top view of a magnetic attraction joint of a loudspeaker device according to some embodiments of the present disclosure.
Figure 34:
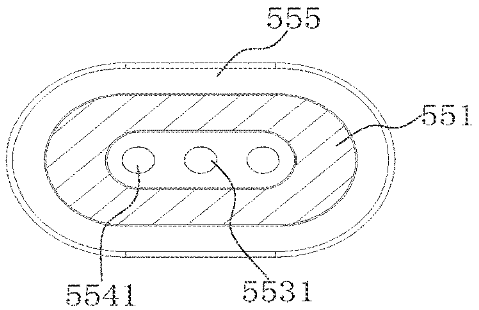
FIG. 34 is a third top view of a magnetic attraction joint of a loudspeaker device according to some embodiments of the present disclosure.

FIG. 33 is a second top view of a magnetic attraction joint of a loudspeaker device according to some embodiments of the present disclosure. FIG. 34 is a third top view of a magnetic attraction joint of a loudspeaker device according to some embodiments of the present disclosure. In an application scenario, such as FIG. 33 and FIG. 34, the number of the first contact surface 5531 and the number of the second contact surface 5541 may be one, respectively, and the first contact surface 5531 and the second contact surface 5541 may be arranged side by side at intervals corresponding to the positive and negative terminals of the electronic device, respectively. The magnetic attraction ring 551 may be 180-degree rotationally symmetrical with respect to the symmetry point, and the sizes of the magnetic attraction ring 551 in the first direction and the second direction which pass through the symmetry point and are perpendicular to each other may be different. Specifically, the size of the magnetic attraction ring 551 in the first direction may be larger than the size in the second direction, and the shape of the outer end surface thereof may be an elliptical ring. Further, the elliptical ring may be divided into two ring segments 5511 arranged side by side at intervals along its axis of symmetry in the first direction or the second direction. The magnetic polarity of the outer end surface of one ring segment 5511 may be N-pole, and the magnetic polarity of the outer end surface of the other ring segment 5511 may be S-pole. Further, the first contact surface 5531 and the second contact surface 5541 of the magnetic attraction joint 55 may also be arranged side by side and spaced apart. Each contact surface may be 180-degree rotationally symmetrical with the symmetry point of the magnetic attraction ring 551 as the symmetry point.

Correspondingly, the shape and number of the magnetic attraction structure of the corresponding joint may be consistent with the shape and number of the magnetic attraction ring 551 of the magnetic attraction joint 55, and the magnetic polarity of the outer end surface may be correspondingly opposite.

At this time, when the first contact surface 5531 and the second contact surface 5541 are correctly connected to the corresponding terminals in the corresponding joint, the two ring segments 5511 of the magnetic attraction ring 551 and the magnetic attraction structure in the corresponding joint may be attracted by opposite polarities. When the first contact surface 5531 and the second contact surface 5541 are incorrectly connected to the corresponding terminals in the corresponding joint, the outer end surface of the ring segment 5511 in the magnetic attraction joint 55 with N-pole of the magnetic polarity may correspond to the N-pole in the magnetic attraction structure, and the outer end surface of the ring segment 5511 with the S-pole of the magnetic polarity may correspond to the S-pole in the magnetic attraction structure, so that the same polarity repels and cannot be connected together, thereby avoiding incorrect connection and facilitating users to use.

The present disclosure also provides a magnetic attraction joint 55. The magnetic attraction structure may include the specific structure of the magnetic attraction joint 55 in the loudspeaker device described above. The magnetic attraction joint 55 may be used for the power interface of the electronic equipment including the loudspeaker device of the present disclosure, or may be used for the power interface of the charger. The magnetic attraction joint 55 may be used for positioning and electrically connecting the power interface of the electronic device and the power interface of the charger with the corresponding joint used in conjunction with the magnetic attraction joint 55 through magnetic attraction, so as to supply power to the electronic device. For the related structures and the technical effects that may be produced, please refer to the above-mentioned embodiment, which may not be repeated here.

The present disclosure also provides a magnetic attraction joint 55 assembly. The magnetic attraction joint 55 assembly may include two magnetic attraction joints 55 in the above-mentioned embodiments of the magnetic attraction joint 55. The number and shape of the ring segments 5511 on the two magnetic attraction joints 55 may correspond to each other, and the magnetic polarities of the outer end surfaces of the corresponding ring segments 5511 may be opposite to each other, so that when the corresponding ring segments 5511 are attracted to each other, the first contact surface 5531 and the second contact surface 5541 of the two magnetic attraction joints 55 may be respectively contact each other. For other related details, referring to the foregoing embodiment, which may not be repeated here.

It should be pointed out that through the above method, the magnetic polarity of the outer end surface of each ring segment 5511 of the two magnetic joints 55 may be set, so that when the first contact surface 5531 and the second contact surface 5541 of the two magnetic joints 55 are in contact with each other, the magnetic polarities of the outer end faces of the corresponding ring segments 5511 may be contrast, so that the two magnetic joints 55 may be butted together due to the attraction of opposite polarities, thereby establishing the correct connection relationship between the two magnetic joints 55. When the first contact surface 5531 and the second contact surface 5541 of one magnetic joint 55 correspond to the second contact surface 5541 and the first contact surface 5531 of the other magnetic attraction joint 55, the magnetic polarities of the outer end faces of the corresponding ring segment 5511 may be the same, so the two magnetic attraction joints 55 cannot be butted together due to the repulsion of the same polarity, thereby reducing the probability of establishing an incorrect connection between the two magnetic attraction joints 55, and improving the accuracy and efficiency of docking.

Further, in the embodiments of the loudspeaker device in the present disclosure, the magnetic attraction joint 55 may be disposed in a circuit housing 100, and specifically may be disposed in the circuit housing 100 for accommodating the control circuit 5051.

In an application scenario, the two main side walls 1110 of the circuit housing 100 may be spaced apart from each other, and the inner surface of at least one main side wall 1110 may be formed with two blocking walls 1119 spaced apart from each other. The two blocking walls 1119 may be arranged in parallel with the end wall 1113 of the circuit housing 100. The two main side walls 1110 and the two blocking walls 1119 may enclose an accommodation space, and the accommodation space may be arranged on the side close to an auxiliary side wall 1112, and the magnetic attraction joint 55 may be disposed in the accommodation space.

The two main side walls 1110 may be further provided with mounting holes 5113, and the loudspeaker device may further include two fixing members 56. The two fixing members 56 may be inserted into the mounting holes 5113 of the two main side walls 1110. The opposite sides of the magnetic attraction joint 55 may abut against the magnetic attraction joint 55.

Further, the number of the mounting holes 5113 and the number of the fixing members 56 may be the same. Specifically, the fixing member 56 may be a screw. The screw may pass through the mounting hole 5113 from the outer side of the main side wall 1110, so that one end of the screw may abut against the outer side wall of the magnetic attraction joint 55, and the other end may be fixed in the mounting hole 5113.

In an application scenario, a mounting hole 5113 may be respectively disposed on each of the two main side walls 1110. The magnetic attraction joint 55 may be 180-degree rotationally symmetrical around the magnetic attraction joint 55 with respect to the insertion direction of the accommodation space surrounded by the two main side walls 1110 and the two blocking walls 1119. Two mounting holes 55512 capable of receiving the fixing member 56 may be respectively disposed on opposite sides of the magnetic attraction joint 55. After the magnetic attraction joint 55 is symmetrically rotated and inserted into the accommodation space, the two mounting holes 55512 on each side of the magnetic attraction joint 55 may have one mounting hole 55512 aligned with the mounting hole 5113.

Specifically, the mounting hole 5113 may be used to receive the outer end of the fixing member 56, and the mounting hole 55512 may be used to receive the inner end of the fixing member 56. By penetrating the mounting hole 5113 and the mounting hole 55512 at both ends of the fixing member 56 through, respectively, the magnetic attraction joint 55 may be fixed in the accommodation space enclosed by the two main side walls 1110 and the two blocking walls 1119.

It should be pointed out that the magnetic attraction joint 55 may be 180-degree rotationally symmetrical, so that there may be two corresponding mounting holes 55512 corresponding to the mounting holes 5113 before and after the 180-degree rotation. And then the magnetic attraction joint 55 may be fixed under the two relative positions, so as to facilitate the assembly.

Further, the first housing sheath 5210 or the second housing sheath 3310 may cover the mounting hole 5113 disposed on the main side wall 1110, and the corresponding first housing sheath 5210 and/or second housing sheath 3310 may be provided with an exposed hole 57 that allows the magnetic attraction joint 55 to be exposed for convenient use.

Figure 35:
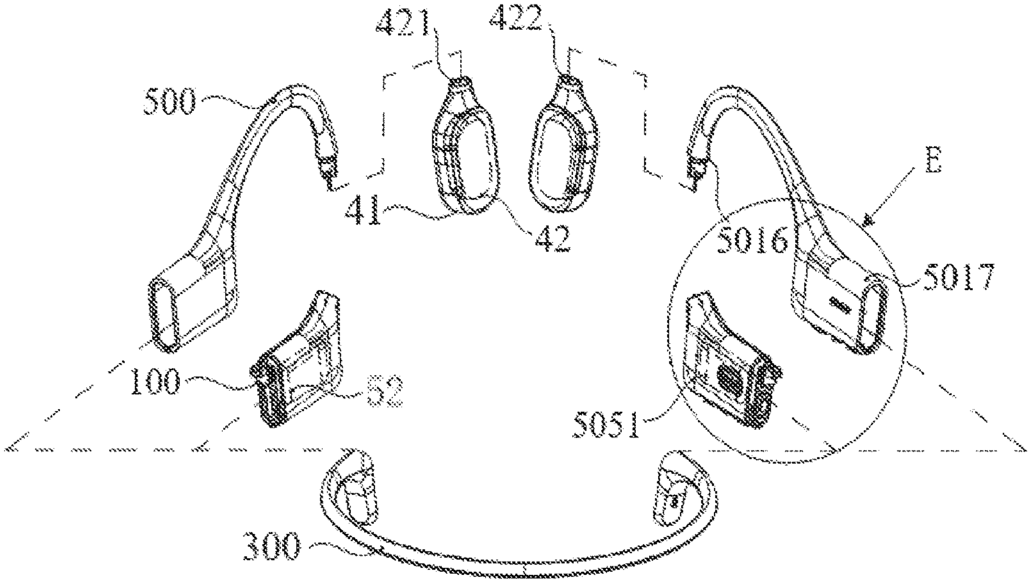
FIG. 35 is an exploded structural diagram of a speaker according to some embodiments of the present disclosure.

FIG. 35 is an exploded structural diagram of a speaker according to some embodiments of the present disclosure. As shown in FIG. 35, a speaker apparatus may include an ear hook 500, a circuit housing 100, a core housing 41, a rear hook 300, an earphone core 42, a control circuit 5051, and a battery 52. The core housing 41 and the circuit housing 100 may be disposed at two ends of the ear hook 500 respectively, and the rear hook 300 may be further disposed at an end of the circuit housing 100 away from the ear hook 500. The number of the core housings 41 may be two, which may be used to accommodate two earphone cores 42 respectively. The number of the circuit housings 100 may also be two, which may be used to accommodate the control circuit 5051 and the battery 52 respectively. The two ends of the rear hook 300 may be connected to the corresponding circuit housings 100 respectively. The ear hook 500 may include a first clastic metal wire 5011, a wire 5012, a fixed sleeve 5013, a plug end 513, and a plug end 515. The plug end 513 and the plug end 515 may be disposed at both ends of the first clastic metal wire 5011. The ear hook 500 may further include a protective sleeve 5016 and a housing sheath 5017 integrally formed with the protective sleeve 5016.

Figure 36:
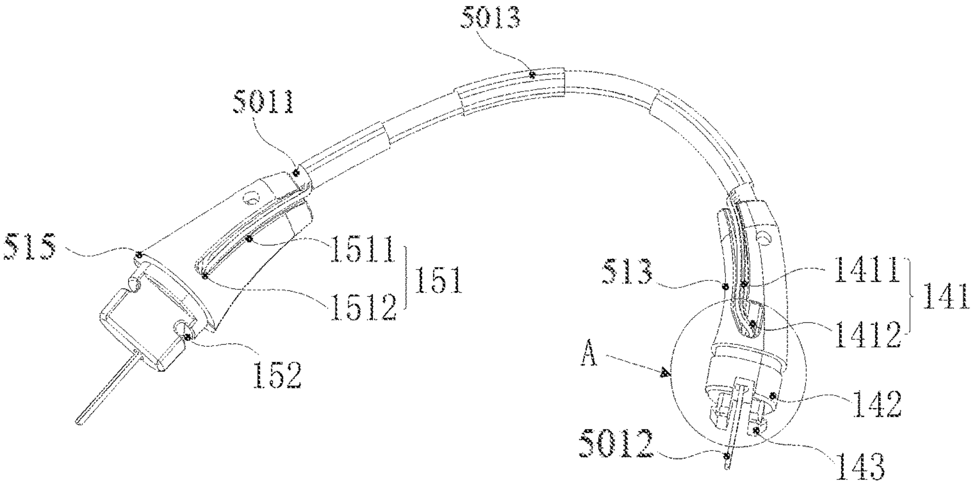
FIG. 36 is a partial structural diagram of an ear hook of a speaker according to some embodiments of the present disclosure.
Figure 37:
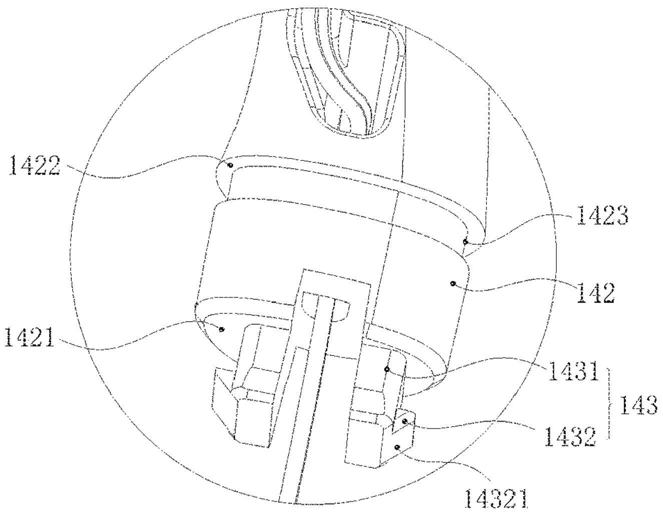
FIG. 37 is a partial enlarged view of part A in FIG. 36.
Figure 38:
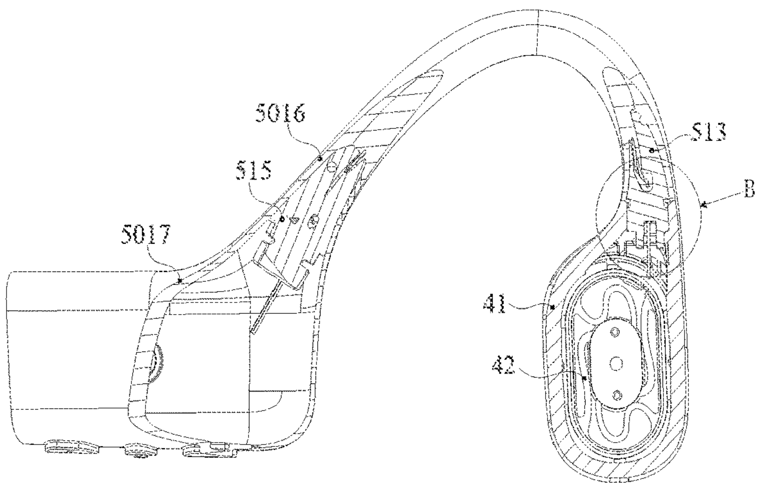
FIG. 38 is a partial sectional view of a speaker according to some embodiments of the present disclosure.
Figure 39:
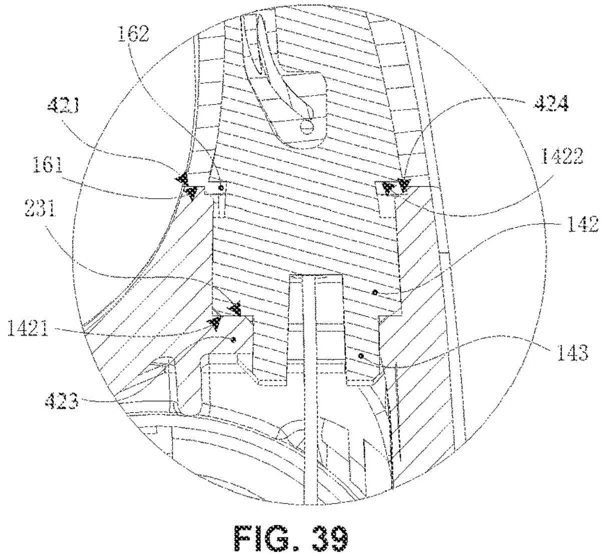
FIG. 39 is a partial enlarged view of part B in FIG. 38.
Figure 40:
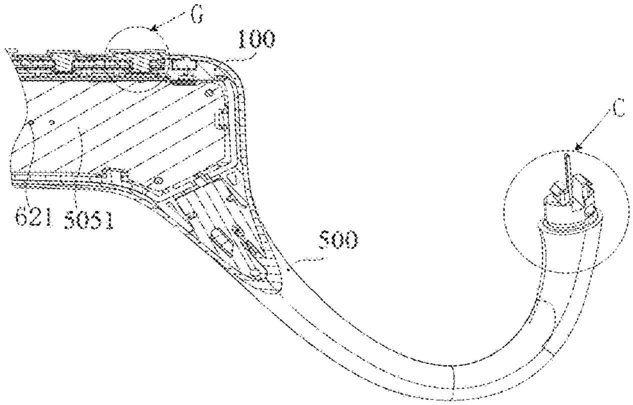
FIG. 40 is a partial sectional view of a speaker according to some embodiments of the present disclosure.
Figure 41:
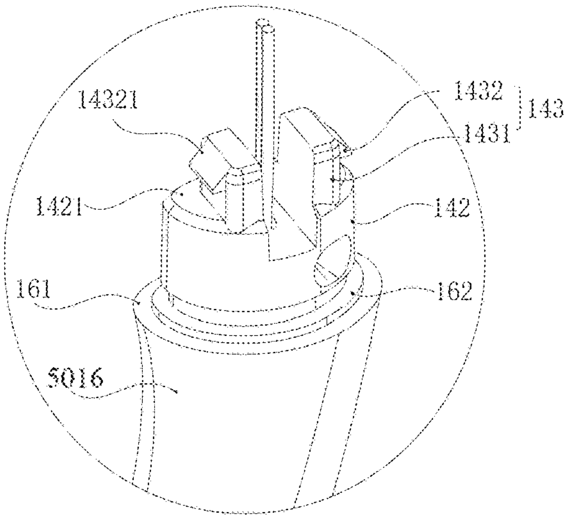
FIG. 41 is a partial enlarged view of part C in FIG. 40.

FIG. 36 is a partial structural diagram of an ear hook of a speaker according to some embodiments of the present disclosure. FIG. 37 is a partial enlarged view of part A in FIG. 36. FIG. 38 is a partial sectional view of a speaker according to some embodiments of the present disclosure. FIG. 39 is a partial enlarged view of part B in FIG. 38. FIG. 40 is a partial sectional view of a speaker according to some embodiments of the present disclosure. FIG. 41 is a partial enlarged view of part C in FIG. 40. In some embodiments, the outer end surface 421 of the core housing 41 refers to the end surface of the core housing 41 facing the ear hook 500. The socket 422 may provide an accommodation space for the plug end 513 of the ear hook 500 to be inserted into the core housing 41, so as to further realize the plug and fixation between the plug end 513 and the core housing 41.

Further, a stopping block 423 may be formed by protruding from the inner side wall of the socket 422 in a direction perpendicular to the inner side wall. Specifically, the stopping block 423 may be a plurality of block-shaped protrusions arranged at intervals, or may also be ring-shaped protrusions along the inner side wall of the socket 422, which is not specifically limited here.

As used herein, the plug end 513 may include an inserting portion 142 and two clastic hooks 143. Specifically, the inserting portion 142 may be at least partially inserted into the socket 422 and abut against the outer side surface 233 of a stopping block 423. The shape of the outer sidewall of the inserting portion 142 matches the shape of the inner sidewall of the socket 422, so that the outer sidewall of the inserting portion 142 may abut against the inner sidewall of the socket 422 when the inserting portion 142 is at least partially inserted into the socket 422.

It should be noted that the outer side surface 233 of the stopping block 423 refers to a side of the stopping block 423 facing the ear hook 500. The inserting portion 142 may further include an end surface 1421 facing the core housing 41. The end surface 1421 may match the outer side surface 233 of the stopping block 423, so that the end surface 1421 of the inserting portion 142 may abut against the outer side surface 233 of the stopping block 423 when the inserting portion 142 is at least partially inserted into the socket 422.

Specifically, the cross-sectional shape of the socket 422 of the core housing 41 along the insertion direction perpendicular to the plug end 513 with respect to the core housing 41 may be or substantially be an oval shape. Correspondingly, the cross-sectional shape of the inserting portion 142 may be a nearly oval shape matching the socket 422. Of course, the shapes of the cross-section of the socket 422 and the cross-section of the inserting portion 142 may also be other shapes, which can be specifically set according to actual needs.

Further, the two clastic hooks 143 may be arranged side by side and spaced apart symmetrically on the side of the inserting portion 142 facing the inside of the core housing 41 along the direction of insertion. Each clastic hook 143 may include a beam portion 1431 and a hook portion 1432. The beam portion 1431 may be connected to the side of the inserting portion 142 facing the core housing 41. The hook portion 1432 may be arranged on the beam portion 1431 away from the inserting portion 142 and extend perpendicular to the inserted direction. Further, each hook portion 1432 may be arranged with a side parallel to the inserted direction and a transitional slope 14321 away from the inserting portion 142.

Specifically, during the installation process of the ear hook 500 and the core housing 41, the plug end 513 may gradually enter the core housing 41 from the socket 422. When the plug end 513 reaches the position of the stopping block 423, the hook portions 1432 of the two elastic hooks 143 may be blocked by the stopping block 423. Under the action of external thrust, the stopping block 423 may gradually squeeze the transitional slopes 14321 of the hook portions 1432 so that the two clastic hooks 143 may be elastically deformed and come close to each other. When the transitional slopes 14321 pass through the stopping block 423 and reach the side of the stopping block 423 close to the inside of the core housing 41, the two clastic hooks 143 may be elastically restored due to the loss of the stopping block 423 and be stuck on an inner surface of the stopping block 423 facing the core housing 41. Thus, the stopping block 423 may be clamped between the inserting portion 142 of the plug end 513 and the hook portion 1432, thereby realizing the fixation of the core housing 41 and the plug end 513.

In some embodiments, after the core housing 41 and the plug end 513 are plugged and fixed, the inserting portion 422 may be partially inserted into the socket 22. The exposed portion of the inserting portion 142 may be arranged in a stepped manner, so as to form an annular table surfaces 1422 spaced apart from the outer end surface 421 of the core housing 41.

It should be noted that the exposed portion of the inserting portion 142 refers to the portion of the inserting portion 142 exposed to the core housing 41. Specifically, the exposed portion of the inserting portion 142 refers to the portion exposed to the core housing 41 and close to the outer end surface of the core housing 41.

In some embodiments, the annular table surface 1422 may be disposed opposite to the outer end surface 421 of the core housing 41. The spacing between the two may refer to the spacing along the direction of insertion and the spacing perpendicular to the direction of insertion.

In some embodiments, the protective sleeve 5016 may extend to the side of the annular table surface 1422 facing the outer end surface 421 of the core housing 41. When the socket 422 and the plug end 513 of the core housing 41 are plugged and fixed, the protective sleeve 5016 may be at least partially filled in the space between the annular table surface 1422 and the outer end surface 421 of the core housing 41, and elastically abut against the core housing 41. Thus, it is difficult for external liquid to enter the inside of the core housing 41 from the junction between the plug end 513 and the core housing 41, thereby realizing the sealing between the plug end 513 and the socket 422, protecting the earphone core 42, etc. inside the core housing 41, and improving the waterproof effect of the speaker apparatus.

In some embodiments, the protective sleeve 5016 may form an annular abutting surface 161 on a side of the annular table surface 1422 facing the outer end surface 421 of the core housing 41. The annular abutting surface 161 may be the end surface of the protective sleeve 5016 facing the core housing 41.

In some embodiments, the protective sleeve 5016 may further include an annular boss 162 locating inside the annular abutting surface 161 and protruding from the annular abutting surface 161. Specifically, the annular boss 162 may be formed on the side of the annular abutting surface 161 facing the plug end 513, and be protruding toward the core housing 41 relative to the annular abutting surface 161. Further, the annular boss 162 may also be directly formed on the periphery of the annular table surface 1422 and cover the annular table surface 1422.

In some embodiments, the core housing 41 may include a connecting slope 424 for connecting the outer end surface 421 of the core housing 41 and the inner sidewall of the socket 422. The connecting slope 424 may be the transitional surface between the outer end surface 421 of the core housing 41 and the inner sidewall of the socket 422. The connecting slope 424 may be not on the same plane as the outer end surface 421 of the core housing 41 and the inner sidewall of the socket 422. The connecting slope 424 may be a flat surface, or may also be a curved surface or other shapes according to actual requirements, there is no specific limitation herein.

In some embodiments, when the core housing 41 and the plug end 513 are plugged and fixed, the annular abutting surface 161 and the annular boss 162 may elastically abut against the outer end surface of the core housing 41 and the connecting slope 424, respectively.

It should be noted that since the outer end surface 421 of the core housing 41 and the connecting slope 424 are not on the same plane, the clastic abutment between the protective sleeve 5016 and the core housing 41 may be not on the same plane. Thus, it is difficult for external liquid to enter the core housing 41 from the junction of the protective sleeve 5016 and the core housing 41, and further enter the earphone core 42, so as to improve the waterproof effect of the speaker, protect the inner functional structure, and extend the lifetime of the speaker.

In some embodiments, the inserting portion 142 may be further formed with an annular groove 1423 adjacent to the annular table surface 1422 on the side of the annular table surface 1422 facing the outer end surface 421 of the core housing 41. The annular boss 162 may be formed in the annular groove 1423.

In some embodiments, the annular groove 1423 may be formed on the side of the annular table surface 1422 facing the core housing 41. In an application scenario, the annular table surface 1422 may be the side wall surface of the annular groove 1423 facing the core housing 41. At this time, the annular boss 162 may be formed in the annular groove 1423 along the side wall surface.

Figure 42:
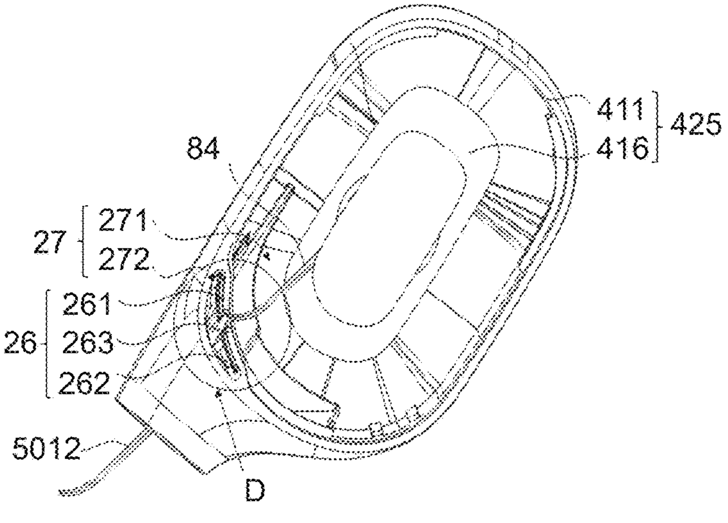
FIG. 42 is a partial structural diagram of a core housing of a speaker according to some embodiments of the present disclosure.
Figure 43:
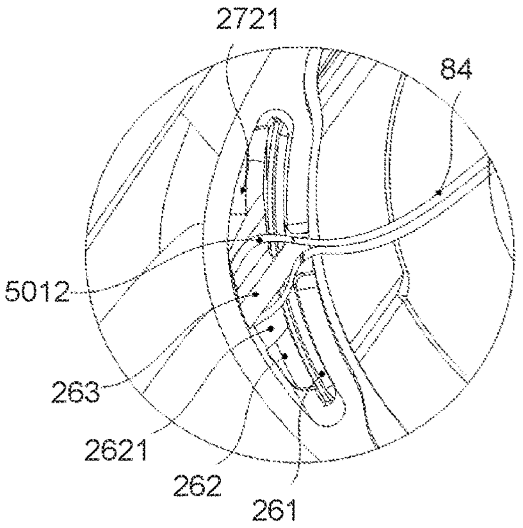
FIG. 43 is a partial enlarged view of part D in FIG. 42.
Figure 44:
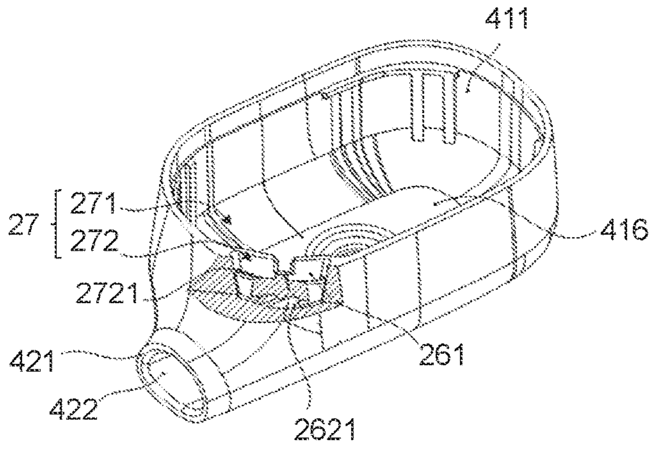
FIG. 44 is a partial sectional view of a core housing of a speaker according to some embodiments of the present disclosure.

FIG. 42 is a partial structural diagram of a core housing of a speaker according to some embodiments of the present disclosure. FIG. 43 is a partial enlarged view of part D in FIG. 42. FIG. 44 is a partial sectional view of a core housing of a speaker according to some embodiments of the present disclosure.

Combing FIG. 42, FIG. 43, FIG. 44, and FIG. 45, the core housing 41 may include a main housing 425 and a partition component 426. The partition component 426 may be arranged inside the main housing 425 and connected to the main housing 425, so as to divide the inner space 27 of the main housing 425 into a first accommodation space 271 and a second accommodation space 272 on the side close to the socket 422.

In some embodiments, the main housing 425 may include a peripheral sidewall 411 and a bottom wall 416 connected to one end surface of the peripheral sidewall 411. The peripheral sidewall 411 and the bottom wall 416 jointly form the inner space 27 of the main housing 425.

In some embodiments, the partition component 26 may be disposed on the side of the main housing 425 close to the socket 422 and include a side partition 261 and a bottom partition 262. The side partition 261 may be arranged in a direction perpendicular to the bottom wall 416 and both ends of the side partition 261 may be connected with the peripheral sidewall 411, thereby separating the inner space 27 of the main housing 425. The bottom partition 262 and the bottom wall 416 may be parallel or nearly parallel and spaced apart. Further, the bottom partition 262 and the bottom wall 416 may be connected to the peripheral side wall 411 and the side partition 261, respectively. Thus, the inner space 27 formed by the main housing 425 may be divided into two to form the first accommodation space 271 surrounded by the side partition 261, the bottom partition 262, the peripheral sidewall 411 away from the socket 422, and the bottom wall 416, and the second accommodation space 272 surrounded by the bottom partition 262, the side partition 261, and the peripheral sidewall 411 close to the socket 422. The second accommodation space 272 may be smaller than the first accommodation space 271.

The partition component 26 may also divide the inner space 27 of the main housing 425 by other arrangements, which are not specifically limited herein.

In some embodiments, the partition component 26 may further include an inner partition 263. The inner partition 263 may further divide the second accommodation space 272 into two sub-accommodation spaces 2721. Specifically, the inner partition 263 may be arranged perpendicular to the bottom wall 416 of the main housing 425 and connected to the side partition 261 and the peripheral sidewall 411 respectively, and further extend to the wiring hole 2621, so as to divide the wiring hole 2621 into two, while dividing the second accommodation space 272 into two sub-accommodation spaces 2721. Each of the two wiring holes 2621 may be connected with a corresponding sub-accommodation space 2721 respectively.

In some embodiments, the second accommodation space 272 may be further filled with sealant. In this way, the wire 5012 and the wire 84 included in the second accommodation space 272 may be further fixed, which may reduce the adverse effect on the sound quality caused by the vibration of the wire, improve the sound quality of the speaker, and protect the welding point between the wire 5012 and the wire 84. In addition, the purpose of waterproof and dustproof may also be achieved by sealing the second accommodation space 272.

Figure 45:
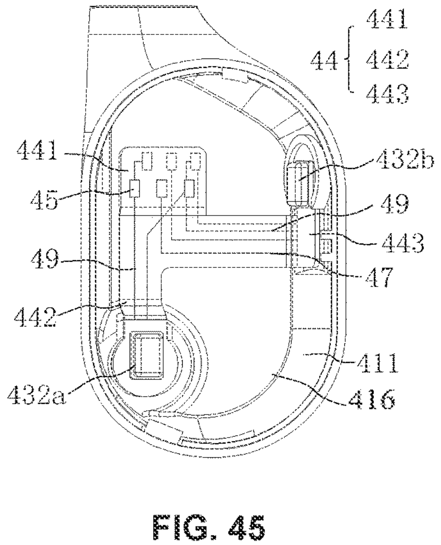
FIG. 45 is a schematic structural diagram illustrating a partial structure of a loudspeaker device according to some embodiments of the present disclosure.
Figure 46:
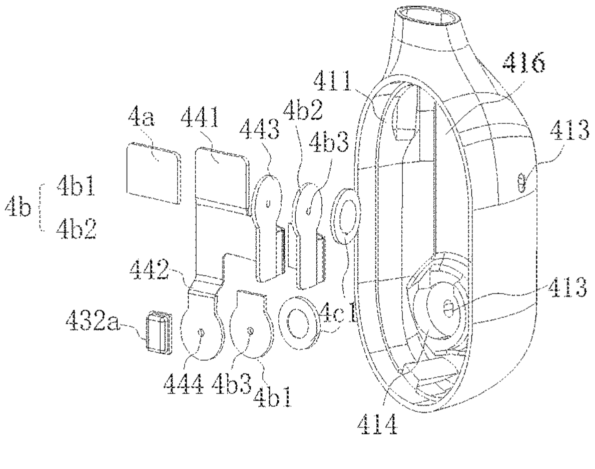
FIG. 46 is an exploded view of a partial structure of a loudspeaker device according to some embodiments of the present disclosure.
Figure 47:
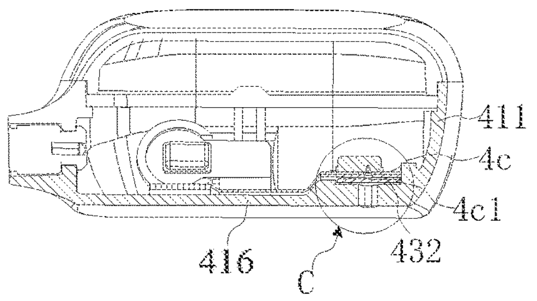
FIG. 47 is a cross-sectional view of a partial structure of a loudspeaker device according to some embodiments of the present disclosure.

FIG. 45 is a schematic structural diagram illustrating a partial structure of a loudspeaker device according to some embodiments of the present disclosure. FIG. 46 is an exploded view of a partial structure of a loudspeaker device according to some embodiments of the present disclosure. FIG. 47 is a cross-sectional view of a partial structure of a loudspeaker device according to some embodiments of the present disclosure.

According to FIG. 45 and FIG. 46, in some embodiments, the core housing 41 may include an auxiliary function module, and the auxiliary function module may be a module different from the earphone core 42 for receiving auxiliary signals and performing auxiliary functions. For example, the auxiliary function module may be a microphone 432, a key switch, etc., which may be specifically set according to actual needs.

In some embodiments, the auxiliary function module may include a microphone 432. The microphone 432 may include a first microphone 432*a* and a second microphone 432*b*. Both the first microphone 432*a* and the second microphone 432*b* may be MEMS (Micro Electro Mechanical System) microphones 432, which have a small operating current, relatively stable performance, and high quality of voice produced. The two microphones 432 may be set on different positions of the first flexible circuit board 44 according to actual requirements.

In some embodiments, the first flexible circuit board 44 may include a main circuit board 441 and a first branch circuit board 442 and a second branch circuit board 443 connected to the main circuit board 441. The first branch circuit board 442 and the main circuit board may extend in the same direction. The first microphone 432*a* may be mounted on the end of the first branch circuit board 442 away from the main circuit board 441. The second branch circuit board 443 may extend perpendicularly to the main circuit board 441, and the second microphone 432*b* may be mounted on the end of the second branch circuit board 443 away from the main circuit board 441. Multiple first pads 45 may be disposed on the end of the main circuit board 441 away from the first branch circuit board 442 and the second branch circuit board 443.

In some embodiments, the core housing 41 may include a peripheral side wall 411 and a bottom end wall 416 connected to one end surface of the peripheral side wall 411, thereby forming an accommodation space with an open end. The earphone core 42 may be placed in the accommodation space through the open end. The first microphone 432*a* may be fixed on the bottom wall 416, and the second microphone 432*b* may be fixed on the peripheral side wall 411.

In some embodiments, the first branch circuit board 442 and/or the second branch circuit board 443 may be bent appropriately to adapt to the location of the sound inlet corresponding to the microphone 432 on the core housing 41. Specifically, the first flexible circuit board 44 may be disposed in the core housing 41 in such a way that the main circuit board 441 is parallel to the bottom end wall 416, so that the first microphone 432*a* may correspond to the bottom end wall 416 without bending the main circuit board 441. Since the second microphone 432*b* is fixed on the peripheral side wall 411 of the core housing 41, the second main circuit board 441 needs to be arranged for bending. Specifically, the second branch circuit board 443 may be bent at the end far away from the main circuit board 441, so that the surface of the second branch circuit board 443 is perpendicular to the surfaces of the main circuit board 441 and the first branch circuit board 442. Therefore, the second microphone 432*b* may face the direction away from the main circuit board 441 and the first branch circuit board 442, and be fixed to the peripheral side wall 411 of the core housing 41.

In some embodiments, the first pad 45, the first microphone 432*a*, and the second microphone 432*b* may all be disposed on the same side of the first flexible circuit board 44.

In some embodiments, the other side of the first flexible circuit board 44 may be provided with a rigid support plate 4*a* and a microphone rigid support plate 4*b* for supporting the first pad 45. The microphone rigid support plate 4*b* may include a rigid support plate 4*b*1 for supporting the first microphone 432*a* and a rigid support plate 4*b*2 for supporting the second microphone 432*b*.

In some embodiments, the rigid support plate 4*a*, the rigid support plate 4*b*1, and the rigid support plate 4*b*2 may be mainly used to support the corresponding pads and the microphone 432, so they need to have a certain strength. The materials of the three components may be the same or different, and specifically may be polyimide (Polyimide Film, PI), or other materials capable of supporting strength, such as polycarbonate, polyvinyl chloride, etc. In addition, the thickness of the three rigid support plates may be set according to the strength of the rigid support plate itself and the strength actually required by the first pad 45, the first microphone 432*a*, and the second microphone 432*b*, which are not specifically limited here.

The first microphone 432*a* and the second microphone 432*b* may correspond to the two microphone components 4*c*, respectively. In some embodiments, the two microphone components 4*c* may have the same structure, and the core housing 41 may be provided with a sound inlet 413. Further, the loudspeaker device may also be disposed at the core housing 41 with an annular blocking wall 414 integrally formed on the inner surface of the core housing 41. The annular blocking wall 414 may be disposed on the periphery of the sound inlet 413, thereby defining the accommodation space 415 communicating with the sound inlet 413.

According to FIG. 45, FIG. 46, and FIG. 47, in some embodiments, the microphone component 4*c* may further include a waterproof membrane assembly 4*cl*.

The waterproof membrane assembly 4*cl* may be disposed in the accommodation space 415 and cover the sound inlet 413. The microphone rigid support plate 4*b* may be disposed in the accommodation space 415 and located on the side of the waterproof membrane assembly 4*cl* away from the sound inlet 413 to press the waterproof membrane assembly 4*cl* on the inner surface of the core housing 41. In some embodiments, the microphone rigid support plate 4*b* may be provided with a sound inlet 4*b*3 corresponding to the sound inlet 413. In some embodiments, the microphone 432 may be disposed on the side of the microphone rigid support plate 4*b* away from the waterproof membrane assembly 4*cl* and cover the sound inlet 4*b*3.

The waterproof membrane assembly 4*cl* may have the function of waterproof and sound transmission, and be closely attached to the inner surface of the core housing 41 to prevent the liquid outside the core housing 41 from entering the core housing 41 through the sound inlet 413 and affecting the performance of the microphone 432.

The axial directions of the sound inlet 4*b*3 and the sound inlet 413 may coincide, or they may intersect at a certain angle according to the actual requirements of components such as the microphone 432.

It should be noted that all the sound inlets in the above embodiments may be used to refer to the structure of the core housing 41 for receiving sound.

The microphone rigid support plate 4*b* may be disposed between the waterproof membrane assembly 4*cl* and the microphone 432. On the one hand, the waterproof membrane assembly 4*cl* may be pressed and held so that the waterproof membrane assembly 4*cl* is closely attached to the inner surface of the core housing 41. On the other hand, the microphone rigid support plate 4*b* may have a certain strength, so as to support the microphone 432.

In some embodiments, the material of the microphone rigid support plate 4*b* may be polyimide (Polyimide Film, PI), or other materials capable of supporting strength, such as polycarbonate, polyvinyl chloride, etc. In addition, the thickness of the microphone rigid support plate 4*b* may be set according to the strength of the microphone rigid support plate 4*b* and the strength actually required by the microphone 432, which is not specifically limited here.

Figure 48:
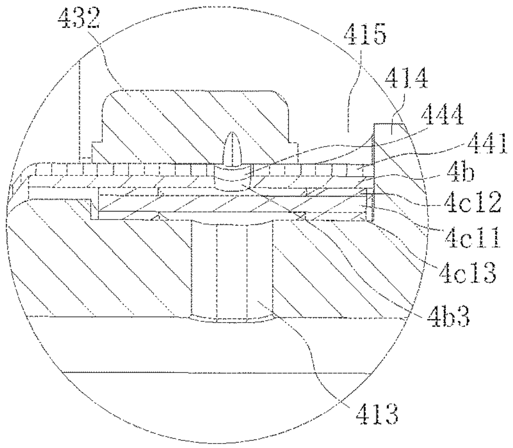
FIG. 48 is a partial enlarged view of part C in FIG. 47.

FIG. 48 is a partial enlarged view of part C in FIG. 47. As shown in FIG. 48, in some embodiments, the waterproof membrane assembly 4*cl* may include a waterproof membrane body 4*c*11 and an annular rubber pad 4*c*12. The annular rubber pad 4*c*12 may be disposed on the side of the waterproof membrane body 4*c*11 facing the microphone rigid support plate 4*b*, and further disposed on the periphery of the sound inlet 413 and the sound inlet 4*b*3.

The microphone rigid support plate 4*b* may be pressed against the annular rubber pad 4*c*12, so that the waterproof membrane assembly 4*c*1 and the microphone rigid support plate 4*b* are adhesively fixed together.

In some embodiments, the annular rubber pad 4*c*12 may be arranged to form a scaled cavity between the waterproof membrane body 4*c*11 and the rigid support plate that is connected to the microphone 432 only through the sound inlet 4*b*3, that is, there is no gap in the connection between the waterproof membrane assembly 4*cl* and the microphone rigid support plate 4*b*, so that the space around the annular rubber pad 4*c*12 between the waterproof membrane body 4*c*11 and the microphone rigid support plate 4*b* is isolated from the sound inlet 4*b*3.

In some embodiments, the waterproof membrane body 4*c*11 may specifically be a waterproof sound-permeable membrane, which is equivalent to the tympanic membrane of a human ear. When an external sound enters through the sound inlet 413, the waterproof membrane body 4*c*11 vibrates, which causes the air pressure in the sealed cavity to change, thereby causing the microphone 432 to emit sound.

Further, the air pressure in the sealed cavity changes due to the vibration of the waterproof membrane body 4*c*11, and the air pressure needs to be controlled within an appropriate range. If the air pressure is too large or too small, the air pressure may affect the sound quality. In this embodiment, the distance between the waterproof membrane body 4*c*11 and the rigid support plate may be in a range of 0.1-0.2 mm, specifically may be 0.1 mm. 0.15 mm, 0.2 mm, etc., so that the air pressure in the sealed cavity caused by vibration of the waterproof membrane body 4*c*11 changes within an appropriate range, thereby improving the sound quality.

In some embodiments, the waterproof membrane assembly 4*cl* may further include an annular rubber pad 4*c*13 disposed on the side of the waterproof membrane body 4*c*11 facing the inner surface of the core housing 41 and overlapped with the annular rubber pad 4*c*12.

In this way, the waterproof membrane assembly 4*cl* may be closely attached to the inner surface of the core housing 41 surrounding the sound inlet 413, thereby reducing the loss of sound entering the sound inlet 413 and improving the conversion rate of sound into vibration of the waterproof membrane body 4*c*11.

In some embodiments, sealant may be further coated on the outer periphery of the annular blocking wall 414 and the microphone 432 to further improve the sealing performance, thereby increasing the sound conversion rate and improving the sound quality.

In some embodiments, the first flexible circuit board 44 may be disposed between the rigid support plate and the microphone 432, and a sound inlet 444 may be disposed at a position corresponding to the sound inlet 4*b*3 of the microphone rigid support plate 4*b*, so that the vibration of the waterproof membrane body 4*c*11 caused by external sound passes through the sound inlet 444 to further affect the microphone 432.

In some embodiments, the first flexible circuit board 44 may further extend away from the microphone 432 to connect with other functional elements or wires to achieve corresponding functions. Correspondingly, the microphone rigid support plate 4*b* may also extend a distance away from the microphone 432 along with the flexible circuit board.

Correspondingly, a notch matching the shape of the flexible circuit board may be disposed on the annular blocking wall 414 to allow the flexible circuit board to extend from the accommodation space 415. In addition, sealant may be further filled in the notch to further improve the sealing performance.

In some embodiments, the loudspeaker device may further include a key module 4*d*. The auxiliary function module mounted on the flexible circuit board 44 may include a key switch. The key switch and the microphone 432 may be disposed in different circuit housings 100. Of course, in other embodiments, the key switch and the microphone 432 may also be disposed in the same circuit housing 100, which is not specifically limited here.

Figure 49:
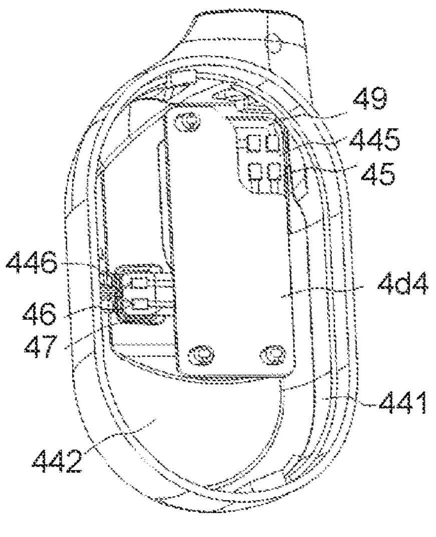
FIG. 49 is a schematic structural diagram illustrating a partial structure of a loudspeaker device according to some embodiments of the present disclosure.
Figure 50:
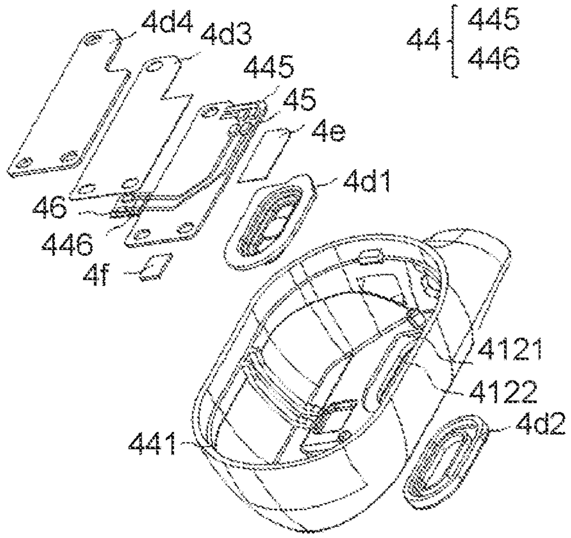
FIG. 50 is an exploded view of a partial structure of a loudspeaker device according to some embodiments of the present disclosure.
Figure 51:
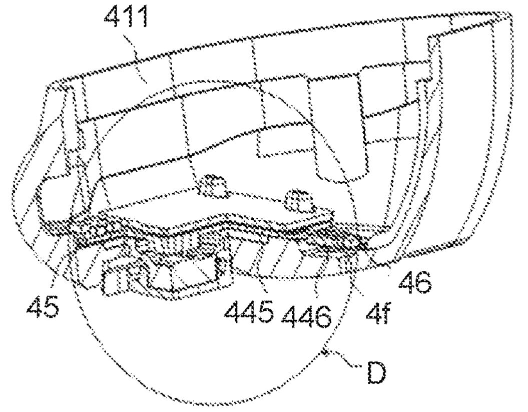
FIG. 51 is a cross-sectional view of a partial structure of a loudspeaker device according to some embodiments of the present disclosure.
Figure 52:
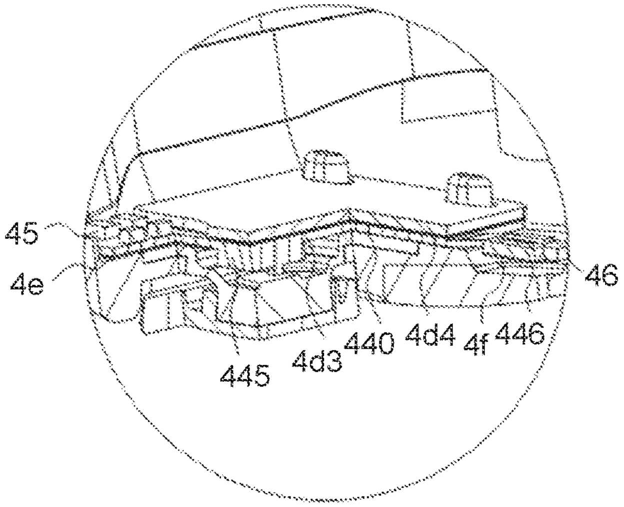
FIG. 52 is a partial enlarged view of part D in FIG. 51.
Figure 53:
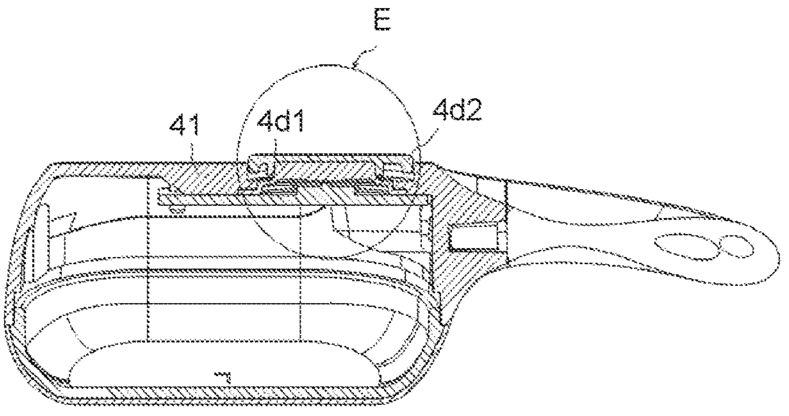
FIG. 53 is a cross-sectional view of a partial structure of a loudspeaker device according to some embodiments of the present disclosure.
Figure 54:
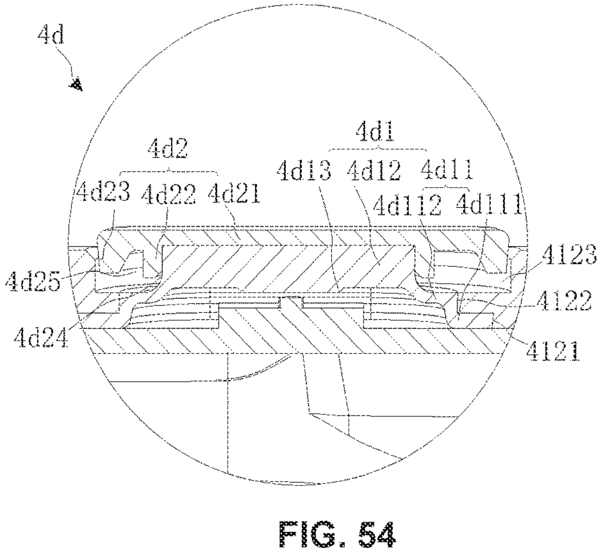
FIG. 54 is a partial enlarged view of part E in FIG. 53.

FIG. 49 is a schematic structural diagram illustrating a partial structure of a loudspeaker device according to some embodiments of the present disclosure. FIG. 50 is an exploded view of a partial structure of a loudspeaker device according to some embodiments of the present disclosure. FIG. 51 is a cross-sectional view of a partial structure of a loudspeaker device according to some embodiments of the present disclosure. FIG. 52 is a partial enlarged view of part D in FIG. 51. FIG. 53 is a cross-sectional view of a partial structure of a loudspeaker device according to some embodiments of the present disclosure. FIG. 54 is a partial enlarged view of part E in FIG. 53.

According to FIG. 49, FIG. 50, and FIG. 54, in some embodiments, a flexible circuit board 44 may be disposed inside the core housing 41, and the outside of the core housing 41 may be provided with a key module **4*d* adapted to the flexible circuit board. In some embodiments, correspondingly, the flexible circuit board 44 may include a main circuit board 445 and a branch circuit board 446, wherein the branch circuit board 446 may extend along an extension direction perpendicular to the main circuit board 445. The plurality of first pads 45 may be disposed on the end of the main circuit board 445 away from the branch circuit board 446. The key switch may be disposed on the main circuit board 445, and the second pads 46 may be disposed on the end of the branch circuit board 446 away from the main circuit board 445**.

It should be noted that the circuit boards in the above embodiments may all be used to refer to the structure for mounting electronic components.

In some embodiments, the core housing 41 may include a peripheral side wall 411 and a bottom end wall 416 connected to one end surface of the peripheral side wall 411, thereby forming an accommodation space with an open end. The board surface of the flexible circuit board 44 and the bottom end wall 416 may be arranged in parallel and spaced apart, so that the key switch may be disposed toward the bottom end wall 416 of the core housing 41.

In some embodiments, the key switch may be disposed on the side of the flexible circuit board 44 facing the bottom end wall 416. To facilitate assembly, the first pad 45 and the second pad 46 may be disposed on the side of the flexible circuit board 44 away from the bottom wall 416, so that the first pad 45 and the second pad 46, and the key switch may be respectively disposed on both sides of the flexible circuit board 44.

According to FIG. 50, FIG. 51, and FIG. 52, in some embodiments, the main circuit board 445 may be provided with a rigid support plate **4*d*3 on the side away from the key switch for supporting the key switch and keeping the first pad 45 exposed. The main circuit board 445 may be further provided with a rigid support plate 4*c* on the side away from the first pad 45 for supporting the first pad 45 and keeping the key switch exposed. The branch circuit board 446 may be provided with a rigid support plate 4*f* on the side away from the second pad 46 for supporting the second pad 46**.

In some embodiments, the key switch and the first bonding pad 45 may be respectively disposed on two sides of the main circuit board 445 and spaced apart on both sides of the main circuit board 445. Correspondingly, the rigid support plate **4*d*3 corresponding to the key switch and the rigid support plate 4*c* corresponding to the first pad 45 may also be respectively arranged on both sides of the main circuit board 445, and further bypass the key switch and the first pad 45 respectively. Therefore, the rigid support plate 4*d*3 and the rigid support plate 4*c* may have adjacent edges arranged adjacently. In some embodiments, a side of the rigid support plate 4*d*3 away from the flexible circuit board 44 may be further provided with a rigid support plate 4*d*4. The rigidity of the rigid support plate 4*d*4 may be greater than the rigid support plate 4*d*3, and the rigid support plate 4*d*3** may correspond to the key switch.

In some embodiments, the inner surface of the core housing 41 (specifically the inner surface of the bottom end wall 416) may be provided with a recessed area 4121, and may be further provided with a key hole 4122 located in the recessed area 4121 and used to communicate with the inner surface of the core housing 41 and the outer surface. The recessed area 4121 may be formed by recessing the inner surface of the core housing 41 toward the outside of the core housing 41. The key hole 4122 may be further arranged in the middle part of the recessed area 4121, or arranged in other parts according to actual needs.

As shown in FIG. 50, FIG. 53, and FIG. 54, in some embodiments, the key module **4*d* may further include an elastic bearing 4*d*1 and a key 4*d*2. In some embodiments, the clastic bearing 4*d*1 may include an integrally formed bearing body 4*d*11 and a supporting column 4*d*12. The bearing body 4*d*11 may be disposed in the recessed area 4121 and fixed to the bottom of the recessed area 4121. Specifically, the bottom of the recessed area 4121 refers to the inner wall surface of the recessed area 4121 away from the inside of the core housing 41. The support column 4*d*12 may be arranged on the side of the bearing body 4*d*11 facing the outside of the core housing 41 and may be exposed from the key hole 4122**.

In the above manner, the elastic bearing **4*d*1 may be arranged in the recessed area 4121 and fixed to the bottom of the recessed area 4121, and cover the key hole 4122 from the inner side of the core housing 41 through the bearing body 4*d*11, so as to separate the inside and the outside of the core housing 41. Therefore, it is difficult for the liquid outside the core housing 41 to enter the inside of the core housing 41 through the key hole 4122, thereby playing a role of waterproofing and protecting the internal components of the core housing 41**.

In some embodiments, the clastic bearing **4*d*1 may be fixed to the bottom of the recessed area 4121 through the bearing body 4*d*11 in a pasting manner. Specifically, adhesive, double-sided tape, etc. may be applied between the surface of the bearing body 4*d*11 facing the outside of the core housing 41 and the bottom of the recessed area 4121**.

In some embodiments, the bearing body **4*d*11 may be fixed to the bottom of the recessed area 4121 by injection molding. The surface of the bearing body 4*d*11 facing the outside of the core housing 41 and the bottom of the recessed area 4121 of the core housing 41 may be integrally formed by injection molding, which may be formed by encapsulation. In this embodiment, the clastic bearing 4*d*1 and the bottom of the recessed area 4121 of the core housing 41 may be integrally formed by injection molding, thereby making the combination between the two components stronger and increasing the strength of the combination between the two components. In addition, the sealing performance of the core housing 41 may be improved, so that on the one hand, the entire key module 4*d* may be made more stable and reliable, and on the other hand, the waterproof effect of the core housing 41** may be further improved.

In some embodiments, the bearing body **4*d*11 may include an annular fixing portion 4*d*111 and an clastic support part 4*d*112. The annular fixing portion 4*d*111 may be arranged around the key hole 4122 and may be attached to and fixed to the bottom of the recessed area 4121, thereby fixing the elastic bearing 4*d*1 and the core housing 41** together.

The clastic support part **4*d*112 may be connected to the inner ring surface of the annular fixing portion 4*d*111 and protrude in a dome shape toward the outside of the core housing 41, so that the top to the bottom thereof has a certain height in the pressing direction of the key 4*d*2, and the size of the top portion perpendicular to the pressing direction is smaller than that of the bottom portion. The support column 4*d*12 may be arranged on the top of the elastic support part 4*d*112. When the key 4*d*2 is pressed, the top of the clastic support part 4*d*112 may be pressed and moves toward the bottom, thereby driving the key 4*d*2 to move in the direction of the key hole 4122** until the key switch is triggered.

It should be noted that due to the small overall structure of the loudspeaker device, the connections between the components may be relatively tight, so that the pressing stroke between the key **4*d*2 and the key switch is small, thereby weakening the pressing touch to the key 4*d*2. In this embodiment, since the elastic support part 4*d*112 is raised toward the outside of the core housing 41 in a dome shape, the distance between the keys 4*d*2 and the key switch in the core housing 41 may be increased, so that the pressing stroke of the keys 4*d*2 triggers the key switch may be appropriately increased, thereby improving the user's feel when pressing the key 4*d*2**.

Specifically, the bottom of the clastic support part **4*d*112 may be fixed on the side wall surface of the key hole 4122, so that the top of the clastic support part 4*d*112 is exposed from the key hole 4122, and the support column 4*d*12 provided at the end of the elastic support part 4*d*112 facing the outside of the core housing 41 is completely exposed to the outside of the core housing 41. As a result, the support column 4*d*12 may be further fixed with the key 4*d*2 on the outside of the core housing 41**.

In some embodiments, the outer surface of the core housing 41 may be provided with a recessed area 4123. The key hole 4122 may be further located in the recessed area 4123, that is, the recessed area 4121 and the recessed area 4123 may be respectively located at two ends of the key hole 4122, and may be penetrated by the key hole 4122. The shapes and sizes of the recessed area 4121 and the recessed area 4123 may be set to be the same or different according to actual requirements. In addition, the number of recessed areas 4121 and the number of recessed areas 4123 may be the same, which are determined according to the number of keys **4*d*2, and may be one or more. Each recessed area 4121 and each recessed area 4123 may correspond to one or more key holes 4122, which are not specifically limited here. In this embodiment, the number of keys 4*d*2 corresponding to the core housing 41 may be one, and the key 4*d*2 may correspond to one recessed area 4121 and one recessed area 4123**.

In some embodiments, the support column **4*d*12 may be supported by the clastic support part 4*d*112 to the side of the key hole 4122 facing the outside of the core housing 41 and is located in the recessed area 4123. Further, the key 4*d*2 may be disposed on one side of the elastic support part 4*d*112 of the support column 4*d*12. In this embodiment, by providing the clastic support part 4*d*112 and the height of the support column 4*d*12 along the pressing direction of the key 4*d*2, the key 4*d*2 may be at least partially sunk in the recessed area 4123 to improve the space utilization and reduce the space occupied by the key module 4*d***.

In some embodiments, the key **4*d*2 may include a key body 4*d*21, an annular flange 4*d*22, and an annular flange 4*d*23. The annular flange 4*d*22 and the annular flange 4*d*23 may be disposed on one side of the key body 4*d*21. The annular flange 4*d*22 and the annular flange 4*d*23 may be specifically arranged on the opposite side of the pressing surface of the key body 4*d*21**.

In some embodiments, the annular flange **4*d*22 may be located in the middle area of the key body 4*d*21, and the annular flange 4*d*23 may be located on the outer edge of the key body 4*d*21. Both the annular flange 4*d*22 and the annular flange 4*d*23 may be formed to protrude toward the direction face away from the pressing surface of the key body 4*d*21, thereby forming a cylindrical accommodation space 4*d*24 surrounded by the annular flange 4*d*22, and a cylindrical accommodation space 4*d*25 surrounded by the annular flange 4*d*22 and the annular flange 4*d*23. The protrusion heights of the annular flange 4*d*22 and the annular flange 4*d*23 relative to the key body 4*d*21 may be equal or unequal. In this embodiment, the protrusion height of the annular flange 4*d*22 relative to the key body 4*d*21 may be greater than the protrusion height of the annular flange 4*d*23 relative to the key body 4*d*21**.

In some embodiments, the support column **4*d*12 may be inserted into the annular flange 4*d*22, that is, the support column 4*d*12 may be accommodated in the accommodation space 4*d*24. Specifically, the support column 4*d*12 may be bonded to the annular flange 4*d*22** by means of bonding, injection molding, or elastic abutment.

In some embodiments, the end surface of the annular flange **4*d*23 away from the key body 4*d*21 may be sunk in the recessed area 4123, and may be spaced a certain distance from the bottom of the recessed area 4123 when the clastic bearing 4*d*1** is in a natural state.

In some embodiments, the bottom of the recessed area 4123 refers to the inner wall surface of the recessed area 4123 facing the inside of the core housing 41. Specifically, when the clastic bearing **4*d*1 is in a natural state, by pressing the pressing surface of the key 4*d*2, the top of the clastic support part 4*d*112 of the clastic bearing 4*d*1 may move in the direction toward the core housing 41 and triggers the key switch before the end surface of the annular flange 4*d*23 away from the key body 4*d*21 touches the bottom of the recessed area 4123**.

In some embodiments, the clastic bearing **4*d*1 may further include a contact head 4*d*13 for contacting the key switch. The contact head 4*d*13 may be arranged on the inner side of the bearing body 4*d*11 close to the core housing 41, and specifically may be arranged on the middle area of the top of the clastic support part 4*d*112 facing the inner wall surface of the inside of the core housing 41, and may protrude toward the inside of the core housing 41** relative to the inner wall surface.

When the key **4*d*2 is pressed, the top of the clastic support part 4*d*112 of the elastic bearing 4*d*1 may move in the direction toward the inside of the core housing 41, thereby driving the contact head 4*d*13 to move toward the key switch inside the core housing 41. The key switch may be triggered by the contact head 4*d*13 to realize the corresponding function. In this way, the pressing stroke of the key 4*d*2** may be reduced according to actual needs.

Figure 55:
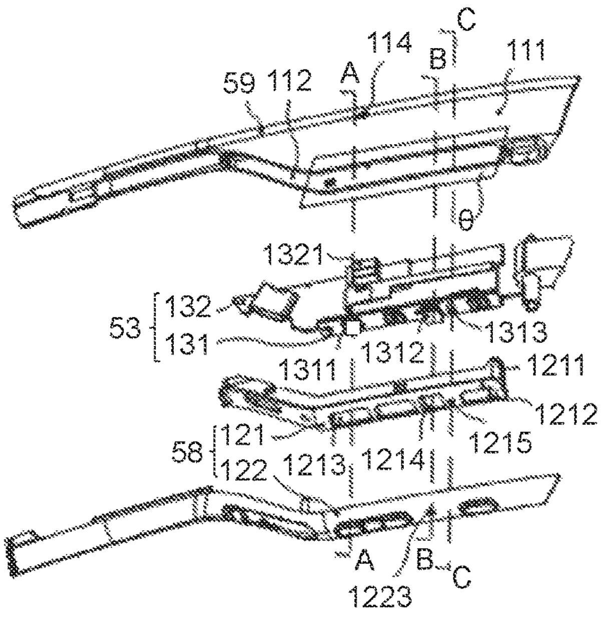
FIG. 55 is a schematic diagram illustrating an exploded view of structures of a loudspeaker device according to some embodiments of the present disclosure.
Figure 56:
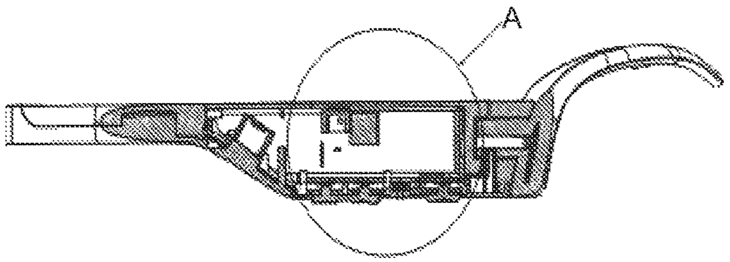
FIG. 56 is a schematic diagram illustrating a partial cross-section view of a loudspeaker device according to some embodiments of the present disclosure.
Figure 57:
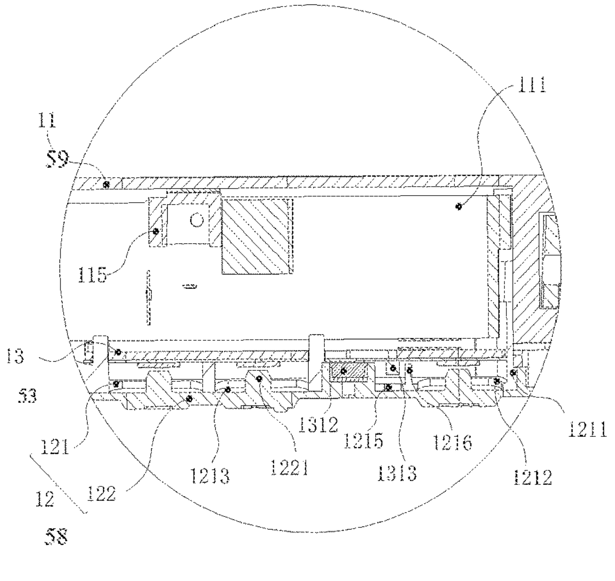
FIG. 57 is a schematic diagram illustrating an enlarged view of a part A in FIG. 56.

FIG. 55 is a schematic diagram illustrating an exploded view of structures of a loudspeaker device according to some embodiments of the present disclosure. FIG. 56 is a schematic diagram illustrating a partial cross-section view of a loudspeaker device according to some embodiments of the present disclosure. FIG. 57 is a schematic diagram illustrating an enlarged view of a part A in FIG. 56. According to FIGS. 55-57, in some embodiments, the loudspeaker device may include a component body. A cavity 111 may be formed inside the component body. It should be noted that the component body may be equivalent to the circuit housing 100 mentioned in the foregoing embodiments.

The component body may be a structure formed by combining at least two parts. The component body may also be a structure manufactured by an integral molding technology, such as a structure integrally formed by an integral injection molding process. The spatial shape of the component body may include, but is not limited to, a rectangular parallelepiped, a cube, an ellipsoid, a sphere, a cone, and other irregular spatial shapes. The material of the component body may include but is not limited to one or a combination of plastic, silica gel, rubber, plastic, glass, ceramic, alloy, stainless steel, etc.

In some embodiments, the component body may include an accommodating body 11 and a cover 12. The interior of the accommodating body 11 may be hollow to form a cavity 111. The accommodating body 11 may be provided with an opening 112 connected with the cavity 111. The cover 12 may be placed on the opening 112 of the cavity 111 for sealing the cavity 111. The cavity 111 may be an internal cavity formed by two or more components when assembled, or may be an internal cavity formed according to the shape of the molding die during the integral molding process of the components. The cavity 111 may be used to accommodate multiple electronic components and circuit structures of the loudspeaker device. The component body may be used to seal the cavity 111. The cavity 111 may be completely sealed by the component body, or jointly sealed by the component body and other accessories on the component body.

It should be noted that the accommodating body 11 may be equivalent to the peripheral side wall in the foregoing embodiment, and the cover body 12 may be equivalent to the bottom end wall in the foregoing embodiment.

The accommodating body 11 may be at least a part of the loudspeaker device. The accommodating body 11 in this embodiment may specifically be a structure for holding, for example, a circuit board, a battery 52, and electronic components in the loudspeaker device. For example, the accommodating body 11 may be the whole or a part of the housing of the loudspeaker device.

In addition, the accommodating body 11 may be provided with a cavity 111 having an opening 112 for accommodating the above-mentioned circuit board, battery, electronic components, etc. The opening 112 may communicate with the cavity and be used for the mounting and dismounting passages of the circuit boards, batteries, electronic components, or the like. Specifically, the number of openings 112 may be one or multiple, which is not limited here.

Further, the shape of the cover 12 may at least partially match the opening 112, such that the cover 12 may be placed on the opening 112 to seal the cavity 111. The material of cover 12 may be different from or partially the same as the accommodating body 11.

In some embodiments, the cover 12 may include a hard bracket 121 and a soft cover layer 124. The hard bracket 121 may be used to physically connect to the accommodating body 11. The soft cover layer 124 may be integrated on the surface of the hard bracket 121 to seal the cavity 111 after the hard bracket 121 is connected to the accommodating body 11.

Specifically, the material of the hard bracket 121 may be rigid plastic, and the material of the soft cover layer 124 may be soft silicone or rubber. A shape of the side of the hard bracket 121 facing toward the accommodating body 11 may match the opening 112, and fixed to the opening 112 of the cavity 111 by means of plugging, buckling, etc., so as to physically connect to the accommodating body 11. A gap may be easily formed at a physical connection portion between the hard bracket 121 and the accommodating body 11, which may reduce a sealing effect of the cavity 111. Further, the soft cover layer 124 may be injection molded integrally on an outer surface of the hard bracket 121 away from the accommodating body 11, which may further cover the physical connection portion between the hard bracket 121 and the accommodating body 11, thereby sealing the cavity 111.

In the embodiment, the cover 12 may include the hard bracket 121 and the soft cover layer 124 injection-molded integrally on a surface of the hard bracket 121. The hard bracket 121 may be used to physically connect to the accommodating body 11. The soft cover layer 124 may further seal the cavity 111 after the hard bracket 121 is connected to the accommodating body 11. The soft cover layer 124 may be more conducive to fit the gap between the hard bracket 121 and the accommodating body 11, so as to further improve the sealing effect of the electronic component, thereby improving the waterproof performance of the electronic component. At the same time, the hard bracket 121 and the soft cover layer 124 may be injection molded integrally, which can simplify an assembly process of electronic components.

In some embodiments, the hard bracket 121 may include an insertion part 1211 and a cover part 1212. The cover part 1212 may be placed on the opening 112, and the insertion part 1211 may be placed on one side of the cover part 1212 and extend into the cavity 111 along an inner wall of the cavity 111 to fix the cover part 1212 on the opening 112.

In an application scenario, the insertion part 1211 may not be inserted through the inner wall of cavity 111. For example, a plug-in part matching a shape of the insertion part 1211 of the hard bracket 121 may also be placed inside the cavity 111, such that the insertion part 1211 may be engaged with the plug-in part to fix the plug-in part inside the cavity 111. For example, the shape of insertion part 1211 may be a cylinder. In such cases, a plug-in part may be a cylindrical ring that surrounds the insertion part 1211 of the shape of the cylinder. An inner diameter of the plug-in part of the cylindrical ring may be appropriately less than an outer diameter of the plug-in part of the cylindrical body. In such cases, when inserting the insertion part 1211 in the plug-in part, an interference fit with the plug-in part may make the hard bracket 121 be stably connected to the cavity 111. Of course, other insertion methods may also be used, as long as the insertion part 1211 may be inserted into the cavity 111 and fixed with the cavity 111.

Specifically, the cover part 1212 may be placed on a side of the insertion part 1211 facing away from the cavity 111, and cover the opening 112 after the insertion part 1211 is inserted into the cavity 111. The cover part 1212 may be a complete structure, or may further include some holes according to needs, so as to achieve a certain function.

Figure 58:
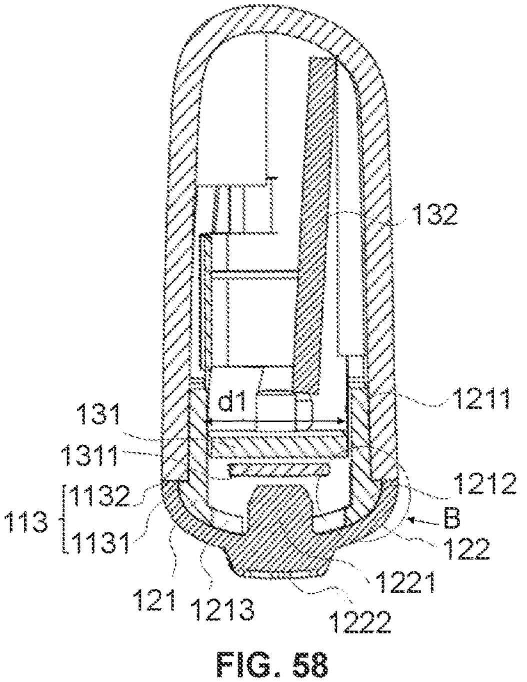
FIG. 58 is a schematic diagram illustrating a cross-section view of a loudspeaker device in an assembled state along an A-A axis in FIG. 55.

Further referring to FIG. 58, FIG. 58 is a schematic diagram illustrating a cross-section view of a loudspeaker device in an assembled state along an A-A axis in FIG. 55 according to some embodiments of the present disclosure. In some embodiments, the accommodating body 11 may include an opening edge 113 for defining the opening 112. A cover part 1212 may be pressed on an inner region 1131 of the opening edge 113 near the opening 112. The soft cover layer 124 may cover an outer surface of the cover part 1212 away from the accommodating body 11, and may be pressed on an outer region 1132 outside the inner region 1131 of the opening edge 113, thereby sealing the soft cover layer 124 and the opening edge 113.

The inner region 1131 and the outer region 1132 of the opening edge 113 may both belong to the opening edge 113, instead of regions other than the opening edge 113. The inner region 1131 of the opening edge 113 may be a region near the opening 112 of the opening edge 113, and the outer region 1132 of the opening edge 113 may be a region away from the opening 112 of the opening edge 113.

In the embodiment, the cover part 1212 of the hard bracket 121 may be pressed on the inner region 1131 of the opening edge 113 near the opening 112, which causes the cover part 1212 to initially seal the opening edge 113. However, since the accommodating body 11 and the hard bracket 121 are made of hard materials, a connection therebetween and a further coverage of the connection by the cover part 1212 may not achieve a good sealing effect. At an end where the cover part 1212 is pressed on the opening edge 113 and away from the opening 112, a gap between the end and the opening edge 113 may be easily generated. The end may further penetrate the cavity 111 through the gap, thereby reducing the sealing effect.

According to the descriptions above, in the embodiment of the present disclosure, the soft cover layer 124 may cover the outer surface of the cover part 1212 away from the accommodating body 11, and may be further pressed on the outer region 1132 outside the inner region 1131 of the opening edge 113, such that the gap between the cover part 1212 of the hard bracket 121 and the opening edge 113 may be further covered. Since the soft cover layer 124 is made of a soft material, it can further improve the sealing effect of the loudspeaker device and make the loudspeaker device more waterproof.

Figure 59:
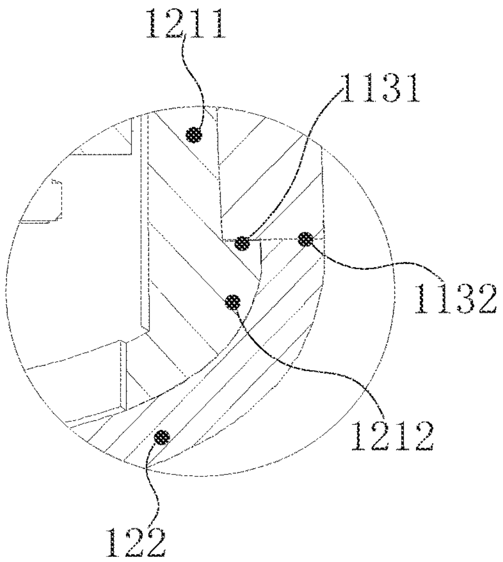
FIG. 59 is a schematic diagram illustrating an enlarged view of a part B in FIG. 58.

Further referring to FIG. 59, FIG. 59 is a schematic diagram illustrating an enlarged view of a part B in FIG. 58 according to some embodiments of the present disclosure. In an application scenario, in a snapped state of the cover 12, a periphery of the cover part 1212 may cover the inner region 1131 of the opening edge 113 and contact the inner region 1131 of the opening edge 113. The soft cover layer 124 may be placed on a side of the cover part 1212 away from the accommodating body 11, such that the cover part 1212 of the inner region 1131 located at the opening edge 113 may be sandwiched between the inner region 1131 and the soft cover layer 124 of the opening edge 113. The soft cover layer 124 may further extend toward the cover part 1212 away from the opening 112, and toward the opening edge 113, until it contacts the outer region 1132 of the opening edge 113. Therefore, a contact end surface between the cover part 1212 and the opening edge 113 and a contact end surface between the soft cover layer 124 and the opening edge 113 may be flush with each other, so as to form an "opening edge 113-cover part 1212-soft cover layer 124" structure on the inner region 1131 of the opening edge 113.

Figure 60:
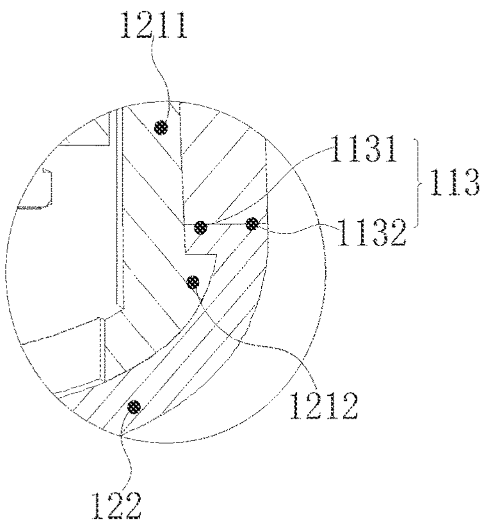
FIG. 60 is a schematic diagram illustrating a partial cross-section view of a loudspeaker device according to some embodiments of the present disclosure.

Further referring to FIG. 60, FIG. 60 is a schematic diagram illustrating a partial cross-section view of a loudspeaker device according to some embodiments of the present disclosure. In the embodiment, after the soft cover layer 124 extends to contact the outer region 1132 of the opening edge 113, the soft cover layer 124 may further extend along a region between the cover part 1212 and the opening edge 113 to the inner region 1131 of the opening edge 113. It is further assumed that, the cover part 1212 may be pressed on the inner region 1131 of the opening edge 113 to form an "opening edge 113-soft cover layer 124-cover part 1212-soft cover layer 124" structure between the inner region 1131 of the opening edge 113 and the cover part 1212. In the embodiment, the soft cover layer 124 may extend between the hard bracket 121 and the opening edge 113 after covering the cover part 1212 of the hard bracket 121, thereby further improving the scaling effect between the cavity 111 and the cover 12, and further improving the waterproof effect of the loudspeaker device.

In some embodiments, referring to FIGS. 55-60, the loudspeaker device may further include a circuit component 93 placed in the cavity 111, and the circuit component 93 may include a switch 1311.

Specifically, the circuit component 93 may include a first circuit board 131, and the switch 1311 may be placed on an outer side of the first circuit board 131 facing toward the opening 112 of the cavity 111. The number of the switches 1311 may be one or multiple. When the number of switches 1311 is multiple, the switches 1311 can be arranged on the first circuit board 131 at intervals. It should be noted that the first circuit board 131 may be equivalent to the first branch circuit board in the foregoing embodiment.

Correspondingly, the hard bracket 121 may include a switch hole 1213 corresponding to the switch 1311. The soft cover layer 124 may further cover the switch hole 1213 and may include a pressing part 1221 at a position corresponding to the switch hole 1213. The pressing part 1221 may extend toward the inside of the cavity 111 through the switch hole 1213. When a corresponding position of the soft cover layer 124 is pressed, the pressing part 1221 may press the switch 1311 on the circuit component 93, thereby triggering the circuit component 93 to perform a preset function.

The pressing part 1221 on the soft cover layer 124 may be formed by protruding a side of the soft cover layer 124 facing toward the hard bracket 121 toward the switch hole 1213 and the switch 1311. A shape of the pressing part 1221 may match a shape of the switch hole 1213. In this way, when the corresponding position of the soft cover layer 124 is pressed, the pressing part 1221 may pass through the switch hole 1213 and reach the corresponding switch 1311 on the first circuit board 131. At the same time, a length of the pressing part 1221 along a direction of the switch 1311 may be set such that the switch 1311 is not pressed when the corresponding position of the soft cover layer 124 is not pressed, and the corresponding switch 1311 is pressed when the corresponding position of the soft cover layer 124 is pressed.

In an application scenario, a position corresponding to the pressing part 1221 on the soft cover layer 124 may further be protruded toward a side facing away from the hard bracket 121, so as to form a convex pressing part 1222. In this way, a user may clarify a position of the switch 1311, and trigger the circuit component 93 to perform a corresponding function by pressing the corresponding convex pressing part 1222.

In some embodiments, the auxiliary function module 804 may be used to receive auxiliary signals and perform auxiliary functions. The auxiliary function module 804 may be a module different from the earphone core 42 for receiving auxiliary signals and performing auxiliary functions. Further, the auxiliary function module 804 may implement one or more of the image function, voice function, auxiliary control function, and switch control function. In this application, the conversion of audio signals into sound signals may be considered as the main function of the speaker, and other functions different from the main function may be considered as auxiliary functions of the speaker. For example, the auxiliary function of the speaker may include receiving sounds of user and/or environment through a microphone, and controlling the playing process of the sound signal through keys.

Further, the auxiliary function module may include at least a first auxiliary function module and a second auxiliary function module. The first auxiliary function module may be disposed on the main circuit board 445, and the second auxiliary function module may be disposed on the first branch circuit board 442.

Further, the auxiliary function module may further include a third auxiliary function module, and the third auxiliary function module is disposed on the second branch circuit board.

Specifically, the second auxiliary function module may be the first microphone element 1312, and the third auxiliary function module may be the second microphone element 1321. Both the first microphone element 1312 and the second microphone element 1321 may be MEMS (Micro Electro Mechanical System) microphones, which have a small operating current, relatively stable performance, and high quality of voice produced.

It should be noted that the first microphone element 1312 and the second microphone element 1321 may be equivalent to the microphone 432 in the foregoing embodiment.

In some embodiments, the first microphone and the second microphone may be distributed in the loudspeaker device in a specific manner, so that the main sound source (for example, a person's mouth) is located in a direction in which the second microphone element 1321 points to the first microphone element 1312.

Specifically, the first microphone element 1312 may be disposed on the side of the first circuit board 131 facing the cover 12, and the second microphone element 1321 may be disposed on the second circuit board 132 facing the accommodating body.

When the user wears the loudspeaker device, since the distances between the mouth (the main sound source) and the first microphone element 1312 and the second microphone element 1321 are less than the distances between other sound sources (for example, noise sources) in the environment and the first microphone element 1312 and the second microphone element 1321, the mouth may be considered as the near-field sound source of the first microphone element 1312 and the second microphone element 1321. For near-field sound sources, the magnitude of the sound received by the two sets of microphone elements may be related to the distance from the sound source. Since the first microphone element 1312 is closer to the main sound source, the first microphone element 1312 may receive greater audio signal $V_{J1}$. Since the second microphone element 1321 is farther from the main sound source, the second microphone element 1321 may receive less audio signals $V_{J2}$, that is, $V_{J1}>V_{J2}$.

Since the noise source in the environment is relatively far away from the first microphone element 1312 and the second microphone element 1321, the noise source in the environment may be considered as the far-field sound source of the first microphone element 1312 and the second microphone element 1321. For far-field sound sources, the amplitudes of the noise signals received by the two sets of microphone elements may be close, i.e., $V_{Y1}\approx V_{Y2}$.

Therefore, the total sound signal received by the first microphone element 1312 may be:

$$V_1 = V_{J1} + V_{Y1}, \tag{1}$$

The total sound signal received by the second group of microphone components may be:

$$V_2 = V_{J2} + V_{Y2}, \tag{2}$$

In order to eliminate the noise in the received sound signal, the total sound signal of the first microphone element 1312 and the total sound signal of the second microphone element 1321 may be processed by a differential processing. The form of differential processing may be denoted as follows:

$$V = V_1 - V_2 = (V_{J1} - V_{J2}) + (V_{Y1} - V_{Y2}) \approx V_{J1} - V_{J2}, \tag{3}$$

Further, according to the differential result of the signal obtained by Equation (3), and combining with the distance between the first microphone element 1312 and the second microphone element 1321 relative to the main sound source, the audio signal from the main sound source actually obtained by the first microphone element 1312 and/or the second microphone element may be further obtained, that is, $V_{J1}$ or $V_{J2}$.

Therefore, in order to ensure the quality of the audio signal finally obtained, the differential result of the signal obtained in Equation (3) needs be made as large as possible, i.e., $V_{J1}>>V_{J2}$. In some embodiments of the present disclosure, this effect may be achieved in the following ways: making the installation position of the first microphone element 1312 as close as possible to the main sound source (such as a human mouth); making the installation position of the second microphone element 1321 as far away as possible from the main sound source (such as human mouth); isolating the space of two microphones; setting a sound barrier between the two microphone elements. It should be noted that all of the above methods may achieve the effect of improving the quality of the audio signal, and these methods may be used alone or in combination.

In some embodiments, in order to make the installation position of the first microphone element 1312 as close as possible to the main sound source (such as a human mouth), the first circuit board 131 and the first microphone element 1312 mounted on it may be set to be inclined. In some embodiments, in order to make the installation position of the second microphone element 1321 as far away as possible from the main sound source (such as a human mouth), the second circuit board 132 and the second microphone element 1321 installed on it may be set to be inclined, so as to flexibly adjust the required installation distance. At the same time, corresponding sound guide channels and sound barriers may be arranged in each microphone element installation area. Specific installation methods may be found in FIGS. 61-63 and related descriptions.

It should be noted that the second circuit board 132 may be equivalent to the second branch circuit board in the foregoing embodiment.

Figure 61:
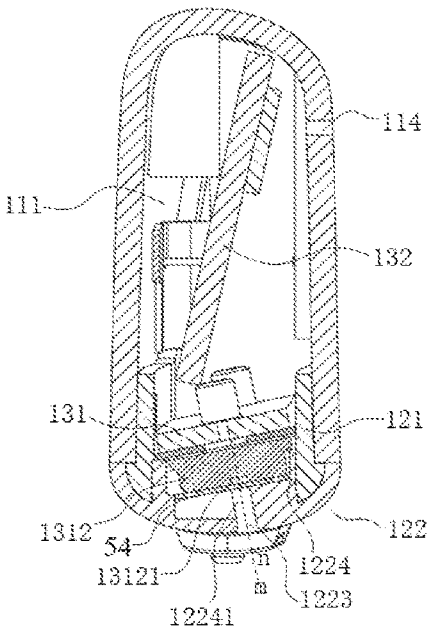
FIG. 61 is a schematic diagram illustrating a cross-section view of a loudspeaker device in an assembled state along a B-B axis in FIG. 55 of the present disclosure.

FIG. 61 is a schematic diagram illustrating a cross-section view of a loudspeaker device in an assembled state along a B-B axis in FIG. 55. The first circuit board 131 may include the first microphone element 1312. In some embodiments, the first microphone element 1312 may be placed on one side of the first circuit board 131 facing the cover 12. For example, the first microphone element 1312 may be placed on the first circuit board 131 at intervals from the switch

1311 in the embodiment. The first microphone element 1312 may be used to receive a sound signal from the outside of the loudspeaker device, and convert the sound signal into an electrical signal for analysis and processing.

Correspondingly, the bracket 121 may be provided with a first microphone hole corresponding to the first microphone element 1312, and the soft cover layer 124 may be provided with a first sound guiding hole 1223 corresponding to the first microphone hole 1214. The first sound guiding hole 1223 may be arranged corresponding to the first microphone element 1312.

Specifically, the first sound guiding hole 1223 may be disposed on the cover 12, one end of the first sound guiding hole 1223 may be connected to the first microphone hole 1214 on the cover 12, and the other end of the first sound guiding hole 1223 may face to the first microphone element 1312, thereby shortening the sound guide distance and improving the sound guide effect.

Specifically, the first circuit board 131 may face the cover 12 in a manner parallel or inclined to the cover 12, and the first sound guiding hole 1223 may be perpendicular or inclined to the surface of the cover 12.

In some embodiments, the depth direction of the opening 112 may be vertical or inclined with respect to the bottom of the accommodating body 11. When the opening 112 is vertical, the cover 12 may be horizontal with respect to the accommodating body 11 after being covered. When the opening 112 is inclined, the cover 12 may be inclined relative to the accommodating body 11 after being covered, and the inclination may be inclined toward the side of the mouth of the human body. In this way, the first sound guiding hole 1223 may be more directly faced to the mouth or face of the human, thereby improving the effect of the microphone assembly for acquiring the sound of the main sound source.

Further, when the opening 112 is inclined, the included angle between the plane of the opening 112 and the plane of the width direction of the accommodating body may be in the range of 10° to 30°, so that the first sound guiding hole 1223 further faces the mouth area of the person. Specifically, when the opening 112 is inclined, the included angle between the plane of the opening 112 and the plane of the width direction of the accommodating body may be any angle within the above range, such as 10°, 15°, 20°, 23°, 27°, 30°, etc., which is not specifically limited here.

Specifically, the first sound guiding hole 1223 may penetrate the soft cover layer 124. When the opening 112 is vertical and the first circuit board 131 is parallel to the cover 12, the first sound guiding hole 1223 may be perpendicular to the cover 12, that is, the first sound guiding hole 1223 may be vertical. When the opening 112 is vertical and the first circuit board 131 is inclined to the cover 12, the first sound guiding hole 1223 may be inclined to the cover 12, that is, the first sound guiding hole 1223 may be inclined. When the opening 112 is inclined and the first circuit board 131 is parallel to the cover 12, the first sound guiding hole 1223 may be arranged perpendicular to the cover 12, that is, the first sound guiding hole 1223 may be inclined. When the opening 112 is inclined and the first circuit board 131 is inclined to the cover 12, the first sound guiding hole 1223 may also be arranged inclined to the cover 12. That is, the first sound guiding hole 1223 may be vertical or inclined.

Further, when the first circuit board 131 faces the cover 12 in a manner inclined to the cover 12, the included angle between the first circuit board 131 and the plane where the cover 12 may be located is in the range of 5°-20°. Specifically, when the first circuit board 131 faces the cover 12 in a manner inclined to the cover 12, the included angle between the first circuit board 131 and the plane where the cover 12 is located may be within the range of the above included angle, such as 5°, 8°. 10°, 15°, 20°, etc., which is not specifically limited here.

Specifically, the first sound guiding hole 1223 may correspond to the first microphone hole 1214 on the bracket 121, and the first microphone element 1312 may be communicated with the outside of the loudspeaker device, so that the sound outside the loudspeaker device may pass through the first sound guiding hole 1223 and the first microphone hole 1214, and is received by the first microphone element 1312.

In order to further improve the sound guide effect, the central axis of the first sound guiding hole 1223 may coincide with the main axis of the sound receiving region 13121 of the first microphone element 1312. The sound receiving region 13121 of the first microphone element 1312 refers to a region (for example, a diaphragm) on the first microphone element 1312 that receives sound waves. When the central axis of the first sound guiding hole 1223 coincides with the main axis of the sound receiving region 13121 of the first microphone element 1312, the sound of the main sound source may be collected by the first microphone hole 1214 and may be directly guided to the receiving region 13121 of the first microphone element 1312 through the first sound guiding hole 1223. Therefore, the sound propagation path may be further reduced, which may prevent the main sound source from being repeatedly propagated in the cavity to cause loss and echo, and may also prevent the main sound source from being transmitted to the area where the second microphone elements 1321 are located through the channel in the cavity, thereby improving the sound effect.

In an embodiment, the cover 12 may be arranged in a strip shape, wherein the main axis of the first sound guiding hole 1223 and the main axis of the sound receiving region 13121 of the first microphone element 1312 may coincide with each other in the width direction of the cover 12. The main axis of the sound receiving region 13121 of the first microphone element 1312 refers to the main axis of the sound receiving region 13121 of the first microphone element 1312 in the width direction of the cover 12, such as the axis n in FIG. 61. The main axis of the first sound guiding hole 1223 may be the axis m in FIG. 61, and the axis n and the axis m may coincide.

Further, the first sound guiding hole 1223 may be in any shape, as long as it can receive sound from the outside of the loudspeaker device. In some embodiments, the first sound guiding hole 1223 may be a circular hole with a relatively small size, and may be placed in a region of the cover 12 corresponding to the first microphone hole 1214. The small first sound guiding hole 1223 may reduce the communication between the first microphone element 1312 or the like in the loudspeaker device with the outside, thereby improving the sealing effect of the loudspeaker device.

Furthermore, in order to guide the sound signal entering through the first sound guiding hole 1223 to the first microphone element 1312, the sound guide channel 12241 may be set in a curved shape.

Specifically, in an application scenario, the main axis of the first sound guiding hole 1223 may be arranged in the middle of the cover 12 in the width direction of the cover 12.

At the same time, the hard bracket 121 may include a microphone hole 1214 corresponding to the first microphone element 1312. The soft cover layer 124 of the cover 12 may include a first sound blocking member 1224 at a position corresponding to the first sound guiding hole 1223. The first sound blocking member 1224 may extend inside the cavity 111 through the microphone hole 1214, limiting the transmission of sound to the transmission direction of the first microphone element 1313 and defining a sound guiding channel 12241. One end of the sound guiding channel 12241 may be in communication with the first sound guiding hole 1223 on the soft cover layer 124. The first microphone element 1312 may be inserted into the sound guiding channel 12241 from the other end of the sound guiding channel 12241.

The loudspeaker device may further include the switch 1311 described above. The switch hole 1213 and the first microphone hole 1214 may be placed on the hard bracket 121 at intervals.

Further, the distance between switch hole 1213 and the first microphone hole 1214 may be within a range of 10-20 mm, for example, 10 mm, 15 mm, 20 mm, etc.

Correspondingly, the first sound blocking member 1224 may extend from the soft cover layer 124, to a periphery of the first sound guiding hole 1223, through the microphone hole 1214, inside the cavity 111, to a periphery of the first microphone element 1312, to form a sound guiding channel 12241 from the first sound guiding hole 1223 to the first microphone element 1312. Thus, the sound signal of the loudspeaker device entering the sound guiding hole may directly reach the first microphone element 1312 through the sound guiding channel 12241.

Specifically, a shape of a cross section of the sound guiding channel 12241 perpendicular to a length direction thereof may be the same as or different from a shape of the microphone hole 1214 or the first microphone element 1312. In an application scenario, shapes of cross sections of the first microphone hole 1214 and the first microphone element 1312 in a direction perpendicular to the hard bracket 121 facing toward the cavity 111 may be square. A size of the microphone hole 1214 may be slightly larger than an outside size of the sound guiding channel 12241. An inside size of the sound guiding channel 12241 may be not smaller than the outside size of the first microphone element 1312, such that the sound guiding channel 12241 may pass through the first sound guiding hole 1223 to reach the first microphone element 1312 and cover the periphery of the first microphone element 1312.

In this way, the soft cover layer 124 of the loudspeaker device may include a first sound guiding hole 1223 and a sound guiding channel 12241. The sound guiding channel 12241 may pass from the periphery of the first sound guiding hole 1223, through the microphone hole 1214 to reach the first microphone element 1312, and cover the periphery of the first microphone element 1312. The sound guiding channel 12241 may make the sound signal entering from the first sound guiding hole 1223 reach the first microphone element 1312 through the first sound guiding hole 1223, and may be received by the first microphone element 1312, which may reduce leakage of the sound signal in a propagation process, thereby improving the efficiency of receiving electronic signals of the loudspeaker device.

In an application scenario, the loudspeaker device may further include a waterproof mesh 64 placed in the sound guiding channel 12241. The waterproof mesh 64 may abut a side of the soft cover layer 124 facing toward the microphone element by the first microphone element 1312, and cover the first sound guiding hole 1223.

Specifically, the hard bracket 121 in the sound guiding channel 12241 close to the first microphone element 1312 may form a convex surface corresponding to the first microphone element 1312, such that the waterproof mesh 64 may be sandwiched between the first microphone element 1312 and the convex surface. The waterproof mesh 64 may also be directly bonded to a periphery of the first microphone element 1312, and the setting manner thereof is not limited here.

In addition to waterproofing the first microphone element 1312, the waterproof mesh 64 in this embodiment may also have effects such as sound transmission, so as to avoid affecting a sound receiving performance of a sound receiving region 13121 of the first microphone element 1312.

It should be noted that, due to a setting need for the circuit component 93, the first microphone element 1312 may be placed at a first position of the first circuit board 131. When the first sound guiding hole 1223 is disposed, the first sound guiding hole 1223 may be placed at a second position of the cover 12 due to requirements of beauty and convenience. In this embodiment, the first position and the second position may not correspond to each other along the width direction of the cover 12, such that the main axis of the first sound guiding hole 1223 and the main axis of the sound receiving region 13121 of the first microphone element 1312 may be spaced from each other in the width direction of the cover 12. Therefore, the sound entering from the first sound guiding hole 1223 may not be able to reach the sound receiving region 13121 of the first microphone element 1312 in a straight line.

In the embodiment, the cover 12 may be part of a housing of the loudspeaker device. In order to meet an overall aesthetic requirement of the loudspeaker device, the first sound guiding hole 1223 may be placed in the middle of the cover 12 in the width direction, such that the first sound guiding hole 1223 may look more symmetrical and meet visual needs of people.

In some embodiments, the corresponding sound guiding channel 12241 may be set to have a stepped shape along a cross-section along the B-B axis in FIG. 55, such that the sound signal introduced by the first sound guiding hole 1223 may be transmitted to the first microphone element 1312 through the sound guiding channel 12241 in the stepped shape and received by the first microphone element 1312.

Figure 63:
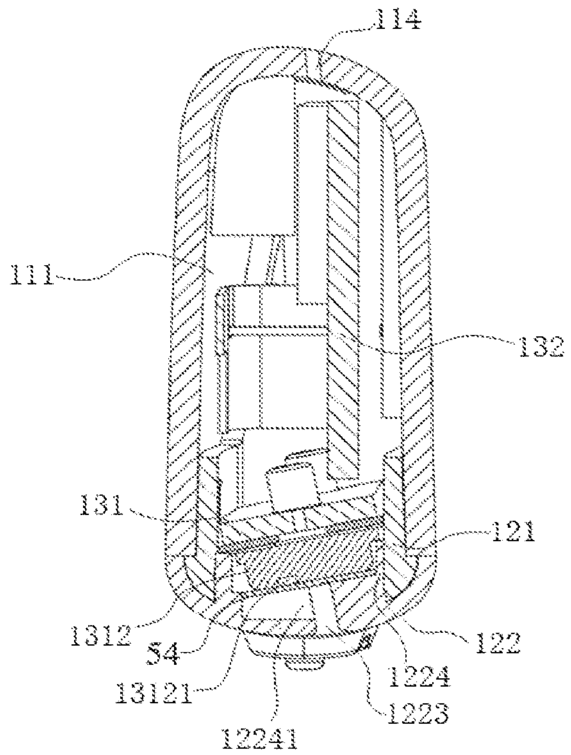
FIG. 63 is a schematic diagram illustrating a cross-section view of a loudspeaker device in an assembled state along a C-C axis in FIG. 61.

FIG. 63 is a schematic diagram illustrating a cross-section view of a loudspeaker device in an assembled state along a C-C axis in FIG. 55 according to some embodiments of the present disclosure. In some embodiments, the loudspeaker device may further include a light emitting element 1313. The light emitting element 1313 may be placed on the first circuit board 131 of the circuit component 93 to be accommodated in the cavity 111. For example, the light emitting element 1313 may be placed on the first circuit board 131 in a certain arrangement together with the switch 1311 and the first microphone element 1312 in the embodiment. It should be noted that the circuit component 93 may be equivalent to the control circuit in the foregoing embodiments.

In some embodiments, the hard bracket 121 may include a light emitting hole 1215 corresponding to the light emitting element 1313. The soft cover layer 124 may cover the light emitting hole 1215, and a thickness of a region corresponding to the light emitting hole 1215 of the soft cover layer 124 may be set to allow light generated by the light emitting element 1313 to be transmitted through the soft cover layer 124.

The light emitting element 1313 may include a light emitting diode, etc. The number of the light emitting element 1313 may be one or more. The number of the light emitting holes 1215 on the hard bracket 121 may be the same as the number of the light emitting element 1313. When there are multiple light emitting element 1313, there may be different light emitting holes 1215 correspondingly, and different signals may be transmitted through different light emitting elements 1313.

In this embodiment, the soft cover layer 124 may still transmit the light emitted by the light emitting element 1313 to the outside of the loudspeaker device while covering the light emitting hole 1215 by certain means.

In some embodiments, a thickness of an entire region or part region of the soft cover layer 124 corresponding to the light emitting hole 1215 may be less than a thickness of a region of the soft cover layer 124 corresponding to a periphery of the light emitting hole 1215, such that the light emitted by the light emitting element 1313 may pass through the light emitting hole 1215 and may be transmitted through the soft cover layer 124. Of course, the region of the soft cover layer 124 covering the light emitting hole 1215 may transmit light through other means, which is not specifically limited here. For example, a window may be disposed on the soft cover layer 124 corresponding to the entire area or part of the light emitting hole 1215, and the window may be covered with a layer of transparent or light-transmitting material (for example, thin film, quartz, etc.), so that the light emitted by the light emitting element 1313 can pass through the light emitting hole 1215 and be further transmitted through the window.

In this way, the soft cover layer 124 may cover the light emitting hole 1215 of the corresponding light emitting element 1313, and may allow light emitted by the light emitting element 1313 to be transmitted from the soft cover layer 124 to the outside of the loudspeaker device. Thus, the light emitting element 1313 may be sealed by the soft cover layer 124 without affecting the light emitting function of the loudspeaker device, so as to improve the scaling effect and waterproof performance of the loudspeaker device.

Specifically, in one embodiment, the hard bracket 121 may be further provided with a light blocking member 1216 extending toward the inside of the cavity 111 on the periphery of the light emitting hole 1215, and the light blocking member 1216 may limit the transmission direction of the light generated by the light emitting element 1313.

The shape of the light emitting hole 1215 may be any shape that may transmit the light emitted by the light emitting element 1313, such as a circle, a square, a triangle, etc. In this embodiment, the shape of the light emitting hole 1215 may be a circle.

Since there is still a certain distance between the light emitting element 1313 and the light emitting hole 1215, if there is no restriction, part of the light emitted by the light emitting element 1313 may be leaked out in the process of reaching the light emitting hole 1215, so that the light can not effectively propagate to the light emitting hole 1215, thereby reducing the brightness of the light that can be seen from the outside of the loudspeaker device, and making it inconvenient for the user to receive signals. However, the arrangement of the light blocking member 1216 in this embodiment may limit the transmission direction of the light generated by the light emitting element 1313, so as to reduce light leakage, thereby improving the brightness of the light transmitted through the light emitting hole 1215.

Specifically, the light blocking member 1216 in this embodiment may be partially or entirely formed by a hard bracket 121. For example, the hard bracket 121 may extend along the periphery of the light emitting hole 1215 toward the inside of the cavity 111 and surround the light emitting element 1313. Therefore, a light channel for light propagation may be formed, through which the light generated by the light emitting element 1313 can propagate directly to the light emitting hole 1215 along the arrangement direction of the channel, or the hard bracket 121 may not form a light channel, but only restrict the propagation of light from one direction or several directions. For example, the hard bracket 121 may extend from only one side of the light emitting hole 1215 into the cavity 111 to form a light blocking member 1216 that shields the light emitting element 1313. As another example, the light blocking member 1216 may further cooperate with other components to limit the spread of light. For example, the hard bracket 121 may extend from one side of the light emitting hole 1215 into the cavity 111 to form a light blocking member 1216 for blocking the light emitting element 1313. The light blocking member 1216 may further cooperate with the inner wall of the cavity 111 or other structures of the hard bracket 121 to restrict the transmission direction of the light generated by the light emitting element 1313 from multiple directions.

In an application scenario, the light emitting element 1313 and the first microphone element 1312 may be adjacently arranged on the first circuit board 131, and the corresponding light emitting holes 1215 and the first microphone holes 1214 may be arranged on the hard bracket 121 at intervals. As described above, a first sound blocking member 1224 formed by a soft cover layer 124 and defining a sound guide channel 12241 may be disposed on the periphery of the first microphone element 1312, and the first sound blocking member 1224 may be arranged to pass through the first microphone hole 1214, so that the first microphone element 1312 and the light emitting element 1313 are spaced apart, and the first microphone hole 1214 and the light emitting hole 1215 are spaced apart.

Specifically, in this application scenario, the light blocking member 1216 formed by the hard bracket 121 may cooperate with a side wall of the first sound blocking member 1224 close to the light emitting element 1313, limiting the transmission direction of the light generated by the light emitting element 1313.

In another application scenario, the cavity 111 may be arranged in a strip shape on a cross section perpendicular to the direction of the opening 112. Correspondingly, the hard bracket 121 may be also in a strip shape and inserted into the cavity 111 from the opening 112 through the insertion part 1211 to form a mechanical connection with the cavity 111. Insertion parts 1211 may be disposed on both sides along the length direction of the hard bracket 121, so that the light emitting element 1313 is also provided with corresponding insertion parts 1211 of the hard bracket 121 on both sides along the length direction of the hard bracket 121, so as to limit the light on both sides of the light emitting element 1313. Further, in this application scenario, the light blocking member 1216 may be further disposed on the side of the light emitting element 1313 perpendicular to the length direction of the hard bracket 121. The side wall of the first sound blocking member 1224 may be arranged on the other side of the light emitting element 1313 perpendicular to the length direction of the hard bracket 121. The light blocking member 1216 and the first sound blocking member 1224 may be parallel plates and further restrict the transmission direction of the light generated by the light emitting element 1313 together with the insertion parts 1211 on both sides of the light emitting element 1313.

In one embodiment, the circuit component 93 in the loudspeaker device may include the first circuit board 131 in the above embodiment of the loudspeaker device, and may further include a second circuit board 132. More descriptions thereof may be found in FIG. 55, FIG. 58, FIG. 61, and FIG. 62.

It should be noted that the second circuit board 132 may be equivalent to the second branch circuit board in the foregoing embodiment.

Specifically, the second circuit board 132 may be disposed facing the accommodating body 11, and the second circuit board 132 may be disposed in the cavity 111 so as to be sloped with respect to the first circuit board 131. One side of the second circuit board 132 facing the accommodating body 11 may be provided with a second microphone element 1321.

The second microphone element 1321 may be arranged to face the side wall of the accommodating body 11, so that there is a large space near the second microphone element 1321, and it is convenient to provide functional components corresponding to the second microphone element 1321 on the accommodating body 11. In addition, the second circuit board 132 may be arranged so as to be sloped with respect to the first circuit board 131, and the functional components on the two circuit boards may be arranged in a staggered manner, which may also reduce the distance between the functional components, thereby further saving and compressing the interior space of the loudspeaker device.

The side wall of the accommodating body 11 opposite to the cover 12 or the first sound guiding hole 1223 may be further provided with a second sound guiding hole 114.

A second sound guiding hole 114 may be correspondingly disposed on the side wall of the accommodating body 11. The second sound guiding hole 114 and the first sound guiding hole 1223 may be away from each other. In some embodiments, the opening 112 of the accommodating body 11 may be an inclined opening, the cover 12 may be inclined with respect to the accommodating body 11. The side wall of the accommodating body 11 opposite to the first sound guiding hole 1223 may be a side surface of the cavity 111. The second sound guiding hole 114 may be disposed on one side surface of the accommodating body 11. Furthermore, the second sound guiding hole 114 may be disposed on one side surface of the accommodating body 11 and may be within a range of 3-6 mm from the top of the accommodating body 11. Specifically, the distance may be 3 mm, 4 mm, 5 mm, 6 mm, etc.

In some embodiments, when the depth direction of the opening 112 of the accommodating body 11 is vertical with respect to the bottom of the accommodating body, the cover 12 may be arranged horizontally relative to the accommodating body 11. The side wall of the accommodating body 11 opposite to the first sound guiding hole 1223 may be the top of the cavity 111. The sound guiding hole 114 may be disposed on the top of the accommodating body 11. Further, the second sound guiding hole 114 may be disposed at the middle position of the top of the accommodating body 11.

The above method may keep the second sound guiding hole 114 away from the main sound source, and reduce the sound of the main sound source received by the second sound guiding hole 114, thereby increasing the proportion of the second sound guiding hole 114 receiving environmental noise, and enhancing the noise reduction effect.

As described in the above embodiment of the loudspeaker device of the present disclosure, the cover 12 may be provided with a first sound guiding hole 1223 corresponding to the first microphone element 1312 and the first microphone hole 1214, wherein the first microphone element 1312 may be used to receive the sound input from the first sound guiding hole 1223, and the second microphone element 1321 may be used to receive and the sound input from the second sound guiding hole 114.

Further, the central axis of the second sound guiding hole 114 may coincide with the main axis of the sound receiving region of the second microphone element 1321.

When the central axis of the second sound guiding hole 114 coincide with the main axis of the sound receiving region of the second microphone element 1321, noise may be directly guided to the sound receiving region of the second microphone element 1321 through the second sound guiding hole 114, thereby reducing the propagation of the noise inside the cavity 111. At the same time, the noise may be directly guided to the sound receiving region 13121 of the first microphone element 1312 through the first sound guiding hole 1223. The noises received by the first microphone element 1312 and the second microphone element 1321 may be approximately the same, which is beneficial for eliminating noise in subsequent processing and improving the quality of the main sound source.

In some embodiments, the central axis of the second sound guiding hole 114 may be coincident with or parallel to the central axis of the first sound guiding hole 1223.

The second sound guiding hole 114 and the first sound guiding hole 1223 may have the same central axis direction, that is, their central axes may coincide or be parallel. In addition, the sound entrance of the second sound guiding hole 114 and the sound entrance of the first sound guiding hole 1223 may face opposite directions, thereby reducing the main sound source received by the second sound guiding hole 114, which is beneficial for eliminating noise in subsequent processing and improving the quality of the main sound source.

In some embodiments, the main axis of the sound receiving region of the second microphone element 1321 may coincide with or be parallel to the main axis of the sound receiving region 13121 of the first microphone element 1312. The sound receiving region of the second microphone element 1321 may receive the sound signal passing through the second sound guiding hole 114, and the sound receiving region 13121 of the first microphone element 1312 may receive the sound signal passing through the first sound guiding hole 1223. Since the main sound source signal passing through the second sound guiding hole 114 is small, the main sound source signal received by the sound receiving region of the second microphone element 1321 may be small, which helps to achieve the effect of improving the quality of the audio signal.

In some embodiments, the first circuit board 131 may be arranged parallel to the opening plane of the opening 112 and close to the opening 112. Optionally, the first circuit board 131 may also be inclined to the opening plane of the opening 112 and disposed close to the opening 112. Furthermore, the switch 1311, the light emitting element 1313, etc., as described above may be further disposed on the first circuit board 131. The switch 1311, the light emitting element 1313, and the first microphone element 1312 may be arranged on the first circuit board 131 in a certain arrangement. Correspondingly, a switch hole 1213, a light emitting hole 1215, a first microphone hole 1214, etc., may be separately arranged on the cover 12 to transmit signals to the outside of the loudspeaker device through the corresponding holes.

Further, the first microphone hole 1214 may be arranged at the center of the cover 12. The switch hole 1213 and the light emitting hole 1215 may be respectively arranged on both sides of the first microphone hole 1214 in the length direction of the cover 12. The distance between the switch hole 1213 and the first microphone hole 1214, and the distance between the light emitting hole 1215 and the first microphone hole 1214 may be in the range of 5-10 mm, and specifically may be 5 mm, 6 mm, 7 mm, 8 mm, 9 mm, 10 mm, etc. The distance between the switch hole 1213 and the light emitting hole 1215 from the first microphone hole 1214 may be equal or unequal.

In some embodiments, the accommodating body 1151 may extend from the opening 112 in a direction perpendicular to the opening plane to form a cavity 111 with a certain width. The second circuit board 132 may be arranged to be parallel to the width direction of the cavity 111 and perpendicular to the opening plane. Optionally, the second circuit board 132 may also be inclined to the width direction of the cavity 111 and arranged inclined to the plane of the opening 112. The second circuit board 132 may be disposed in the cavity 111 so as to be sloped with respect to the first circuit board 131. The second circuit board 132 may be further provided with a main control chip, an antenna, etc.

In some embodiments, the second circuit board 132 may be inclined to the width direction of the cavity 111 and arranged to be inclined to the plane of the opening 112. The included angle between the second circuit board 132 and the width direction of the cavity 111 may be in the range of 5°-20°. Specifically, the included angle between the second circuit board 132 and the width direction of the cavity 111 may be any angle within the above range, for example, 5°, 10°, 15°, 20°, etc., which are not specifically limited here.

In an application scenario, when the user uses the loudspeaker device, the main axis of the sound receiving region of the second microphone element 1321 may coincide with the main axis of the sound receiving region 13121 of the first microphone element 1312, and the first microphone element 1312 and the second microphone element 1321 may be in a straight line with the user's mouth.

In this embodiment, the first microphone element 1312 and the second microphone element 1321 may be respectively disposed on two circuit boards. Two microphone elements may receive sound signals through the first sound guiding hole 1223 and the second sound guiding hole 114 respectively, one of which may be used to collect main sounds such as human voices, while the other microphone element may have a background noise collection function to facilitate the collection of ambient noise. The two microphone elements may cooperate to analyze and process the received sound signal, which may play a role in noise reduction, etc., thereby improving the quality of sound signal processing.

Figure 62:
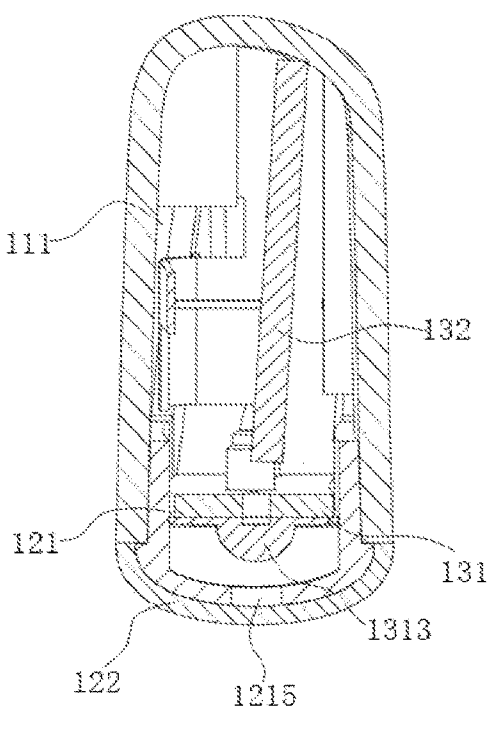
FIG. 62 is a schematic structural diagram illustrating an included angle, different from that in FIG. 61, between a first circuit board and a second circuit board.

Further, as shown in FIG. 61 and FIG. 62, FIG. 62 is a schematic structural diagram illustrating an included angle, different from that in FIG. 61, between a first circuit board and a second circuit board. The first circuit board 131 and the second circuit board 131 may be arranged so as to be sloped with respect to each other in the same cavity 111, which may make the installation mode of the two circuit boards more flexible. The angle between the two circuit boards may be adjusted according to the size and position of the electronic components on the two circuit boards, thereby improving the space utilization rate of the loudspeaker device. Further, when the two circuit boards are further used in the loudspeaker device, the space of the loudspeaker device may be saved, which facilitates the thinning of the loudspeaker device.

Further, the included angle between the first circuit board 131 and the second circuit board 132 may be in the range of 50° to 150°, and specifically, the angle between the first circuit board 131 and the second circuit board 132 may be any angle within the above range, such as 70°, 80°, 90°, 100°, 110°, etc.

Specifically, in an application scenario, the opening 112 and the cover 12 may be arranged in a corresponding elongated shape. The shape of the first circuit board 131 may match the shape of the opening 112, and the width d1 of the first circuit board 131 may be not greater than the size of the plane of the opening along the width direction of the opening 112, so that the first circuit board 131 (parallel or inclined to the plane where the opening is located) may be accommodated in the cavity 111 near the opening 112. That is, the first circuit board 131 may be also arranged in a strip shape. Correspondingly, the switch 1311, the light emitting element 1313, and the first microphone element 1312 may be arranged on the first circuit board 131 at intervals along the length direction of the first circuit board 131, that is, the length direction of the cover 12.

In some embodiments, the second microphone element 1321 may be a bone conduction microphone, and the bone conduction microphone may extend out of the accommodating body 11 through the second sound guiding hole 114. The bone conduction microphone may be installed on a side wall of the housing body 11. The side wall may be a side wall that fits the user's body when the user wears the loudspeaker device, so that the bone conduction microphone may better receive the vibration signal of the main sound source. When the user wears the loudspeaker device for voice input, the second microphone element 1321 may mainly collect the vibration signal of the main sound source, and compare the vibration signal with the sound signal (including audio signal and noise) collected by the first microphone element 1312 (air conduction). In some embodiments, the sound signal collected by the first microphone element 1312 may be optimized based on the above comparison result to obtain a high-quality audio signal.

In some embodiments, the component body may be provided with a second sound guiding hole 114 passing through the side wall of the cavity 111, and a second sound blocking member 115 may be disposed at a position corresponding to the second sound guiding hole 114. The second sound blocking member 115 may extend toward the interior of the cavity 111 through the second sound guiding hole 114 to limit the transmission of sound to the second microphone element 1321.

Specifically, in this embodiment, the second sound guiding hole 114 corresponding to the second microphone element 1321 may be disposed on the component body, and penetrate the cavity 111 to communicate the second microphone element 1321 with the outside, so that the second microphone element 1321 may receive external sound signals.

The second sound blocking member 115 may be a hard material or a soft material. For example, the second sound blocking member 115 may be formed by the accommodating body 11 extending from the inner side of the cavity 111 along the periphery of the second sound guiding hole 114 toward the cavity 111. In this embodiment, the second sound blocking member 114 may be formed by a soft rubber that is integrally injected with the accommodating body 11 and is formed by extending the inner side of the cavity 111 along the periphery of the second sound guiding hole 114 toward the cavity 111. In an application scenario, the second sound blocking member 115 may extend into the cavity 111 along the periphery of the second sound guiding hole 114 to the second microphone element 1321, and further surround the sound receiving region of the second microphone element 1321 to form a channel connecting the second sound guiding hole 114 and the second microphone element 1321, so that the external sound signal input to the second sound guiding hole 114 directly passes through the channel and is received by the sound receiving region of the second microphone element 1321. In another application scenario, the second sound blocking member 115 may not completely surround the periphery of the second sound guiding hole 114, but only extends along one or both sides of the second sound guiding hole 114 toward the inside of the cavity 111. The second sound blocking member 115 may extend to the second microphone element 1321 to guide the sound input from the second sound guiding hole 114 to propagate to the second microphone element 1321 and be received by its sound receiving region.

Figure 64:
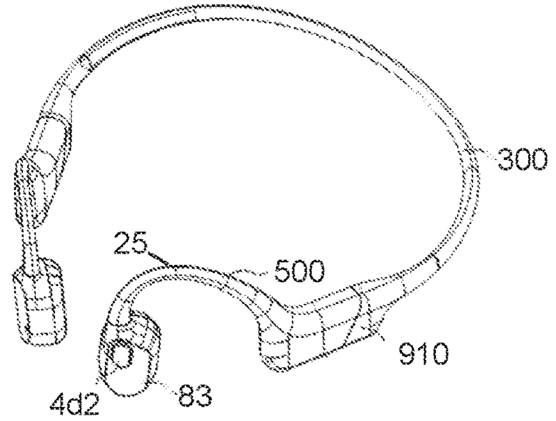
FIG. 64 is a schematic structural diagram illustrating a loudspeaker device according to some embodiments of the present disclosure.
Figure 65:
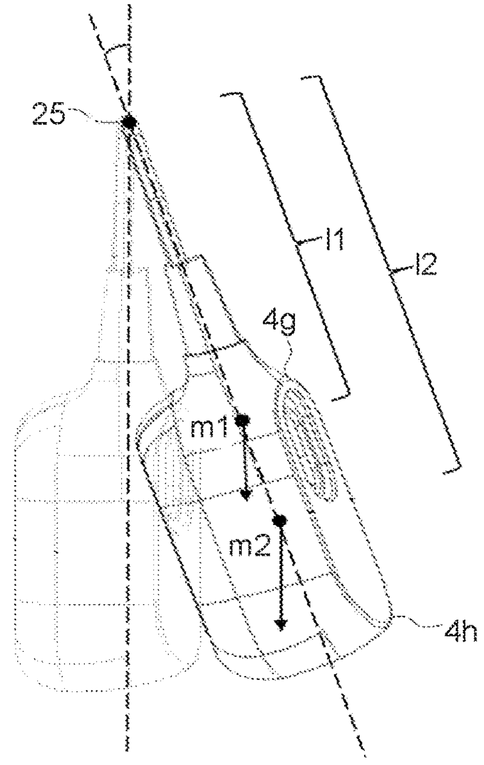
FIG. 65 is a schematic structural diagram illustrating a speaker component according to some embodiments of the present disclosure.

Referring to FIG. 64 and FIG. 65, FIG. 64 is a schematic structural diagram illustrating a loudspeaker device according to some embodiments of the present disclosure. FIG. 65 is a schematic structural diagram illustrating a speaker component according to some embodiments of the present disclosure. The loudspeaker device may transmit a sound to an auditory system of a user of the loudspeaker device via a bone conduction mode and/or an air conduction mode, so that the user can hear the sound. In some embodiments, the loudspeaker device may include a support connector 910 and at least one speaker component 83 disposed on the support connector 910. In some embodiments, the support connector 910 may include an ear hook 500. Specifically, the support connector 910 may include two ear hook s 500 and a rear hook 300, and the rear hook 300 may be connected to the two ear hook s 500 and disposed between the two ear hook s 500. When the loudspeaker device is worn by the user, the two ear hook s 500 may correspond to the left ear and the right ear of the user, respectively, and the rear hook 300 may correspond to the back of the head of the user. The ear hook 500 may be configured to contact with the head of the user, and one or more contact points (i.e., one or more points located near a top end 25) of the ear hook 500 and the head of the user may include a vibration fulcrum of the speaker component 83 when the speaker component 83 vibrates.

It should be noted that the support connector may be equivalent to the circuit housing described above.

In some embodiments, the vibration of the speaker component 83 may be regarded as a reciprocating swing movement. The top end 25 of the ear hook 500 (also referred to as the top end 25 for brevity) may be regarded as a fixed point of the reciprocating swing movement, and a portion of the ear hook 500 between the top end 25 and the speaker component 83 may be regarded as an arm of the reciprocating swing movement. The fixed point of the reciprocating swing movement may be regarded as the vibration fulcrum. A swing amplitude (i.e., vibration acceleration) of the speaker component 83 may be a positive correlation with a volume generated by the speaker component 83. A mass distribution of the speaker component 83 may affect the amplitude of the swing amplitude of the speaker component 83, and further affect the volume generated by the speaker component 83.

In some embodiments, the speaker component 83 may include an earphone core, a core housing 41 configured to accommodate the earphone core, a speaker module (not shown in the figure), and at least one key module **4*d*. Specifically, the speaker module may include a first speaker module and a second speaker module, which may be disposed in the left and right speaker components 83, respectively. In some embodiments, the speaker module may refer to all components of the speaker component 83 other than the key module 4*d*. For example, the speaker module may refer to the earphone core 42 and the core housing 41**.

Further, the support connector 910 may be configured to accommodate a control circuit (not shown in the figure) or a battery (not shown in the figure). The control circuit or the battery may drive the earphone core to vibrate to generate a sound.

In some embodiments, the key module **4*d* may be configured for user operation. For example, a user may operate the key module 4*d*** to perform a function such as a pause/start function, a recording function, an answering a call function, or the like.

Specifically, the key module **4*d* may implement different interactive functions based on a user's operation instruction. For example, the user may click the key module 4*d* once to pause/start e.g., music, recording, etc. As another example, the user may click the key module 4*d* twice to answer a call. As a further example, the user may regularly click the key module 4*d* (e.g., click the key module 4*d* once every second, click the key module 4*d* twice in total) to activate a recording function of the loudspeaker device. In some embodiments, the user's operation instruction may include a click, a slid, a scroll, or the like, or any combination thereof. For example, the user may slide up and down on a surface of the key module 4*d*** to realize a function of switching songs.

In an application scenarios, the speaker component 83 may include at least two key modules **4*d*, and the at least two key modules 4*d* may correspond to a left ear hook and a right ear hook, respectively. The user may use the left and right hands to operate the at least two key modules 4*d***, respectively, thereby improving the user's experience.

In some embodiments, to further improve the user's human-computer interaction experience, the human-computer interaction function may be allocated to the key modules **4*d* corresponding to the left ear hook and the right ear hook, respectively. The user may operate each of the at least two key modules 4*d* to realize corresponding functions. For example, the user may click the key module 4*d* corresponding to the left ear hook once to activate a recording function, and/or click the key module 4*d* corresponding to the left ear hook again to turn off the recording function. As another example, the user may click the key module 4*d* corresponding to the left ear hook twice to realize the pause/play function. As another example, the user may click the key module 4*d*** corresponding to the right ear hook twice to answer a call or realize a next/previous song function when music is playing and there is no call.

In some embodiments, the aforementioned functions corresponding to the at least two key modules **4*d* may be determined by the user. For example, the user may assign the pause/play function executed by the key module 4*d* corresponding to the left ear hook to the key module 4*d* corresponding to the right ear hook by setting an application software. As another example, the user may determine that the function of answering a call function executed by performing an operation on the key module 4*d* corresponding to the left ear hook may be replaced by performing an operation on the key module 4*d* corresponding to the right ear hook. Further, for a specific function, the user may determine the user's operation instruction (e.g., a number of clicking the key module 4*d*, a sliding gesture, etc.) by setting the application software to perform the function. For example, a user's operation instruction corresponding to the answering a call function may be determined as click the key module 4*d* twice instead of once. As another example, a user's operation instruction corresponding to the next/previous song function may be determined as click the key module 4*d*** three times instead of twice. The user may determine the user's operation instruction based on a habit of the user, thereby to a certain extent, avoiding operational errors and improving the user experience.

In some embodiments, the above-mentioned interaction function may be not unique, which may be determined according to functions commonly used by the user. For example, the key module 4*d* may be used to perform a call rejection function, a text messages read function, or the like. The user may determine the interaction function and/or the user's operation instruction, thereby meeting different needs.

In some embodiments, a distance between a center of the key module 4*d* and the vibration fulcrum may be not greater than a distance between a center of the speaker module and the vibration fulcrum, thereby improving the vibration acceleration of the speaker component 83 and the volume generated by the vibration of the speaker component 83.

In some embodiments, the center of the key module 4*d* may include a center of mass m1 or a centroid g1. A first distance 11 may be formed between the center of mass m1 or the centroid g1 of the key module 4*d* and the top end 25 (i.e., the vibration fulcrum). A second distance 12 may be formed between a center of mass m2 or a centroid g2 of the speaker module (the portion of the speaker component 83 other than the key module 4*d*) and the top end 25. It should be noted that the center of mass and the centroid of the speaker module may be replaced by a center of mass and a centroid of the core housing 41, respectively.

In some embodiments, a mass distribution of the key module 4*d* and/or the speaker module may be relatively uniform. The center of mass m1 of the key module 4*d* may coincide with the centroid g2 of the key module 4*d*. The center of mass m2 of the speaker module may coincide with the centroid g2 of the speaker module.

In some embodiments, the mass distribution of the key module 4*d* in the speaker component 83 may be indicated by a ratio of the first distance 11 to the second distance 12, and a ratio k of a mass of the key module 4*d* to a mass of the speaker module.

Specifically, according to the dynamic principle, when the key module 4*d* is arranged at a far end 4*h* of the top end 25, a vibration acceleration of the speaker component 83 may be less than a vibration acceleration of the speaker component 83 when the key module 4*d* is arranged at a proximal end 4*g* of the top end 25, thereby reducing the volume generated by the speaker component 83. When the mass of the key module 4*d* is constant, the vibration acceleration of the speaker component 83 may be decreased as the ratio of the first distance 11 to the second distance 12 increases, thereby reducing the volume generated by the speaker component 83. When the ratio of the first distance 11 to the second distance 12 is constant, the vibration acceleration of the speaker component 83 may be decreased as the mass of the key module 4*d* increases, thereby reducing the volume generated by the speaker component 83. The volume generated by the speaker component 83 may be determined and/or adjusted within a range that the ear of the user can recognize by adjusting the ratio of the first distance 11 to the second distance 12 and/or the mass ratio k of the key module 4*d* to the mass of the speaker module.

In some embodiments, the ratio of the first distance 11 to the second distance 12 may not be greater than 1.

Specifically, when the ratio of the first distance 11 to the second distance 12 is equal to 1, the center of mass m1 and centroid g1 of the key module 4*d* may coincide with the center of the mass m2 and the centroid g2 of the speaker module, respectively, and the key module 4*d* may be disposed on a center of the speaker component 83. When the ratio of the first distance 11 to the second distance 12 is less than 1, the center of mass m1 or the centroid g1 of the key module 4*d* may be closer to the top end 25 with respect to the center of mass m2 or the centroid g2 of the speaker module, and the key module 4*d* may be disposed on a proximal end close to the top end 25. The smaller the ratio of the first distance 11 to the second distance 12 is, the closer the center of mass m1 or centroid g1 of the key module 4*d* to the top end 25 relative to the center of mass m2 or centroid g2 of the speaker module is.

In some embodiments, the ratio of the first distance 11 to the second distance 12 may be not greater than 0.95, and the key module 4*d* may be closer to the top end 25. In some embodiments, the ratio of the first distance 11 to the second distance 12 may be 0.9, 0.8, 0.7, 0.6, 0.5, etc., which may be determined according to actual needs and is not limited herein.

Further, when the ratio of the first distance 11 to the second distance 12 satisfies a range aforementioned, the ratio of the mass of the key module 4*d* to the mass of the speaker module may not be greater than 0.3. For example, the ratio of the mass of the key module 4*d* to the mass of the speaker module may not be greater than 0.29, 0.23, 0.17, 0.1, 0.06, 0.04, etc., which are not limited herein.

It should be noted that the center of mass m1 of the key module 4*d* may coincide with the centroid g1 of the key module 4*d* (not shown in the figure), that is, the center of mass m1 of the key module 4*d* and the centroid g1 of the key module 4*d* may locate at a same point. When the mass distribution of the key module 4*d* and the speaker module is relatively uniform, the center of mass m2 of the speaker module may coincide with the centroid g2 (not shown in the figure) of the speaker module.

In some embodiments, the center of mass m1 may not coincide with the centroid g1 of the key module 4*d*. Specifically, since the structure of the key module 4*d* is relatively simple and/or regular, the centroid g1 of the key module 4*d* may be calculated relatively easily, the centroid g1 may be regarded as a reference point. The center of mass m2 of the speaker module may not coincide with the centroid g2 of the speaker module. Since one or more units (e.g., a microphone, a flexible circuit board, a bonding pad, etc.) of the speaker module may be made of different materials, the mass distribution of the speaker module may be not uniform, and the one or more units may have an irregular shape. Thus, the center of mass m2 of the speaker module may be regarded as a reference point.

In an application scenario, the first distance 11 may be formed between the centroid g1 of the key module 4*d* and the top end 25, and the second distance 12 may be formed between the center of mass m2 of the speaker module and the top end 25. The mass distribution of the key module 4*d* in the speaker component 83 may be indicated by the ratio of the first distance 11 to the second distance 12, and the mass ratio k of a mass of the key module 4*d* to the mass of the speaker module. Specifically, when the mass of the key module 4*d* is constant, the vibration acceleration of the speaker component 83 may be decreased as the ratio of the first distance 11 to the second distance 12 increases, thereby reducing the volume generated by the speaker component 83. When the ratio of the first distance 11 to the second distance 12 is constant, the vibration acceleration of the speaker component 83 may be decreased as the mass of the key module 4*d* increases, thereby reducing the volume generated by the speaker component 83. Therefore, the volume generated by the speaker component 83 may be determined and/or adjusted within a range that the ear can recognize by adjusting the ratio of the first distance 11 to the second distance 12 and/or the mass ratio k of the key module 4*d* to the mass of the speaker module.

In an embodiment, the ratio of the first distance 11 to the second distance 12 may not be greater than 1.

Specifically, when the ratio of the first distance 11 to the second distance 12 is equal to 1, the centroid g1 of the key module 4*d* may coincide with the center of mass the m2 of the speaker module. Therefore, the key module 4*d* may be disposed on a center of the speaker component 83. When the ratio of the first distance 11 to the second distance 12 is less than 1, the centroid g1 of the key module 4*d* may be closer to the top end 25 with respect to the center of the mass m2 of the speaker module. Therefore, the key module 4*d* may be disposed on the proximal end close to the top end 25. The smaller the ratio of the first distance 11 to the second distance 12 is, the closer the centroid g1 of the key module 4*d* to the top end 25 relative to the center of mass m2 of the speaker module.

Further, the ratio of the first distance 11 to the second distance 12 may be not greater than 0.95. Therefore, the key module 4*d* may be closer to the top end 25. As used herein, the ratio of the first distance 11 to the second distance 12 may be 0.9, 0.8, 0.7, 0.6, 0.5, etc., which may be determined according to actual needs and is not limited herein.

Further, when the ratio of the first distance 11 to the second distance 12 satisfies a range aforementioned, the ratio of the mass of the key module 4*d* to the mass of the speaker module may not be greater than 0.3. For example, the ratio of the mass of the key module 4*d* to the mass of the speaker module may not be greater than 0.29, 0.23, 0.17, 0.1, 0.06, 0.04, etc., which are not limited herein.

It should be noted that, in some embodiments, the centroid g2 of the speaker module may be regarded as the reference point, which may be similar to the foregoing mentioned embodiments, which is not be repeated herein.

Figure 66:
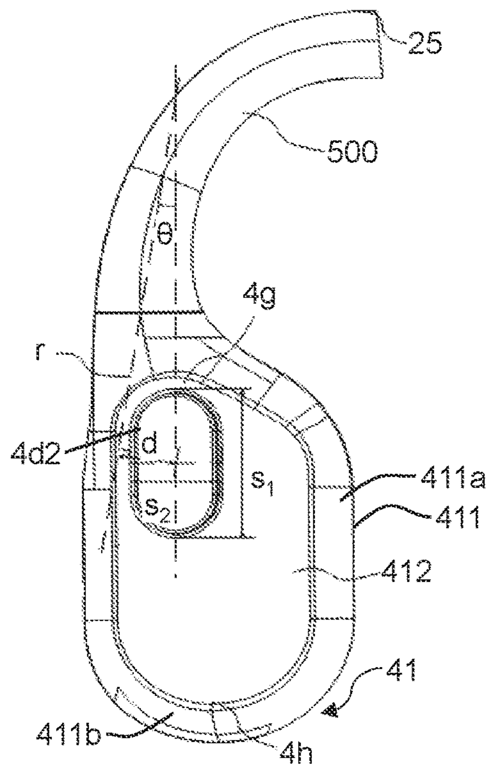
FIG. 66 is a schematic structural diagram illustrating a speaker component of a loudspeaker device according to some embodiments of the present disclosure.

FIG. 66 is a schematic structural diagram illustrating a speaker component of a loudspeaker device according to some embodiments of the present disclosure. In some embodiments, a speaker module may include an earphone core and a core housing 41. The earphone core may be configured to generate a sound and the core housing 41 may be configured to accommodate the earphone core.

In some embodiments, the core housing 41 may include an outer side wall 412 and a peripheral side wall 411. The peripheral side wall 411 may be connected to and surrounding the outer side wall 412. When a user wears the loudspeaker device, one side of the peripheral side wall 411 may be in contact with the human head, and the outer side wall 412 may be located at the side of the peripheral side wall 411 away from the human head. In some embodiments, the core housing 41 may include a cavity configured to accommodate the earphone core.

In some embodiments, the peripheral side wall 411 may include a first peripheral side wall 411*a* arranged along a length direction of the outer side wall 412 and a second peripheral side wall 411*b* arranged along a width direction of the outer side wall 412. The outer side wall 412 and the peripheral side wall 411 may be connected and form the cavity with an open end, and the cavity may be configured to accommodate the earphone core.

In some embodiments, a count (or a number) of the first peripheral side wall 411*a* and/or the second peripheral side wall 411*b* may be two. The first peripheral side wall 411*a* and the second peripheral side wall 411*b* may be enclosed in sequence. When the user wears the loudspeaker device, the two first peripheral side walls 411*a* may face a front side and a back side of the user's head, respectively. The two second peripheral side walls 411*b* may face an upper side and a lower side of the user's head, respectively.

In some embodiments, the outer side wall 412 may cover an end of the first peripheral side wall 411*a* and the second peripheral side wall 411*b* after the first peripheral side wall 411*a* and the second peripheral side wall 411*b* are enclosed. The core housing 41 with an open end and a closed end may be formed and configured to accommodate the earphone core.

In some embodiments, a shape enclosed by the first peripheral side wall 411*a* and the second peripheral side wall 411*b* may be not limited. The shape enclosed by the first peripheral side wall 411*a* and the second peripheral side wall 411*b* may include any shape suitable for wearing on the user's head, such as a rectangle, a square, a circle, an ellipse, etc.

In some embodiments, the shape enclosed by the first peripheral side wall 411*a* and the second peripheral side wall 411*b* may conform to the principle of ergonomics, thereby improving the wearing experience of the user. In some embodiments, a height of the first peripheral side wall 411*a* and a height of the second peripheral side wall 411*b* may be the same or different. When heights of two successively connected peripheral side walls 411 are different, a protruding part of the peripheral side wall 411 may not affect the wearing and/or operation of the user.

Figure 67:
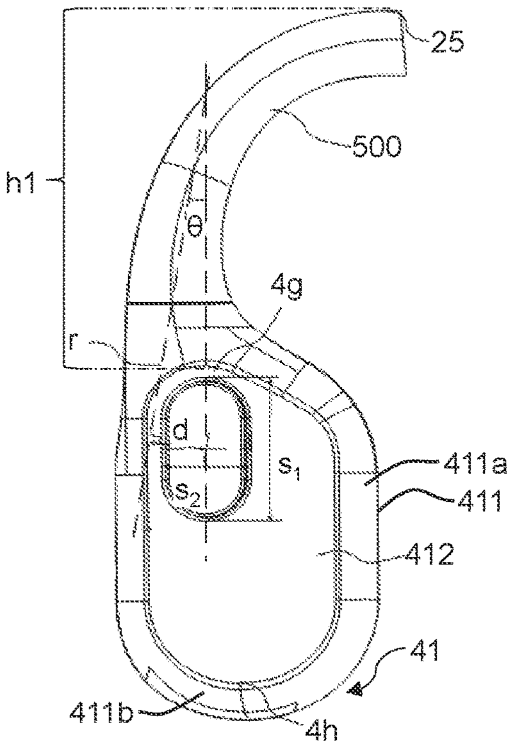
FIG. 67 is a schematic diagram illustrating a distance h1 according to some embodiments of the present disclosure.
Figure 68:
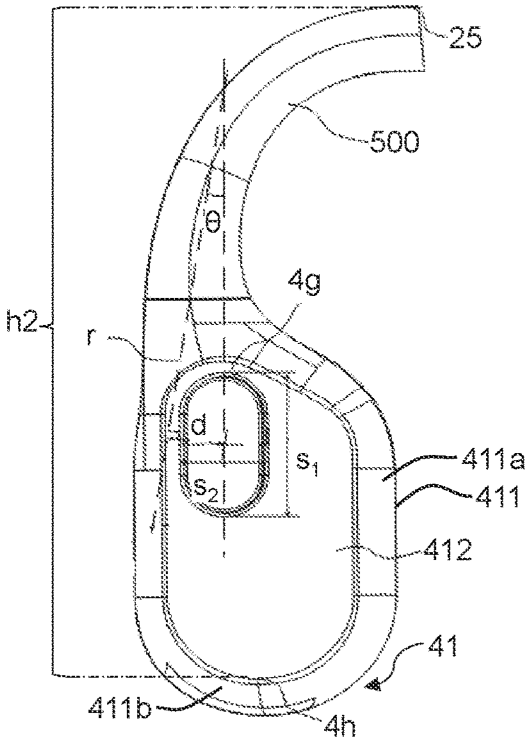
FIG. 68 is a schematic diagram illustrating a distance h2 according to some embodiments of the present disclosure.
Figure 69:
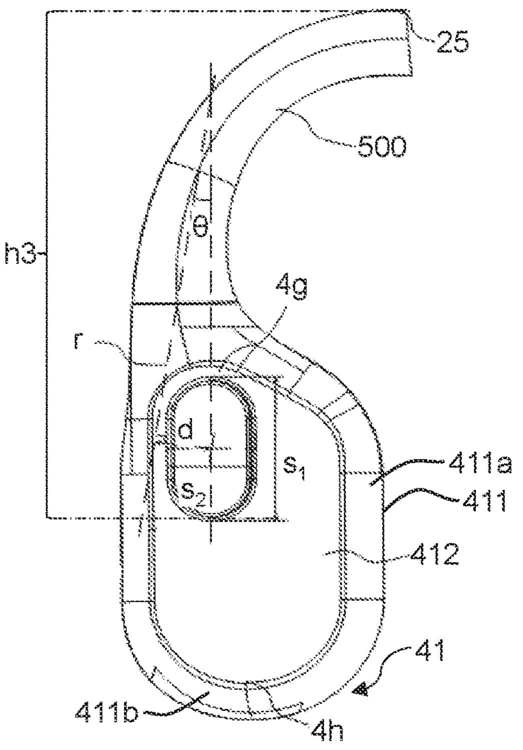
FIG. 69 is a schematic diagram illustrating a distance h3 according to some embodiments of the present disclosure.

FIG. 67 is a schematic diagram illustrating a distance h1 according to some embodiments of the present disclosure. FIG. 68 is a schematic diagram illustrating a distance h2 according to some embodiments of the present disclosure. FIG. 69 is a schematic diagram illustrating a distance h3 according to some embodiments of the present disclosure. In some embodiments, an outer side wall 412 may be disposed on an end enclosed by a first peripheral side wall 411*a* and a second peripheral side wall 411*b*. When a user wears a loudspeaker device, the outer side wall 412 may be located at an end of the first peripheral side wall 411*a* and the second peripheral side wall 411*b* away from the user's head. In some embodiments, the outer side wall 412 may include a proximal end point and a distal end point. The proximal end point and the distal end point may be located on a contour connecting the outer side wall 412 with the first peripheral side wall 411*a* and the second peripheral side wall 411*b*, respectively. The proximal end point may be opposite to the distal end point on the contour. In some embodiments, the distance h1 between the proximal end point and a vibration fulcrum may be relatively short, and the proximal end may be referred to as at a top position. The distance h2 between the distal end point and the vibration fulcrum may be relatively long, and the distal end point may be referred to as at a bottom position. The distance h3 between a midpoint of a line connecting the proximal end point and the distal end point and the vibration fulcrum may be between h1 and h2, and the midpoint may be referred to as at a middle position.

In some embodiments, the key module 4*d* may be located in the middle position of the outer side wall 412. In some embodiments, the key module 4*d* may be located between the middle position and the top position of the outer side wall 412.

Figure 70:
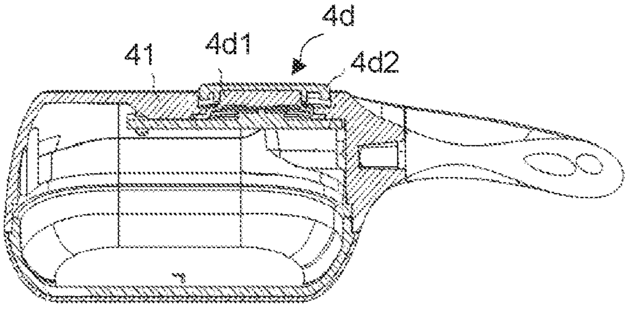
FIG. 70 is a schematic diagram illustrating a cross-sectional view of a partial structure of a speaker component according to some embodiments of the present disclosure.

FIG. 70 is a schematic diagram illustrating a cross-sectional view of a partial structure of a speaker component according to some embodiments of the present disclosure. As shown in FIG. 70, a key module 4*d* may further include an elastic bearing 4*d*1 and a button block 4*d*2.

In some embodiments, a shape of the button block 4*d*2 may be a rectangle with rounded corners, and the button block **4*d*2 may extend along a length direction of the outer side wall 412. The button block 4*d*2 may include two symmetry axes (e.g., a long axis and a short axis), and the button block 4*d*2** may be arranged symmetrically in two symmetry directions, and the symmetry directions are perpendicular to each other.

Figure 71:
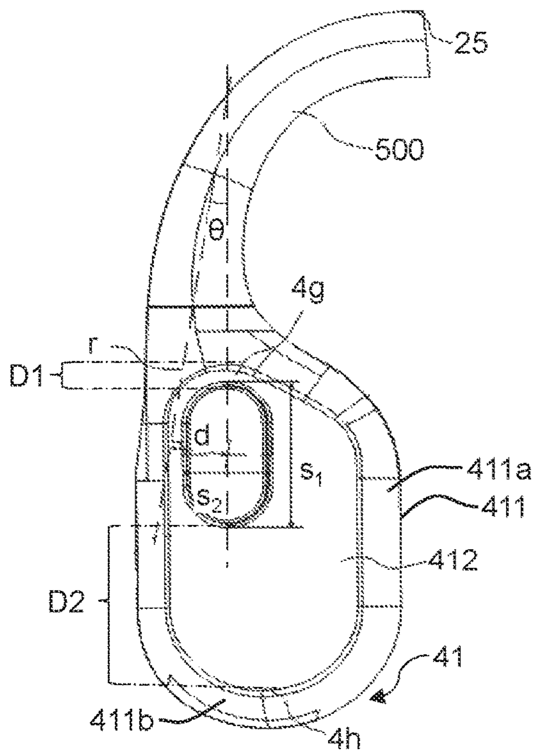
FIG. 71 is a schematic diagram illustrating a distance D1 and a distance D2 according to some embodiments the present disclosure.

FIG. 71 is a schematic diagram illustrating a distance D1 and a distance D2 according to some embodiments the present disclosure. As shown in FIG. 71, a distance between the top of the button **4*g* and a top end position of an outer side wall 412 is the first distance D1. A distance between the bottom of the button 4*g* and a bottom end position of the outer side wall 412 is the second distance D2. A ratio of the first distance D1 to the second distance D2** may not be greater than 1.

Specifically, when the ratio of the distance D1 to the distance D2 is equal to 1, the button **4*g* may be located in a middle position of the outer side wall 412. When the ratio of the first distance D1 and the second distance D2 is less than 1, the button 4*g* may be located between the middle position and the top end position of the outer side wall 412**.

Further, the ratio of the first distance D1 to the second distance D2 may be not greater than 0.95. Therefore, the button block **4*d*2 may be close to the top end position of the outer wall 412, that is, the button block 4*d*2 may be close to the vibration fulcrum, thereby improving a volume of a speaker component 83. In some embodiments, the ratio of the first distance D1 to the second distance D2** may be 0.9, 0.8, 0.7, 0.6, 0.5, etc., which may be determined according to different needs and is not limited herein.

In some embodiments, a connection portion connecting the ear hook 500 and the speaker module may have a central axis. In some embodiments, the connection portion connecting the ear hook 500 and the speaker module may include an outer surface. In some embodiments, the outer surface of the button block **4*d*2 may be a side surface of the button block 4*d*2 away from the user's head when the user wears the loudspeaker device. In some embodiments, an extension line r of the central axis may have a projection on a plane where the outer surface of the button block locates. An angle θ formed between the projection and the long axis direction of the button block 4*d*2** may be less than 10°, for example, 9°, 7°, 5°, 3°, 1°, etc., which is not limited herein.

When the angle θ formed between the projection of the extension line r on the plane where the outer surface of the button block **4*d*2 locates and the long axis direction is less than 10°, a deviation of the long axis direction of the button block 4*d*2 from the extension line r may be relatively small. Therefore, the long axis direction of the button block 4*d*2** may be regarded as consistent or substantially consistent with the direction of the extension line r of the central axis.

In some embodiments, an extension line r of the central axis may have a projection on a plane where the outer surface of the button block **4*d*2 locates. In some embodiments, the long axis direction of the outer surface of the button block 4*d*2 and the short axis direction of the outer surface of the button block 4*d*2 may have an intersection. A distance d between the projection and the intersection may be relatively small. The distance d may be less than a width $S_2$ of the outer surface along the short axis direction of the button block 4*d*2, thereby making the button block 4*d*2 close to the extension line r of the central axis of the ear hook 500. In some embodiments, the projection of the extension line r of the central axis of the ear hook 500 on the plane where the outer surface of the button block 4*d*2 locates may coincide with the long axis direction of the button block 4*d*2, thereby further improving the sound quality of the speaker component 83**.

In some embodiments, a long axis of the button block **4*d*2 may be in a direction from the top of the button block 4*d*2 to the bottom of the button block 4*d*2, or a direction in which the ear hook 500 may be connected to the core housing 41. The short axis of the button block 4*d*2 may be perpendicular to the long axis of the button block 4*d*2 and pass through a midpoint of a line connecting the top of the button block 4*d*2 and the bottom of the button block 4*d*2. A size of the button block 4*d*2 along the long axis direction may be $s_1$, and a size of the button block 4*d*2** along a circumferential direction may be $s_2$.

In some embodiments, the first peripheral side wall **411*a*** may have a bottom end position, a middle position, and a top end position along the direction close to the vibration fulcrum.

The bottom end position of the first peripheral side wall **411*a* may include a connection point connecting the first peripheral side wall 411*a* and the second peripheral side wall 411*b* which is away from the ear hook 500. The top end position may include a connection point connecting the first peripheral side wall 411*a* and the second peripheral side wall 411*b* which is close to the ear hook 500. The middle position may include a midpoint of a line connecting the bottom end position and the top end position of the first peripheral side wall 411*a***.

In some embodiments, the key module **4*d* may be disposed on the middle position of the first peripheral side wall 411*a* (not shown in the figure), or between the middle position and the top end position of the first peripheral side wall 411*b* (not shown in the figure). The key module 4*d* may be centrally disposed on the first peripheral side wall 411*a* along a width direction of the first peripheral side wall 411*a***.

Figure 72:
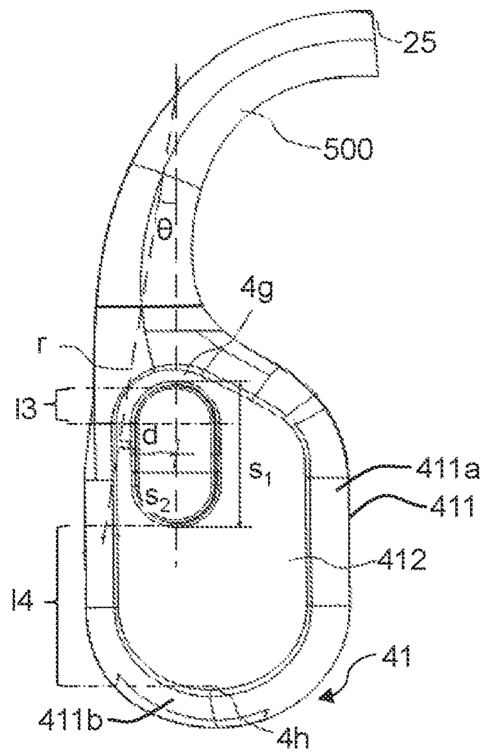
FIG. 72 is a schematic diagram illustrating a distances 13 and a distance 14 according to some embodiments of the present disclosure.

FIG. 72 is a schematic diagram illustrating a distance 13 and a distance 14 according to some embodiments of the present disclosure. In some embodiments, the third distance 13 refers to a distance between a top of a key module **4*d* and a top end position of a first peripheral side wall 411*a*. The fourth distance 14 refers to a distance between a bottom of the key module 4*d* and a bottom end position of the first peripheral side wall 411. A ratio of the third distance 13 to the fourth distance 14** may be not greater than one.

Further, the ratio of the third distance 13 to the fourth distance 14 may be not greater than 0.95, so that the key module **4*d* may be relatively close to the top end position of the first peripheral side wall 411*a*, that is, the key module 4*d* may be relatively close to the vibration fulcrum, thereby improving the volume generated by a speaker component 83. The ratio of the third distance 13 to the fourth distance 14** may also be 0.9, 0.8, 0.7, 0.6, 0.5, etc., which may be determined according to the actual need and not limited herein.

In some embodiments, as mentioned above, the third distance D3 may be formed between a top of a button block **4*d*2 and a top end position of a first peripheral side wall 411*a*. The fourth distance D4 may be formed between a bottom of the button block 4*d*2 and a bottom end position of the first peripheral side wall 411. A ratio of the third distance D3 to the fourth distance D4** may be not greater than one.

Further, the ratio of the third distance D3 to the fourth distance D4 may be not greater than 0.95. Therefore, the button block **4*d*2 may be close to the top end position of the first peripheral side wall 411*a*, that is, the button block 4*d*2 may be close to the vibration fulcrum, thereby improving a volume of a speaker component 83**. In some embodiments, the ratio of the third distance D3 to the fourth distance D4 may be 0.9, 0.8, 0.7, 0.6, 0.5, etc., which may be determined according to different needs and is not limited herein.

Figure 73:
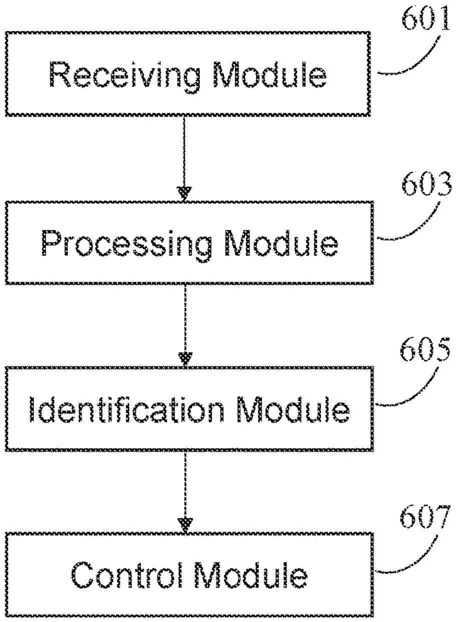
FIG. 73 is a block diagram illustrating a voice control system according to some embodiments of the present disclosure.

FIG. 73 is a block diagram illustrating a voice control system according to some embodiments of the present disclosure. The voice control system may be part of the auxiliary key module, and may also be integrated in the loudspeaker device as a separate module. In some embodiments, the voice control system may include a receiving module 601, a processing module 603, an identification module 605, and a control module 607.

In some embodiments, the receiving module 601 may be configured to receive voice control instruction and send the voice control instruction to the processing module 603. In some embodiments, the receiving module 601 may be one or more microphones. In some embodiments, when the receiving module 601 receives a voice control instruction issued by a user, for example, when the receiving module 601 receives a voice control instruction of "start playing", the voice control instruction may be sent to the processing module 603.

In some embodiments, the processing module 603 may be communicatively connected with the receiving module 601, generate instruction signal according to the voice control instruction, and send the instruction signal to the identification module 605.

In some embodiments, when receiving a voice control instruction issued by the current user from the receiving module 601 through a communication connection, the processing module 603 may generate an instruction signal according to the voice control instruction.

In some embodiments, the identification module 605 may be communicatively connected with the processing module 603 and the control module 607 to identify whether the instruction signal matches a preset signal and send a matching result to the control module 607.

In some embodiments, when the identification module 605 determines that the instruction signal matches the preset signal, the identification module 605 may send the matching result to the control module 607. The control module 607 may control the operation of the loudspeaker device according to the instruction signal. For example, when the receiving module 601 receives a voice control instruction of "start playing", and when the identification module 605 determines that the instruction signal corresponding to the voice control instruction match a preset signal, the control module 607 may automatically execute the voice control instruction, that is, immediately start playing sound data. When the instruction signal does not match the preset signal, the control module 607 may not execute the control instruction.

In some embodiments, the voice control system may further include a storage module, which is communicatively connected with the receiving module 601, the processing module 603, and the identification module 605. The receiving module 601 may receive a preset voice control instruction and send it to the processing module 603. The processing module 603 may generate a preset signal according to the preset voice control instruction, and send the preset signal to the storage module. When the identification module 605 needs to match the instruction signal received by the receiving module 601 with the preset signal, the storage module may send the preset signal to the identification module 605 through a communication connection.

In some embodiments, the processing module 603 may further include removing ambient sounds included in the voice control instructions.

In some embodiments, the processing module 603 in the voice control system in this embodiment may further include a process of denoising the voice control instructions. The denoising process may refer to removing the ambient sound included in the voice control instruction. In some embodiments, for example, when in a complex environment, the receiving module 601 may receive the voice control instruction and send it to the processing module 603. Before generating a corresponding instruction signal according to the voice control instruction, in order to avoid ambient sounds from disturbing the recognition process of the subsequent identification module 605, the processing module 603 may perform denoising process on the voice control instruction. For example, when the receiving module 601 receives a voice control instruction issued by a user when the user is on an outdoor road, the voice control instruction may include noisy environmental sounds such as vehicle driving, whistle on the road, and the processing module 602 may reduce the influence of the environmental sound on the voice control instruction through denoising processing.

In some embodiments, the loudspeaker device may further include an indicator light module (not shown in the figure) to display the current working state of the loudspeaker device. Specifically, the indicator light module can emit a light signal, and the current working state of the loudspeaker device may be learned by observing the light signal.

In some embodiments, the indicator light module may display the power of the loudspeaker device. For example, when the indicator light is red, it indicates that the power of the loudspeaker device is insufficient (for example, the power is less than 5%, 10%, etc.). As another example, when the loudspeaker device is being charged, the indicator light may be in a flashing state. As still an example, when the indicator light is green, it indicates that the loudspeaker device has sufficient power (for example, the power is above 50%, above 80%, etc.). In some embodiments, the color displayed by the indicator light may be adjusted as required, which is not limited here.

Of course, it is easy to understand that the indicator light may indicate the power of the loudspeaker device in other ways. In some embodiments, the indicator light may include multiple indicator lights, and the current power level of the loudspeaker device may be indicated by the number of lighted indicator lights. Specifically, in an application scenario, the indicator light may be set to three. When only one indicator light is on, it indicates that the power of the loudspeaker device is insufficient and may be shut down at any time (for example, the power is at 1%-20%, etc.). When only two indicator lights are on, it means that the power of the loudspeaker device is in normal use and can be charged (for example, the power is 21%~70%, etc.). When all the indicator lights are on, it means that the power of the loudspeaker device is fully charged, it does not need to be charged, and the standby time is long (for example, the power is 71%~100%, etc.).

In some alternative embodiments, the indicator light may indicate the current communication status of the loudspeaker device. For example, when the loudspeaker device is in a communication connection (such as Wireless Fidelity (WIFI), Bluetooth connection, etc.) with other devices, the indicator light may keep flashing, or be displayed in other colors (such as blue).

Figure 74:
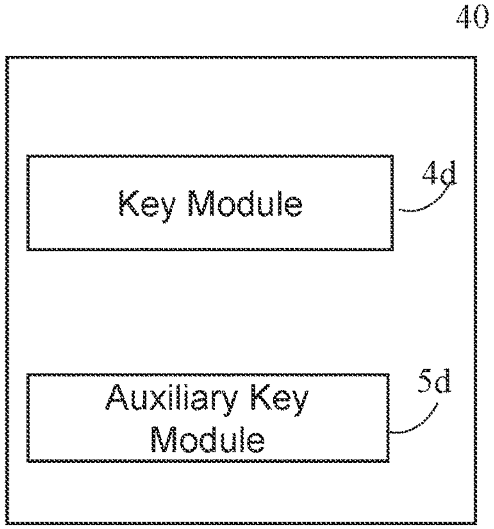
FIG. 74 is a block diagram illustrating a loudspeaker device according to some embodiments of the present disclosure.

FIG. 74 is a block diagram illustrating a loudspeaker device according to some embodiments of the present disclosure.

In some embodiments, the loudspeaker device may further include an auxiliary key module 5*d*. The auxiliary key module 5*d* may be used to provide more human-computer interaction functions.

Specifically, in some embodiments, the auxiliary key module 5*d* may include a power switch key, a function shortcut key, and a menu shortcut key. In some embodiments, the function shortcut key may include a volume up key and a volume down key for adjusting the volume of sound, and a fast forward key and a fast backward key for adjusting the progress of the sound file. In some embodiments, the auxiliary key module 5*d* may include two forms of physical keys and virtual keys. In some embodiments, the end surface of each key in the auxiliary key module 5*d* may be provided with an identification corresponding to its function. In some embodiments, the identification may include text (for example, Chinese and English), symbols (for example, the volume up key is marked with "+", and the volume down key is marked with "–"). In some embodiments, the identifications may be set at the keys by means of laser printing, screen printing, pad printing, laser filling, thermal sublimation, and hollow text. In some embodiments, the identification on the button may also be disposed on the surface of the core housing 41 located on the periphery of the button, which can also serve as a label. In some embodiments, the loudspeaker device may use a touch screen, and the control program installed in the loudspeaker device may generate virtual keys on the touch screen with interactive functions, and the virtual keys can select the function, volume, and files of the player. In addition, the loudspeaker device may also be a combination of a physical display and physical keys.

Under normal circumstances, the sound quality of the loudspeaker device may be affected by many factors such as the physical properties of the components of the loudspeaker device itself, the vibration transmission relationship between the components, the vibration transmission relationship between the loudspeaker device and the outside world, and the efficiency of the vibration transmission system when transmitting vibrations. The components of the loudspeaker device itself may include components generating vibration (such as but not limited to earphone core), components fixing the loudspeaker device (such as, but not limited to ear hook 500), and components transmitting vibration (such as but not limited to panels, vibration transmission layers on the core housing 41, etc.). The vibration transmission relationship between the various components and the vibration transmission relationship between the loudspeaker device and the outside world may be determined by the contact method (such as but not limited to clamping force, a contact area, a contact shape, etc.) between the loudspeaker device and the user.

Figure 75:
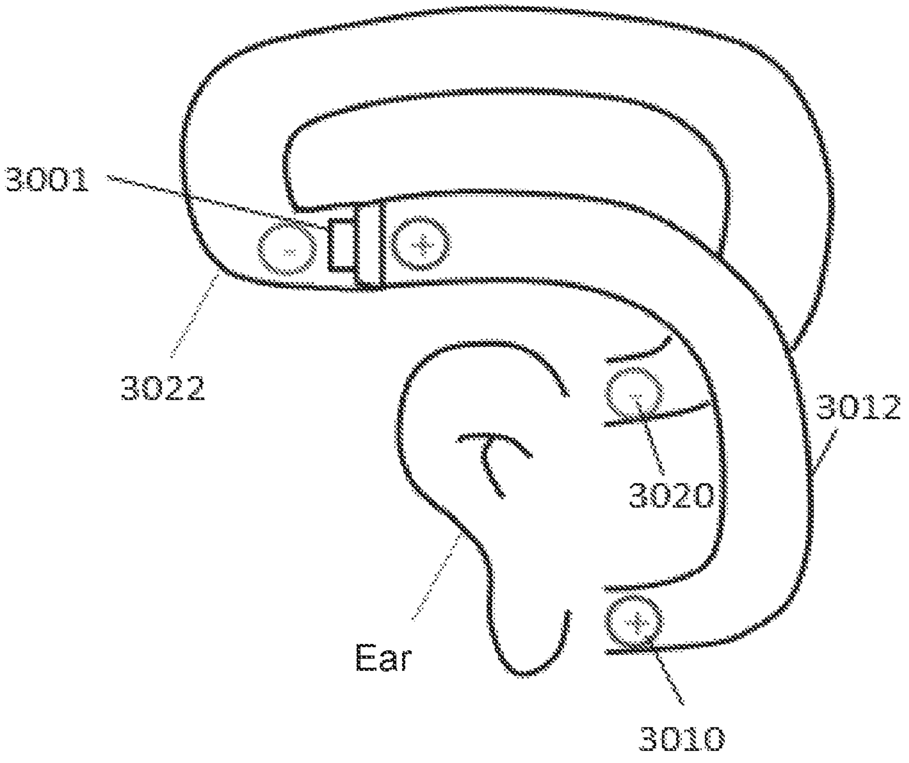
FIG. 75 is a schematic diagram illustrating transmitting a sound through air conduction according to some embodiments of the present disclosure.

In some embodiments, the loudspeaker device described above may also transmit the sound to the user through air conduction. When the air condition is used to transmit the sound, the loudspeaker device may include one or more sound sources. The sound source may be located at a specific position of the user's head, for example, the top of the head, a forehead, a check, a temple, an auricle, the back of an auricle, etc., without blocking or covering an ear canal. FIG. 75 is a schematic diagram illustrating transmitting a sound through air conduction according to some embodiments of the present disclosure.

As shown in FIG. 75, a sound source 3010 and a sound source 3020 may generate sound waves with opposite phases ("+" and "–" in the figure indicate the opposite phases). For brevity, the sound source mentioned herein may refer to sound outlets of the loudspeaker device that may output sounds. For example, the sound source 3010 and the sound source 3020 may be two sound outlets respectively located at specific positions of the loudspeaker device (for example, the core housing 82, or the circuit housing 100).

In some embodiments, the sound source 3010 and the sound source 3020 may be generated by the same vibration device 3001. The vibration device 3001 may include a diaphragm (not shown in the figure). When the diaphragm is driven to vibrate by an electric signal, the front side of the diaphragm may drive the air to vibrate, the sound source 3010 may be formed at the sound outlet through a sound guiding channel 3012, the back of the diaphragm may drive air to vibrate, and the sound source 3020 may be formed at the sound outlet through a sound guiding channel 3022. The sound guiding channel may refer to a sound transmission route from the diaphragm to the corresponding sound outlet. In some embodiments, the sound guiding channel may be a route surrounded by a specific structure on the loudspeaker device (for example, the core housing 82, or the circuit housing 100). It should be known that, in some alternative embodiments, the sound source 3010 and the sound source 3020 may also be generated by different vibrating diaphragms of different vibration devices, respectively.

Among the sounds generated by the sound source 3010 and the sound source 3020, one portion may be transmitted to the ear of the user to form the sound heard by the user. Another portion may be transmitted to the environment to form a leaked sound. Considering that the sound source 3010 and the sound source 3020 are relatively close to the ears of the user, for convenience of description, the sound transmitted to the ears of the user may be referred to as a near-field sound. The leaked sound transmitted to the environment may be referred to as a far-field sound. In some embodiments, the near-field/far-field sounds of different frequencies generated by the loudspeaker device may be related to a distance between the sound source 3010 and the sound source 3020. Generally speaking, the near-field sound generated by the loudspeaker device may increase as the distance between the two sound sources increases, while the generated far-field sound (the leaked sound) may increase with the increasing of the frequency.

For the sounds of different frequencies, the distance between the sound source 3010 and the sound source 3020 may be designed, respectively, so that a low-frequency near-field sound (e.g., a sound with a frequency of less than 800 Hz) generated by the loudspeaker device may be as large as possible and a high-frequency far-field sound (e.g., a sound with a frequency greater than 2000 Hz) may be as small as possible. In order to implement the above purpose, the loudspeaker device may include two or more sets of dual sound sources. Each set of the dual sound sources may include two sound sources similar to the sound source 3010 and the sound source 3020, and generate sounds with specific frequencies, respectively. Specifically, a first set of the dual sound sources may be used to generate low frequency sounds. A second set of the dual sound sources may be used to generate high frequency sounds. In order to obtain more low-frequency near-field sounds, the distance between two sound sources in the first set of the dual sound sources may be set to a larger value. Since the low-frequency signal has a longer wavelength, the larger distance between the two sound sources may not cause a large phase difference in the far-field, and not form excessive leaked sound in the far-field. In order to make the high-frequency far-field sound smaller, the distance between the two sound sources in the second set of the dual sound sources may be set to a smaller value. Since the high-frequency signal has a shorter wavelength, the smaller distance between the two sound sources may avoid the generation of the large phase difference in the far-field, and thus the generation of the excessive leaked sounds may be avoided. The distance between the second set of the dual sound sources may be less than the distance between the first set of the dual sound sources.

The beneficial effects of the embodiments of the present disclosure may include but be not limited to the following: (1) the circuit housing, the first housing sheath, and the second housing sheath may be separately molded, thereby avoiding damage to the control circuit or the battery caused by high temperature; (2) the circuit housing may be not completely covered by the first housing sheath and the second housing sheath, and the components used for user operation may be exposed, which is convenient for users to use; (3) there is no need to set up a separate space to place the flexible circuit board, thereby improving the space utilization; (4) the first contact surface and the second contact surface may be accurately positioned by aligning the magnetic adsorption to realize the matching connection with the corresponding joint, thereby improving the accuracy of the docking with the corresponding joint; (5) it has good elasticity which can maximize the comfort of wearing; (6) the composite vibration device composed of the vibration plate, the first vibration transmission plate, and the second vibration transmission plate may generate not less than two formants, which can produce a flatter frequency response curve in the audible range of the hearing system, thereby improving the sound quality of the loudspeaker device; (7) the stability of the voice coil installation may be ensured, thereby fundamentally ensuring the sound quality of the loudspeaker device. It should be noted that different embodiments may have different beneficial effects. In different embodiments, the possible beneficial effects may be any one or a combination of the above, and may be any other beneficial effects that may be obtained.

What is claimed is:

1. A loudspeaker device, comprising:

a core housing; and an earphone core accommodated in the core housing, the earphone core including a coil, a bracket, and an external wire, wherein the coil is disposed on the bracket and has an inner lead, the bracket defines a wiring groove, the inner lead and the external wire is welded to each other and a welding position is located in the wiring groove.

2. The loudspeaker device of claim 1, wherein the wiring groove is filled with a sealant.

3. The loudspeaker device of claim 1, wherein the core housing includes a bottom wall and a peripheral side wall, the bottom wall and the peripheral side wall are connected together to form a cavity with an opening.

4. The loudspeaker device of claim 1, wherein an inner side wall of the core housing is disposed with a guide groove, and the external wire is at least partially set in the guide groove.

5. The loudspeaker device of claim 1, wherein the bracket includes:

annular main body configured to support the coil;

a support flange protruding on an outer side wall of the annular main body and extending along an outside of the annular main body; and an outer blocking wall connected to the support flange and spaced apart from the annular main body.

6. The loudspeaker device of claim 5, wherein the outer blocking wall is sleeved on a periphery of the annular main body or the coil at intervals.

7. The loudspeaker device of claim 5, wherein a top of the outer blocking wall is disposed with a slot through which the external wire extends inside the wiring groove.

8. The loudspeaker device of claim 1, wherein at least one of the external wire and the inner lead is wound into the wiring groove.

9. The loudspeaker device of claim 1, further comprising a flexible circuit board including a plurality of first pads and a plurality of second pads, wherein at least one first pad of the plurality of first pads is electrically connected to an audio signal wire of an external control circuit, the at least one first pad being connected to at least one second pad of the plurality of second pads via a first flexible lead on the flexible circuit board, the at least one second pad being electrically connected to the earphone core via the external wire.

10. The loudspeaker device of claim 9, further comprising:

an auxiliary function module configured to receive an auxiliary signal and perform an auxiliary function, wherein the flexible circuit board is configured to electrically connect to an auxiliary signal wire of the external control circuit, the audio signal wire and the auxiliary signal wire being electrically and respectively connected to the earphone core and the auxiliary function module through the flexible circuit board.

11. The loudspeaker device of claim 10, wherein the core housing is configured to accommodate the auxiliary function module and the flexible circuit board.

12. The loudspeaker device of claim 10, wherein at least one another first pad of the plurality of first pads is electrically connected to the auxiliary signal wire, the at least one another first pad being electrically connected to the auxiliary function module via a second flexible lead on the flexible circuit board.

13. The loudspeaker device of claim 10, wherein the auxiliary function module is a microphone or a key.

14. The loudspeaker device of claim 10, wherein:

the flexible circuit board includes a main circuit board and a first branch circuit board, the first branch circuit board being connected to the main circuit board and extending away from the main circuit board along one end of the main circuit board; and the auxiliary function module includes a first auxiliary function module and a second auxiliary function module, the first auxiliary function module being disposed on the main circuit board, the second auxiliary function module being disposed on the first branch circuit board.

15. The loudspeaker device of claim 14, wherein:

the plurality of first pads are disposed on the main circuit board, and the at least one second pad is disposed on the first branch circuit board.

16. The loudspeaker device of claim 14, wherein:

the flexible circuit board further includes a second branch circuit board, the second branch circuit board being connected to the main circuit board and extending away from the main circuit board along another end of the main circuit board, the second branch circuit board being spaced apart from the first branch circuit board; and the auxiliary function module further includes a third auxiliary function module disposed on the second branch circuit board.

17. The loudspeaker device of claim 16, wherein:

the plurality of first pads are disposed on the main circuit board, the at least one second pad of the plurality of second pads is disposed on the first branch circuit board, and the other second pads of the plurality of second pads are disposed on the second branch circuit board.

18. The loudspeaker device of claim 16, wherein:

the second auxiliary function module includes a first microphone element; and the third auxiliary function module includes a second microphone element.

19. The loudspeaker device of claim 1, further comprising:

a key module disposed on the core housing, the key module including a key and an elastic bearing for supporting the key.

20. The loudspeaker device of claim 1, further comprising:

a support connector configured to be in contact with a head, the core housing being fixedly connected to the support connector.

* * * * *